(12) United States Patent
Minoofar et al.

(10) Patent No.: US 12,250,502 B2
(45) Date of Patent: Mar. 11, 2025

(54) REMOTELY BIASING, CONTROLLING, AND MONITORING A NETWORK ROUTING NODE BASED ON REMOTELY PROVIDED OPTICAL SIGNALS

(71) Applicant: University of Southern California, Los Angeles, CA (US)

(72) Inventors: Amir Minoofar, Los Angeles, CA (US); Fatemeh Alishahi, Los Angeles, CA (US); Ahmad Fallahpour, San Jose, CA (US); Jonathan L. Habif, Waltham, MA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 176 days.

(21) Appl. No.: 18/105,573

(22) Filed: Feb. 3, 2023

(65) Prior Publication Data

US 2023/0319447 A1   Oct. 5, 2023

Related U.S. Application Data

(60) Provisional application No. 63/327,617, filed on Apr. 5, 2022.

(51) Int. Cl.
*H04B 10/80* (2013.01)
*H04Q 11/00* (2006.01)

(52) U.S. Cl.
CPC ....... *H04Q 11/0067* (2013.01); *H04B 10/807* (2013.01); *H04Q 11/0005* (2013.01); *H04Q 2011/0016* (2013.01)

(58) Field of Classification Search
CPC ............. H04B 10/807; H04Q 11/0067; H04Q 11/0005; H04Q 2011/0016

(Continued)

(56) References Cited

U.S. PATENT DOCUMENTS 5,008,524 A * 4/1991 Reutter .............. H04B 10/6911
  398/202
5,271,075 A * 12/1993 Gfeller ................. G02B 6/3512
  385/20

(Continued)

FOREIGN PATENT DOCUMENTS

WO   WO-2016131825 A1 *  8/2016

OTHER PUBLICATIONS

Alishah, Fatemeh, et al., "Experimental demonstration of remotely controlled tunable optical correlators of 10-50 Gbaud QPSK channels using linear and nonlinear components and laser-delivered powers," Optics Communications 523 (2022) 128698, Jun. 30, 2022, 9 pages.

(Continued)

*Primary Examiner* — Li Liu
(74) *Attorney, Agent, or Firm* — Foley & Lardner LLP

(57) ABSTRACT

A control signal may be modulated on an optical wave. A transmitter may transmit the control signal to a switch/processor location. At the remote node, the control signal is received and converted from an optical signal to an electrical signal to drive the switch/processor. To provide electrical power at the switch/processor location, optical power is transmitted from a distance and converted to electrical power using a series of PDs. Monitoring tones may be sent to the remote node and fed back to the transmitter to realize an operation state and detect a bias drift. Accordingly, an OSP function at a remote node is enabled without using any local electrical power supply.

8 Claims, 47 Drawing Sheets

(58) Field of Classification Search
USPC .................................................. 398/171, 45
See application file for complete search history.

(56) References Cited

U.S. PATENT DOCUMENTS

| | | | | |
|---|---|---|---|---|
| 5,418,381 | A * | 5/1995 | Aizawa | H03K 17/785 257/E31.108 |
| 5,680,246 | A * | 10/1997 | Takahashi | H04B 10/077 359/341.43 |
| 5,706,112 | A * | 1/1998 | Morita | H04B 10/564 340/3.1 |
| 6,118,564 | A * | 9/2000 | Ooi | H04J 14/08 398/1 |
| 6,519,062 | B1 * | 2/2003 | Yoo | H04L 45/00 398/87 |
| 6,795,656 | B1 * | 9/2004 | Ikeuchi | H04B 10/504 372/38.07 |
| 7,388,892 | B2 * | 6/2008 | Nishiyama | H04B 10/807 398/115 |
| 9,979,480 | B1 * | 5/2018 | Schubert | H04B 10/807 |
| 2003/0133641 | A1 * | 7/2003 | Yoo | H04Q 11/0005 385/14 |
| 2005/0047392 | A1 * | 3/2005 | Ashwood Smith | H04Q 11/0066 370/395.5 |
| 2006/0051100 | A1 * | 3/2006 | Watanabe | H04J 14/08 398/152 |
| 2008/0166133 | A1 * | 7/2008 | Hsiao | H04B 10/807 398/171 |
| 2008/0235418 | A1 * | 9/2008 | Werthen | H04B 10/807 710/106 |
| 2010/0290782 | A1 * | 11/2010 | Lee | H04Q 11/0005 370/254 |
| 2018/0019825 | A1 * | 1/2018 | Shirai | H04J 14/0256 |
| 2020/0083846 | A1 * | 3/2020 | Vera Villarroel | H04B 10/66 |
| 2023/0385683 | A1 * | 11/2023 | Yoo | G06N 10/20 |
| 2024/0039642 | A1 * | 2/2024 | Miyatake | H04B 10/807 |

OTHER PUBLICATIONS

Alishahi, Fatemeh, et al., "Demonstration of a Tunable Optical Correlation of a 10-15 Gbaud QPSK Data Signal using Nonlinear Wave Mixing at a Remotely Controlled Node," IPC 2021, Oct. 18, 2021, 2 pages.

Alishahi, Fatemeh, et al., "Experimental Demonstration of Remotely Controlled and Powered Tunable Optical 2-4 Taps Correlator of a 20-100 Gbit/s QPSK Channel Based on Laser-Delivered Bias and Control Signals," OFC 2021, Jun. 6, 2021, 3 pages.

Fallahpour, Ahmad, et al., "Experimental demonstration of Remotely Controlled and Powered Optical Switching Based on Laser-Delivered Bias and Control Signals," CLEO 2021, May 9, 2021, 2 pages.

Fallahpour, Ahmad, et al., "Experimental demonstration of remotely powered, controlled, and monitored optical switching based on laser-delivered signals," Sep. 10, 2021, pp. 4589-4592.

Minoofar, Amir, et al., "Remotely Biasing, Controlling, and Monitoring a Network Routing Node Based on Optically Provided Signals," SPIE, Jan. 26, 2022, 4 pages.

* cited by examiner

FIG. 11F

| | Bar State (Optical Power to Control = 10 mW) | | Cross State (Optical Power to Control = 500 mW) | |
|---|---|---|---|---|
| | Port-1 | Port-2 | Port-1 | Port-2 |
| Power to Bias = 34 mW (optimal bias point) | EVM = 13.7 % | EVM = 35.3 % | EVM = 37.6 % | EVM = 13.8 % |
| Power to Bias = 20 mW (suboptimal bias point) | EVM = 13.7 % | EVM = 21.3 % | EVM = 18.9 % | EVM = 14.3 % |

1100F

REMOTELY BIASING, CONTROLLING, AND MONITORING A NETWORK ROUTING NODE BASED ON REMOTELY PROVIDED OPTICAL SIGNALS

CROSS-REFERENCE TO RELATED PATENT APPLICATIONS

This application claims the benefit of priority under 35 U.S.C. § 119 to U.S. Provisional Patent Application Ser. No. 63/327,617, entitled "REMOTELY BIASING, CONTROLLING, AND MONITORING A NETWORK ROUTING NODE BASED ON REMOTELY PROVIDED OPTICAL SIGNALS," filed Apr. 5, 2022, the contents of such application being hereby incorporated by reference in its entirety and for all purposes as if completely and fully set forth herein.

STATEMENT REGARDING FEDERALLY SPONSORED RESEARCH OR DEVELOPMENT

This invention is made with government support under grant no. HR00112000174 awarded by the Defense Advanced Research Projects Agency (DARPA). The government has certain rights in the invention.

BACKGROUND

The present techniques generally relate to remotely controlled and powered optical switching/processing based on laser-delivered bias and control signals.

SUMMARY

The present disclosure generally relates to design architectures to utilize optical signal processing (OSP) in optical networks. Designing an architecture to bias, control, and monitor a remote network routing node from the transmitting node using remotely provided optical signals is valuable. This architecture can be utilized when the network node lacks local electrical power and can accommodate changes due to bias or temperature drifts. One potential application of such an architecture in optical routing and networking can be optical switching, in which the incoming optical data is routed to different nodes. Furthermore, tapped delay lines (TDLs) are building blocks for OSP to be implemented at the remote site. As an example of TDLs' applications, optical correlation can be used for header recognition by comparing the high-speed data stream to a specific target pattern.

At least one aspect is directed to a remotely biased, controlled, and monitored optical switching method. This aspect includes (i) generation, (ii) multiplexing, (iii) demultiplexing, and (iv) optical-to-electrical power conversion of different optical wavelengths. Multiple laser sources with different wavelengths can be used on the transmitter side for a generation. Six laser sources are used in this architecture as an example. Two laser sources are used for biasing. One laser source carries the data channel and the other one carries the control signal. Consequently, two laser sources can be used to monitor each optical switch's output state having two output ports. All laser sources can be multiplexed and passed through a single-mode fiber (SMF) from the transmitter node to deliver the required optical signals into the remote node. Subsequently, each optical signal is separated using a wavelength demultiplexer at the remote side. After demultiplexing, to convert such transmitted optical signals located at different wavelengths into electrical power, photodiodes can be used to perform optical to electrical power conversion. Consequently, each of the two laser sources used for biasing feeds a series of photodiodes in the photovoltaic mode. The first series of photovoltaic photodiodes provide the required bias for the optical switch. The other series provides the necessary electrical power of another series of photodiodes working in the photoconductive mode, which convert the optical control signal into electrical. The signal carried by another optical wavelength directly connects to the input of the optical switch. Finally, after performing the optical switching the two monitoring tones carried by different laser sources are filtered at the output of remote node to transmit back into the transmitter node. This would assist the transmitter node to directly monitor the state of operation of the switching and accordingly adjust the biases of each transmitted optical signals.

At least one aspect is directed to a method for remotely controlled and powered optical switching, including generating, by a first laser having a first wavelength, a first output in an optical range, the first output convertible into electrical power to drive an optical switch, generating, by a second laser having a second wavelength, a second output in the optical range, the second output to control switching of the optical switch, generating, by a third laser having a third wavelength, a third output in the optical range, the third output corresponding to data transmissible by the optical switch, combining, by a multiplexer, the first output, the second output, and the third output into a multiplexed output, and transmitting, by the multiplexer to the optical switch, the multiplexed output. The method can include converting, by at least one first photodiode in a photovoltaic mode, the first output into a first electrical output. The method can include applying, to at least one second photodiode, the first electrical output to activate the second photodiode. The method can include converting, by at least one second photodiode in a photoconductive mode, the second output into a second electrical output. The method can include modifying, by a variable resistor coupled with the first photodiode and the second photodiode, a voltage characteristic of the second photodiode. The method can include separating, at a demultiplexer, the multiplexed output into the first output, the second output, and the third output. The method can include transmitting, from the demultiplexer to an interferometer, the third output.

At least one aspect is directed to a method for remotely controlled and powered optical switching, including converting, into a first electrical output by at least one first photodiode in a photovoltaic mode, a first output in an optical range into a first electrical output to drive an optical switch, converting, into a second electrical output by at least one second photodiode in a photoconductive mode, a second output in the optical range into a second electrical output to control switching of the optical switch, and converting, into a third electrical output by an interferometer, a third output in the optical range into a third electrical output corresponding to data transmissible by the optical switch. The method can include applying, to at least one second photodiode, the first electrical output to activate the second photodiode. The method can include modifying, by a variable resistor coupled with the first photodiode and the second photodiode, a voltage characteristic of the second photodiode. The method can include separating, at a demultiplexer, a multiplexed output in the optical range into the first output, the second output, and the third output. The method can include receiving, by the demultiplexer via an optical fiber, the multiplexed output. The first output can be generated by a first laser having a first wavelength, and the second output can be generated by a second laser having a second wavelength, and the third output generated by a third laser having a third wavelength.

At least one aspect is directed to a system for remotely controlled and powered optical switching, including a first laser having a first wavelength to generate a first output in an optical range, the first output convertible into electrical power to drive an optical switch, a second laser having a second wavelength to generate a second output in the optical range, the second output to control switching of the optical switch, a third laser having a third wavelength to generate a third output in the optical range, the third output corresponding to data transmissible by the optical switch, and a multiplexer to combine the first output, the second output, and the third output into a multiplexed output, and to transmit the multiplexed output to the optical switch. The system can include at least one first photodiode in a photovoltaic mode to convert the first output into a first electrical output. The system can include at least one second photodiode to active in response to receiving the first electrical output. The system can include at least one second photodiode in a photoconductive mode to convert the second output into a second electrical output. The system can include a variable resistor coupled with the first photodiode and the second photodiode, the variable resistor to modify a voltage characteristic of the second photodiode. The system can include a demultiplexer to separate the multiplexed output into the first output, the second output, and the third output. The demultiplexer to transmit the third output to an interferometer.

These and other aspects and implementations are discussed in detail below. The foregoing information and the following detailed description include illustrative examples of various aspects and implementations, as well as provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 11A-F illustrate plots of switch response and power characteristics, according to some implementations;

DETAILED DESCRIPTION

Figure 1:
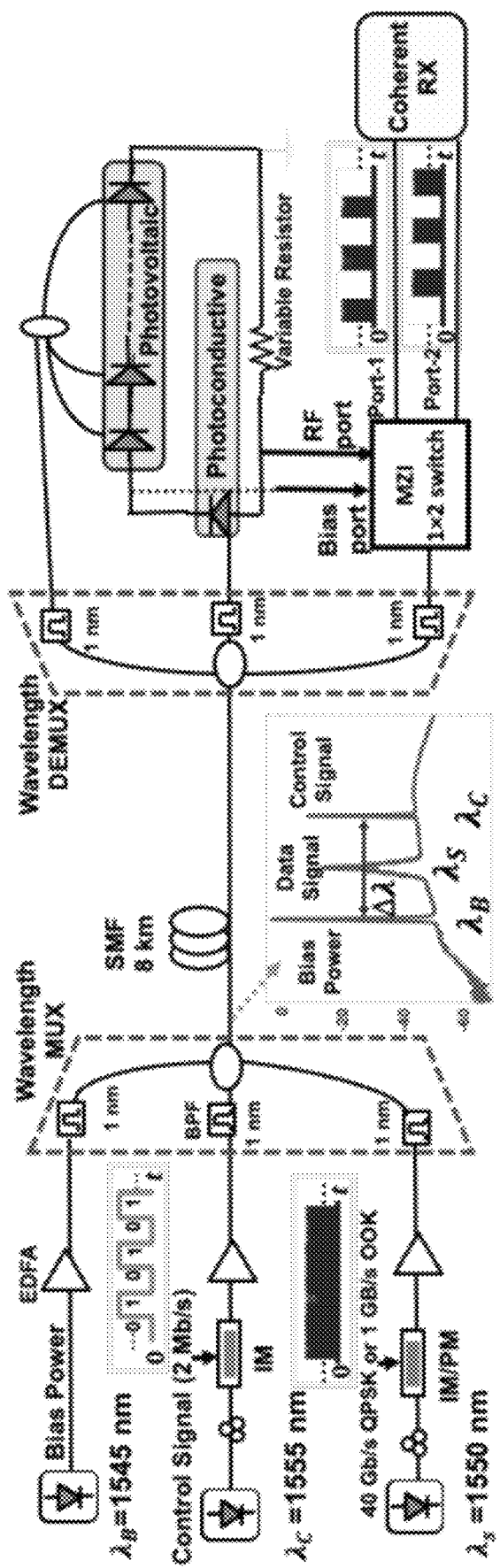
FIG. 1 illustrates a block diagram of remotely biasing, controlling, and monitoring a network routing node based on remotely provided optical signals, according to some implementations.

Optical routing and networking are typically performed at sites, which may be located at various locations in a network. However, many locations can be vulnerable to failure due to the potential for power interrupting at optical networks, leading to performance degradation. One operational challenge is the potential for power to be interrupted at the network node. Because the network routing node itself typically requires an electrical DC bias voltage and a control signal, if there is no local power, the data passing through the node could be degraded, lost, or routed to the wrong output port. For example, one challenge is that signal processing functions typically require an electrical DC bias voltage and a control signal. In addition, another challenge is monitoring the state of the node, especially due to bias and temperature drifts that are common in typical MZIs or nonlinear waveguides, such as periodically poled Lithium Niobate (PPLN) waveguides.

A system implementing the methods and architectures described herein may remotely bias, control, and monitor a network node lacking local power, enabling flexible optical networking. These architectures may include an MZI-based optical switch with optically delivered control and data signals and a remotely controlled and monitored optical correlator based on either a delay line interferometer (DLI) or nonlinear wave-mixing in a PPLN waveguide for a QPSK data.

A computer operating within the system may do so through remote optical (1) powering of the electrical bias, (2) powering of the electrical control, and (3) monitoring the switch states and bias drifts of a high-speed MZI-based optical switch. An architecture that enables the remote site to monitor the state of the switch and correct for any drifts by varying a laser-generated bias signal is described herein. In addition, the system may enable a remotely biased and controlled tunable optical two- or four-taps correlator for a QPSK data signal. Furthermore, in one embodiment, a system may implement a tunable optical correlator of a QPSK data signal using nonlinear wave mixing in a PPLN waveguide at a remotely controlled node.

One scenario to be considered is an optical switching node without local power and that may be required to be controlled from a remote location (e.g., a transmitting node). One tool that can be leveraged for remotely biased and controlled and powered switching may be to utilize a series of photodiodes (PDs) driven from a remote laser beam to power the electrical pins of an optical switch. The other issue may be monitoring the state of the switching node. Bias drifts commonly might occur in typical MZIs (e.g., caused by thermal variations). It might be possible that the actual switch may not be at the optimal bias point for the "cross" or "bar" states; however, the remote transmitting site that controls the switch may "think" that the switch is functioning properly.

Another scenario is to implement OSP functions at the remote site. The optical-TDL (OTDL) may be a fundamental building block for achieving such OSP functions. One example is the optical correlation of an incoming data stream to a target symbol pattern, wherein a high-speed data stream may be compared to a target pattern and produce a correlation output. A pattern "match" may be detected if the output exceeds a threshold. Advantageously, in this scenario, both the amplitude and phase can be used to encode the data and target pattern, thereby increasing the number of bits per symbol for comparison. A cascade of MZIs, as linear components in which each MZI has a delay in one arm, can produce multiple taps functionality. Furthermore, a PPLN waveguide, as a nonlinear waveguide, can be used to implement optical correlations. A quadrature-phase-shift-keying (QPSK) data signal may be multicast into several copies representing the taps, each copy may be differentially delayed and given a specific complex weight, and finally multiplexed into a single correlated output wavelength using a pump wave. However, correlation nodes may be located at various locations and the signal copies and pump wavelengths required for mixing may be sent from a distant location through an optical fiber link. Accordingly, ensuring proper mixing, tunability, and operation monitoring can also be challenging.

FIG. 1 illustrates a block diagram 100 of remotely biasing, controlling, and monitoring a network routing node based on remotely provided optical signals, according to some implementations.

In some implementations, a system can overcome these challenges by using bidirectional transmission of multiple laser sources over an optical link. Subsequently, (i) arrays of photodiodes that are driven from remote laser sources may be used to enable biasing and controlling; and (ii) pilot tones may be transmitted, and their ratios after backpropagation observed in the transmitter side to monitor the state of operation and adjust the optical powers accordingly.

For example, a computer implementing the systems and methods described herein may bias, control, and monitor a remote network routing node (e.g., a computer configured to route messages to a remote site), as shown in FIG. 1. In doing so, the computer may combine a data signal, an optical bias, a control signal, and a monitoring tone through a wavelength division multiplexer. The computer may transmit the combined signal from the multiplexer through a single-mode fiber (SMF) to the remote network routing node. A wavelength division de-multiplexer executed by the remote network routing node can be used to separate the optical bias and the control signal from the combined signal. The remote network routing node can use two optical circulators to separate the upstream and downstream waves in the bidirectional link. The remote network routing node may perform an optical-to-electrical (OE) conversion technique using two optical circulators on the optical bias signal and the control signal using PDs to generate electrical signals. The electrical signal that is generated from the control signal may drive the control pins, and the electrical signal from the bias signal may provide the required bias voltage of the network node. Following the assumption that the remote network routing node does not need to use any of the local electricity supply to route the data from the combined signal, the remote networking node may only use the electrical signals that are generated based on the OE conversion for power to route the data. Furthermore, the computer may monitor the state of the remote network routing node using the transmitted monitoring pilot tones. The computer may further adjust the remote network routing node by changing the transmitted optical bias. A block diagram of an implementation of biasing, controlling, and monitoring of a network routing node is shown in FIG. 1, according to some implementations. The data signal at $\lambda_D$, the optical bias at $\lambda_B$, the control signal at $\lambda_C$, and the monitoring tone at $\lambda_M$, may be combined using a wavelength division multiplexer. Subsequently, they may be passed through a single-mode fiber (SMF) to be transmitted to a remote location. A wavelength division de-multiplexer can be used to separate wavelengths at the remote site. Two optical circulators can be used to separate the upstream and downstream waves in the bidirectional link. OE conversion of the transmitted optical control signal can be done using PDs. Based on the generated electrical signals: (i) the control signal may drive the control pins and (ii) the bias signal may provide the required bias voltage of the network node. Following the assumption of not using any local electrical supply, all the electrical signals may be generated based on OE conversion of optically provided signals. Furthermore, the state of a network node may be monitored using the transmitted monitoring pilot tones and then adjusted by changing the transmitted optical bias.

Optical Power Delivered by PD

To enable remote biasing and controlling a network node based on optically provided signals, each of the received optical signals may need to be converted into the electrical domain after being de-multiplexed. A CW laser may be amplified and fed via an optical splitter to an array of PDs in series. Using a resistor, the generated photocurrent of the PDs, which may be operating in photovoltaic mode, can be converted to electrical voltage. One can amplify the optical power or connect multiple PDs in series to increase the generated voltage.

Remotely Powered, Controlled, and Monitored Optical Switching Based on Laser-Delivered Signals One scenario to consider is an optical switching node with no local power and may be required to be controlled from a remote location (e.g., a transmitting node). One tool that can be leveraged for remotely biased and controlled and powered switching may be to utilize a series of PDs driven from a remote laser beam to power the electrical pins of an optical switch. Another issue may be monitoring the state of the switching node. Bias drifts commonly in typical MZIs (e.g., caused by thermal variations) might occur. It might be possible that the actual switch may not be at the optimal bias point for the "cross" or "bar" states; however, the remote transmitting site that controls the switch may "think" that the switch is functioning properly.

Without local power, the data passing through the switching node could be degraded, lost, or routed to the wrong output port. One challenge for switching that lacks local power may be that it typically requires an electrical DC bias voltage and switching-state control signal. One example of an architecture that allows for an optical switching node with no local power is to control the switch from a remote location (e.g., a transmitting node). One example of remotely controlled and powered switching is powering the electrical pins of an optical switch from the output of a series of PDs that are driven from a remote laser beam.

However, another challenge of a switch that lacks local power may be monitoring the state of the switch, especially since changes might occur due to bias drifts that are common in typical MZIs (e.g., caused by thermal variations that might normally be handled by local electronic stabilization circuits). Although the remote transmitting site that controls the switch may "think" that the switch is functioning properly, the actual switch may not be at the optimal bias point for the "cross" or "bar" states. Specifically, a remotely controlled switch might benefit from an architecture that enables the remote site to monitor the state of the switch and correct for any drifts by varying a laser-generated bias signal. Systems not implementing the systems and methods described herein have shown biasing, controlling, and monitoring as three separate functions. Specifically, a remote optical power supply has been demonstrated in various optical systems (e.g., in radio-over-fiber systems). The function of optical switching has also been shown using a remote optical control signal. In addition, the monitoring, automatic tuning, and stabilization of a 1×2 MZI switch are demonstrated. In the described approach, there may be three aspects of switching (e.g., biasing, controlling, and monitoring). A system implementing the systems and methods described herein may perform remotely optical (1) biasing the electrical bias, (2) powering of the electrical control, and (3) monitoring the switch states and bias drifts of a high-speed MZI-based optical switch.

Systems and methods for remotely biased, controlled, and monitored optical switching are described. A control signal of the switch may be modulated on an optical wave and sent from a transmitter to a switch location. At the switch location, the control signal may be converted from an optical to an electrical signal to drive the switch. Additionally, optical power may be sent from a distance and converted to electrical power using a series of photodiodes to provide electrical power at the switch location. Demonstrated are (a) 1 Gb/s on-off keying data channel transmission and switching with a 1 MHz optically delivered control signal, and (b) 40 Gb/s quadrature phase-shift keying data channel transmission and remotely monitoring switch state and bias drift. The switching function is demonstrated without using any local electrical power supply. Moreover, the monitoring tones may be transmitted to the remote switch and fed back to the transmitter to realize a switch state and detect the bias drift.

The concept of remotely powered, controlled, and monitored optical switching is shown in FIGS. 2A-E, according to some implementations. A data signal at $\lambda_S$, a control signal at $\lambda_C$, an optical power at $\lambda_B$, and monitoring tones at $\lambda_{M1}$ and $\lambda_{M2}$ may be combined using a wavelength multiplexer into a single-mode fiber (SMF) to be transmitted to a remote location. A wavelength de-multiplexer can be used to separate wavelengths at the remote site. The signal and monitoring tones may be coupled into the same fiber and sent into the input port of the MZI-based optical switch. Depending on the control signal, the switch can direct its input to either of the two output ports. OE conversion of the transmitted optical control signal can be done using PDs. Subsequently, the electrical signal may drive the control pins of the switch. An MZI-based switch may also require a bias voltage to adjust its transmission characteristics. Optical power may be transmitted at $\lambda_B$ and OE converted to provide power for the switch bias pins remotely. The bias drift of the MZI-based switch may be monitored using the transmitted monitoring pilot tones and then adjusted by changing the transmitted optical power. Moreover, by comparing the monitoring tones at the two output ports of the switch, the switch state (bar/cross) can be observed.

Figure 2A:
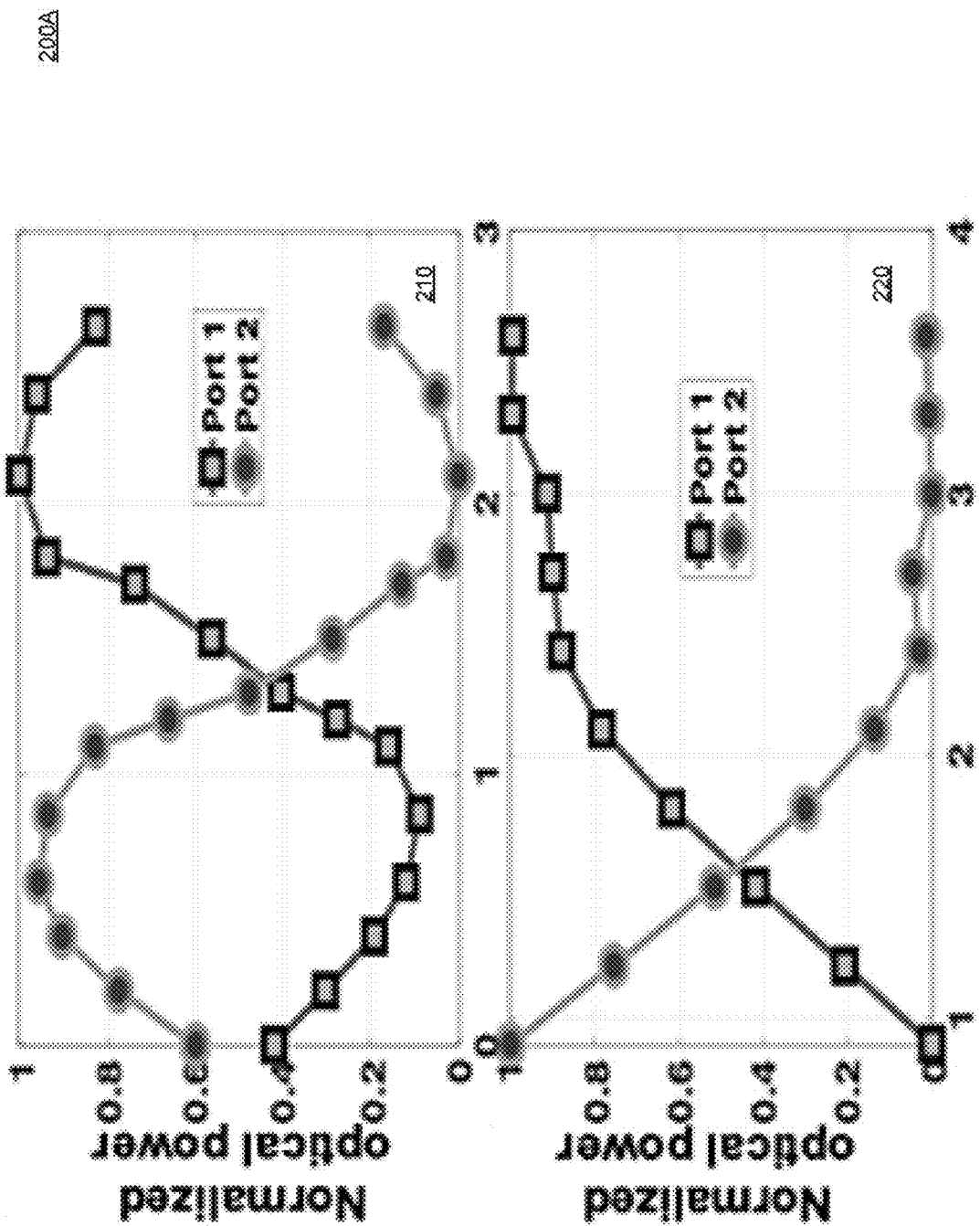
FIGS. 2A-E illustrate performances of a remotely biased, controlled, and monitored optical switch using the architecture provided in FIG. 1, according to some implementations.

FIG. 2A illustrates a performance 200A of a remotely biased, controlled, and monitored optical switch using the architecture provided in FIG. 1, according to some implementations. The characteristic curve 210 of the optical switch is measured concerning the optical bias power at 1B=1545 nm in FIG. 2A, when the RF port and bias port of the MZI are connected to the circuit according to FIG. 1, respectively. The control signal is transmitted to the reversed bias PD for OE conversion. A variable resistor is connected to this PD to maximize the peak-to-peak voltage of the generated electrical control signal. In order to provide the reverse bias for this PD, we utilized 16 PDs in series to convert the optical power to electrical power. As can be seen, the output optical power of the lower chart 220 of FIG. 2A is flattened at higher optical bias power which can be due to the saturation of photodiodes after increasing their optical power.

Figure 2B:
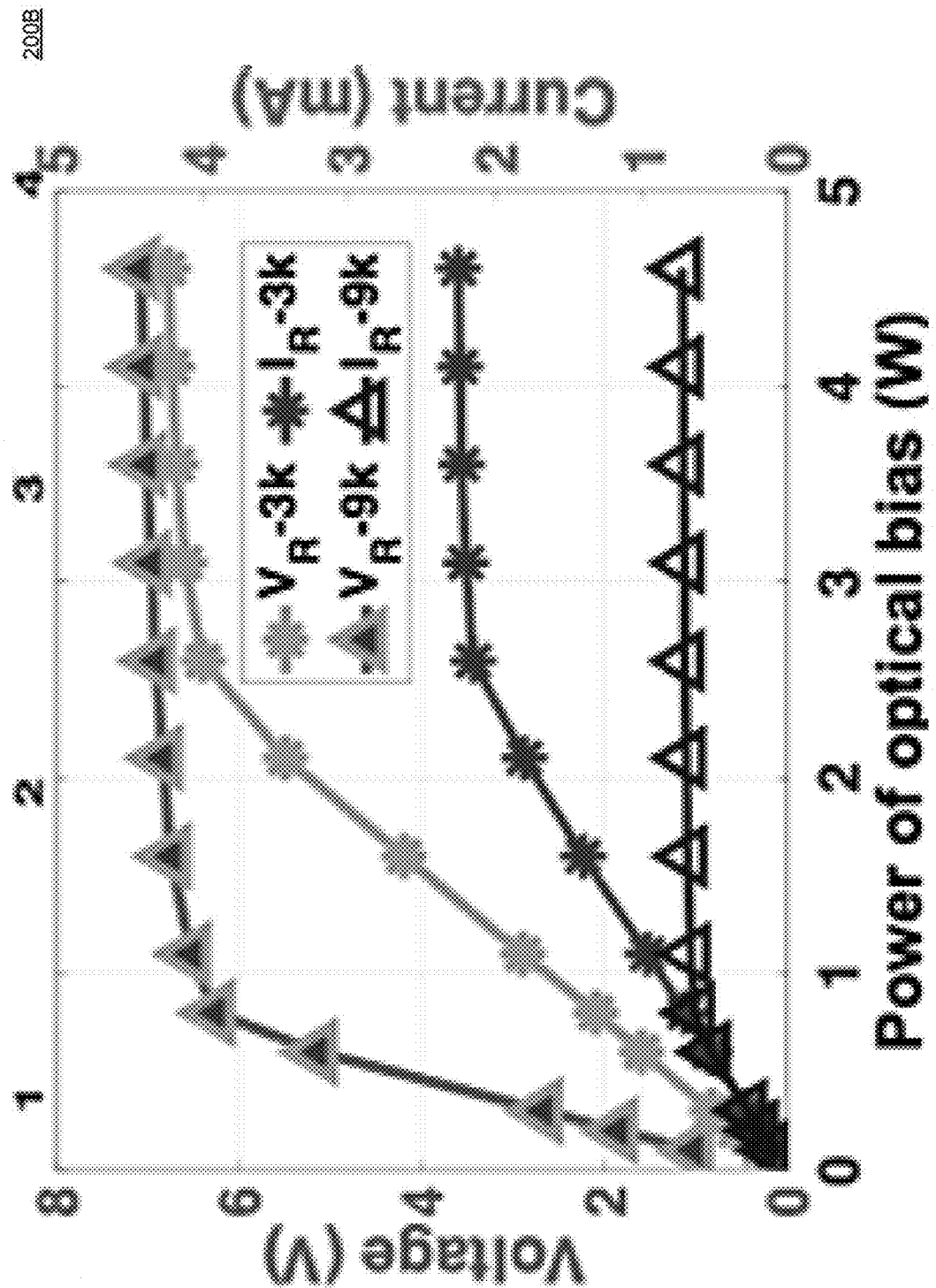

FIG. 2B illustrates a performance 200B of a remotely biased, controlled, and monitored optical switch using the architecture provided in FIG. 1, according to some implementations. In FIG. 2B, we connect two different resistors (i.e., 3 kΩ and 9 kΩ) to these 16 PDs and measure the voltage and current of the resistor. This figure shows that by using different resistors as loads for the optically induced voltage, we can reach different voltages and currents. Similarly, voltage and current will be saturated at some optical powers.

Figure 2C:
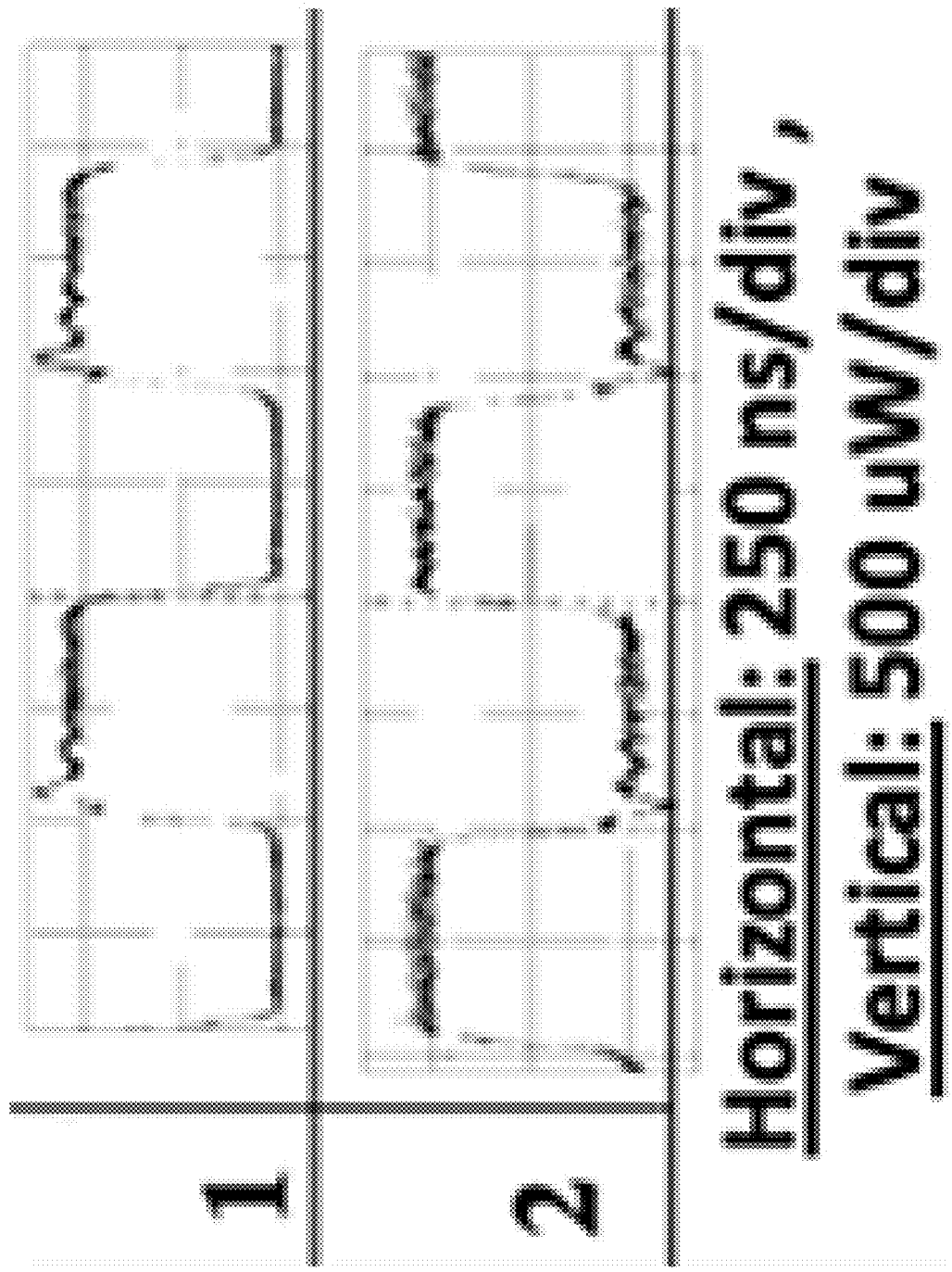

FIG. 2C illustrates a performance 200C of a remotely biased, controlled, and monitored optical switch using the architecture provided in FIG. 1, according to some implementations; In FIG. 2C, an oscilloscope is used to show the optical waveform at the output ports of the switch when the input of the switch is an unmodulated CW laser. Therefore, the waveform indicates the quality of the driven electrical control signal. The switching using a PD array has a noticeable overshoot which can be due to the internal capacitance of the arrays of PDs, which affects the time constant of the RC circuit.

Figure 2D:
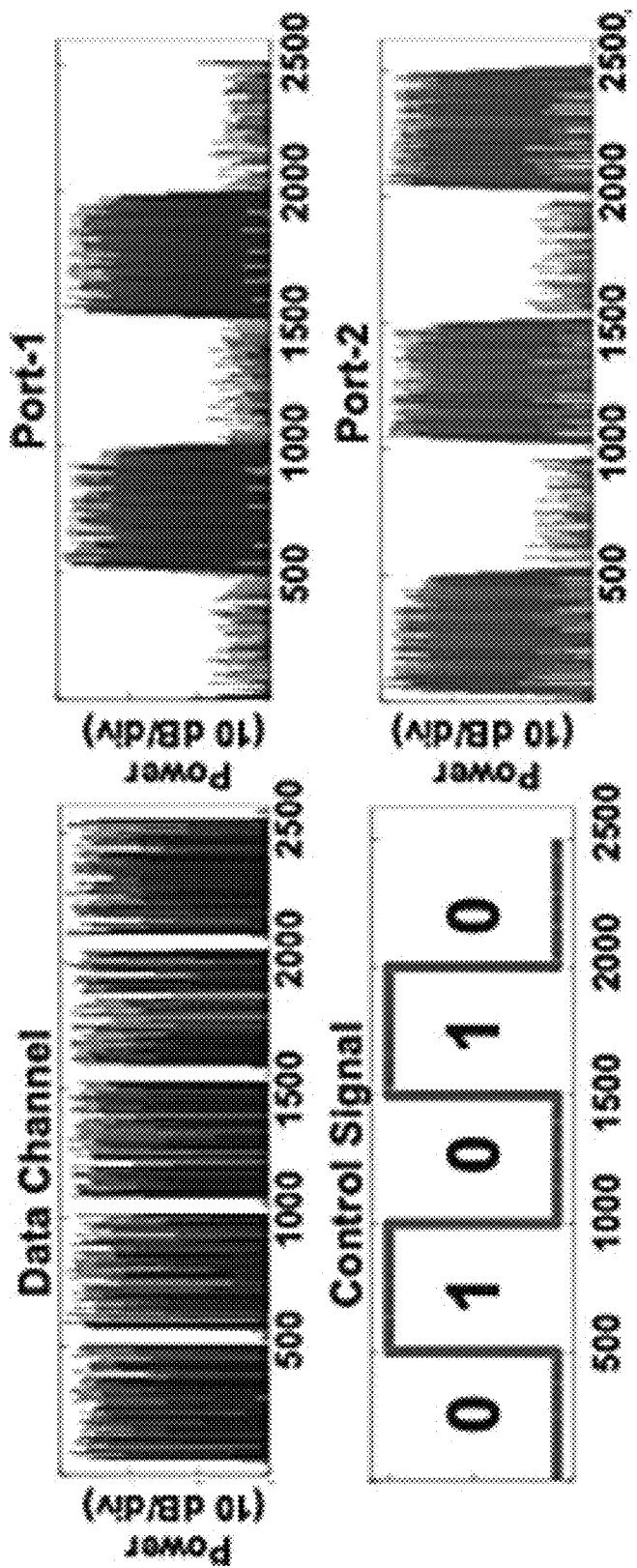

FIG. 2D illustrates a performance 200D of a remotely biased, controlled, and monitored optical switch using the architecture provided in FIG. 1, according to some implementations. FIG. 2D shows the switching function at the two ports of the MZI switch. For illustrative purposes, these outputs were taken for a 1 Gb/s OOK-modulated signal. All other data are taken when transmitting 20 Gbaud QPSK data rate. The transmitted data channel is shown in FIG. 2D, where each frame contains 450 data bits and 50 empty slots as a guard band for switching. Five frames are shown in FIG. 2D aligned with the switching control signal of 01010. From FIG. 2D, we observe that the data channel is directed to port 1 when the control is 1 and it is directed to port 2 when it is 0. Each of the output ports shows an extinction ratio of ~10 dB.

Figure 2E:
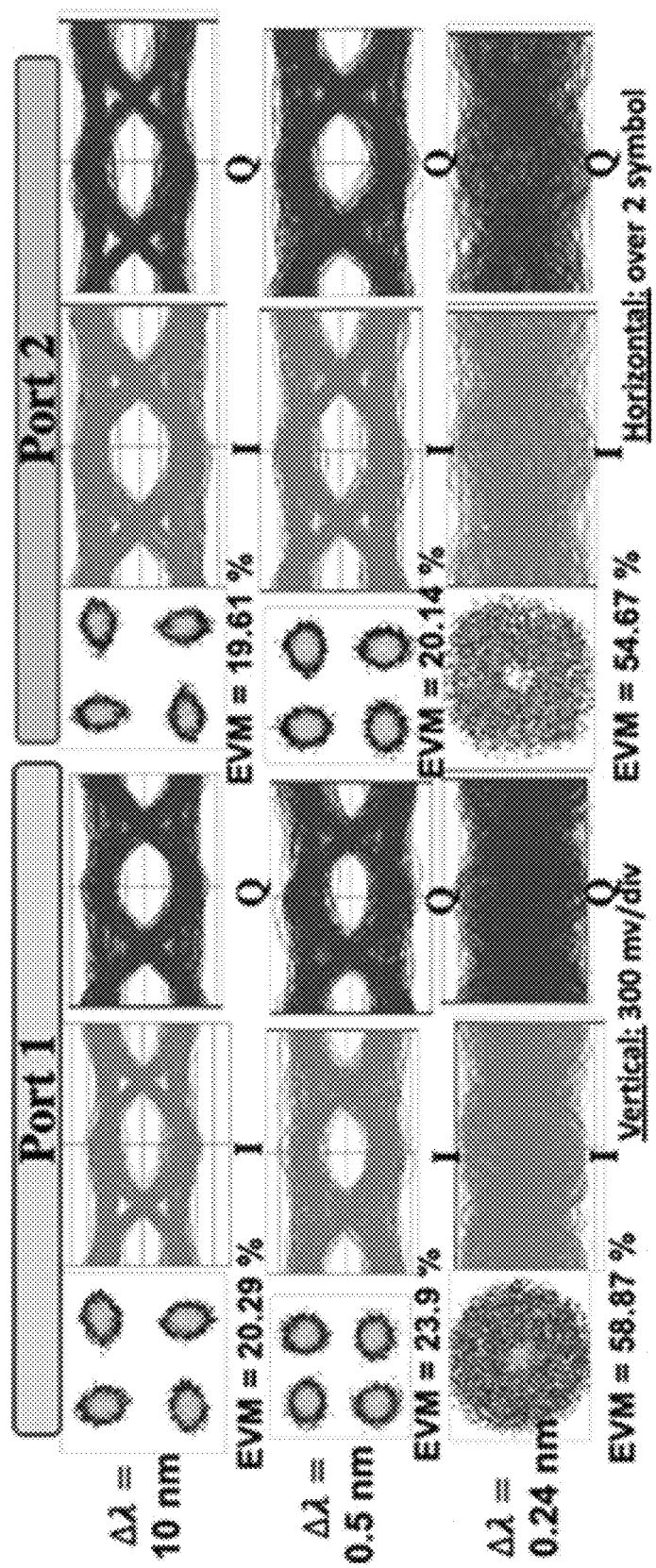

FIG. 2E illustrates a performance 200E of a remotely biased, controlled, and monitored optical switch using the architecture provided in FIG. 1, according to some implementations. FIG. 2E show the constellation and eye diagrams for a 20 Gbaud QPSK transmitted data for different wavelength separation between the control and bias power wavelength ($\Delta\lambda$). The EVM increases as the three waves are placed close to each other. This can be due to a combined effect of link nonlinearity and crosstalk between different spectral waves.

Remotely Controlled and Powered Tunable Optical 2-4 Tap Correlator of a 20-100 Gbit/s QPSK Channel Based on Laser Delivered Bias and Control Signals Various functions can be implemented at high-speed by utilizing OSP without the need for inefficient optical-to-electrical-to-optical conversion. One building block for such signal processing is the OTDL, which can achieve functions such as correlating an incoming data stream to a target symbol pattern. One example is the optical correlation of an incoming data stream to a target symbol pattern, wherein a high-speed data stream is compared to a target pattern and produces a correlation output. If the output exceeds a threshold, a pattern "match" will be detected. Importantly, both the amplitude and phase can be used to encode the data and target pattern, thereby increasing the number of bits per symbol for comparison. An example of an OTDL is a cascade of MZIs, as linear components for which each MZI has a delay in one arm and can produce multiple-tap functionality.

OSP nodes may be located at various locations in a network. However, many locations can be vulnerable to failure due to intentional or unintentional degradations. One operational challenge is the potential for power to be interrupted at the signal-processing site. Although the target pattern can be different due to the drift, degradation, or non-existent of the electrical bias voltages on the different MZIs. Thus, proper mixing, tunability, and operation monitoring can be challenging. An architecture can thus allow for an optical correlator that has no local power yet to be tuned, controlled (e.g., target pattern), and powered from a remote location. One tool that can be leveraged to achieve this remotely controlled and powered correlator might be the ability to power electrical elements from the output of a series of photodiodes that are driven from remotely located laser beams.

A computer implementing the systems and methods described herein may control and power tunable optical 2-4 tap correlator of a 20-100 Gb/s QPSK channel based on laser-delivered biases. A remote correlator based on a cascade of MZIs has been phase-controlled through the down-conversion of the light power sent from a distant location via an optical fiber link. A PD array has been utilized in photovoltaic mode to deal with the unavailability of local power at the correlator site. The delivered power to the correlator may be tuned and different target patterns may be tailored. When the optical power that is sent to the link increases, the stimulated Brillouin scattering (SBS) component of backscattered light from the fiber may become dominant which rapidly saturates the amount of power delivered to the correlator. This power insufficiency hampers the correlator from functioning on target patterns with larger phase shifts. This issue is further addressed by monitoring and managing the SBS and by adding an extra laser for carrying the optical power. In this manner, the power delivered through the link is boosted by ~13 dB when the SBS is suppressed. Another ~6 dB gain in the delivered power is obtained by adding a second laser. By having the PD array sufficiently powered, the correlator is shown to locate different target patterns at different baud rates from 10/50 Gbaud. Also, by adding an extra array of PDs, the correlator is shown to be able to identify target patterns with a longer length of 4 symbols.

Output constellation diagrams of the two-tap correlator for the 100-Gb/s QPSK signal. The target patterns of [$\pi/4$, $3\pi/4$] may be identified, where four symbols may be neglected between each target pattern symbol. To enable (i) finding different target patterns, the amount of optical power delivered via the link can be adjusted, and (ii) identifying target patterns with a longer length, an extra array of PDs can be added. Although when increasing the launched optical power, the stimulated Brillouin scattering (SBS) component of backscattered light from SMF may increase and rapidly saturate the amount of delivered optical power to the network node. This issue can also be addressed by suppressing the SBS by phase-modulating the laser sources to boost the delivered power.

Figure 3A:
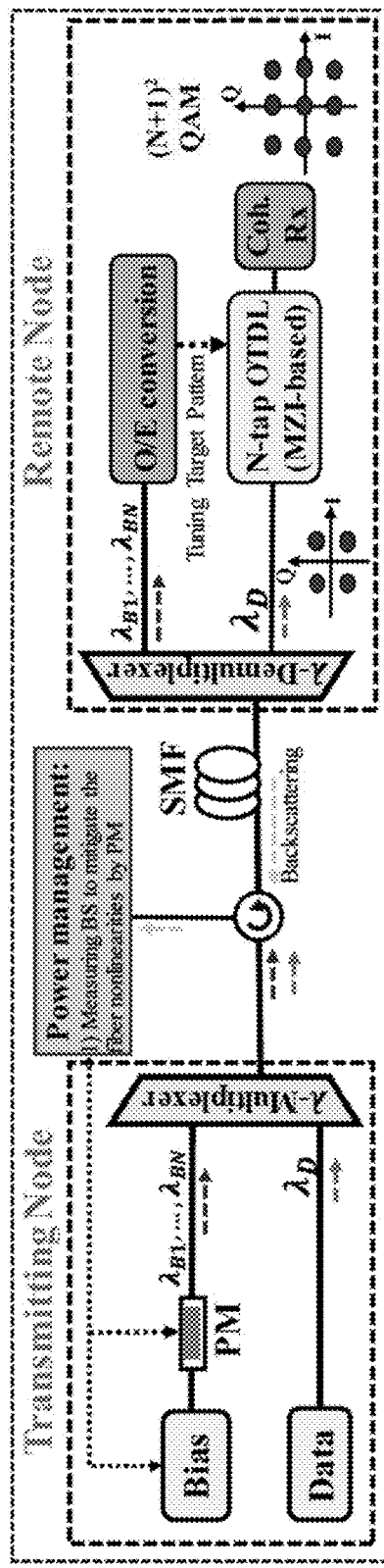
FIG. 3A illustrates a block diagram of implementing an optical correlator using Mach-Zehnder interferometers (MZIs), according to some implementations.

FIG. 3A illustrates a block diagram 300A of implementing an optical correlator using Mach-Zehnder interferometers (MZIs), according to some implementations. The correlator may be composed of MZI(s) and embedded phase shifter(s). An MZI with an embedded phase-shifter is equivalent to a 2-tap tapped-delay line which coherently mixes the delayed copies of the incoming QPSK signal with a complex coefficient. By considering that a single MZI has a delay time $\tau$ equal to an integer factor of a symbol time and the MZI phase-shift is $\pi/2$ or $\pi$ then a 2-tap correlator for QPSK signal results in a 9-QAM signal as schematically plotted in FIG. 3A. When the phase shift of the MZI (taps) matches the phases of two consecutive symbols, a peak at the output may be observed which corresponds to the constellation points at the top right corner. Likewise, by adding another MZI, a 4-tap correlator may be obtained since the input signal can traverse in four different paths as shown in FIG. 3A. This may result in a 25-QAM signal at the output.

Figure 3B:
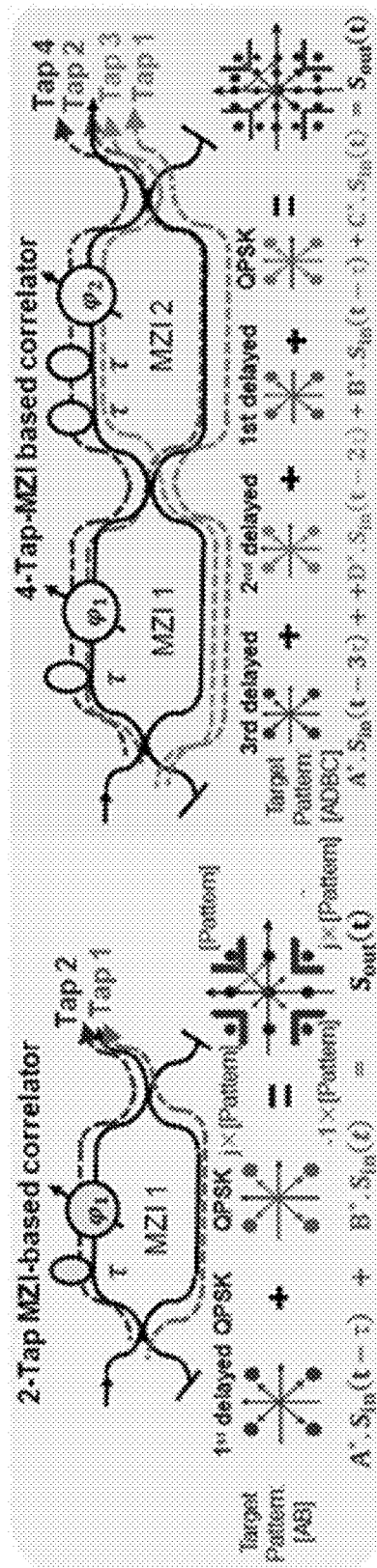
FIG. 3B illustrates a diagram of a remotely biased and controlled optical correlator using the architecture provided in FIG. 1, according to some implementations.

FIG. 3B illustrates a diagram 300B of a remotely biased and controlled optical correlator using the architecture provided in FIG. 1, according to some implementations. A conceptual block diagram of an implementation of a remotely controlled tunable optical correlator is shown in FIG. 3B, according to some implementations. A transmitter may send a QPSK-modulated data channel along with multiple CW laser wavelengths to an optical link to deliver power to a remote correlator without access to local power. At the correlator site, the power of lasers is captured through arrays of PDs operating in photovoltaic mode. The powered PDs provide different bias values for the phase shifters of a correlator to enable it to recognize different target patterns within the incoming QPSK signal. The amount of power delivered via the link can specify the target pattern of interest. The backscattering is measured and minimized through a power management unit in the transmitter. Based on the phase shift of the correlator's taps, different laser sources may be switched on or off at the transmitter.

Figure 4:
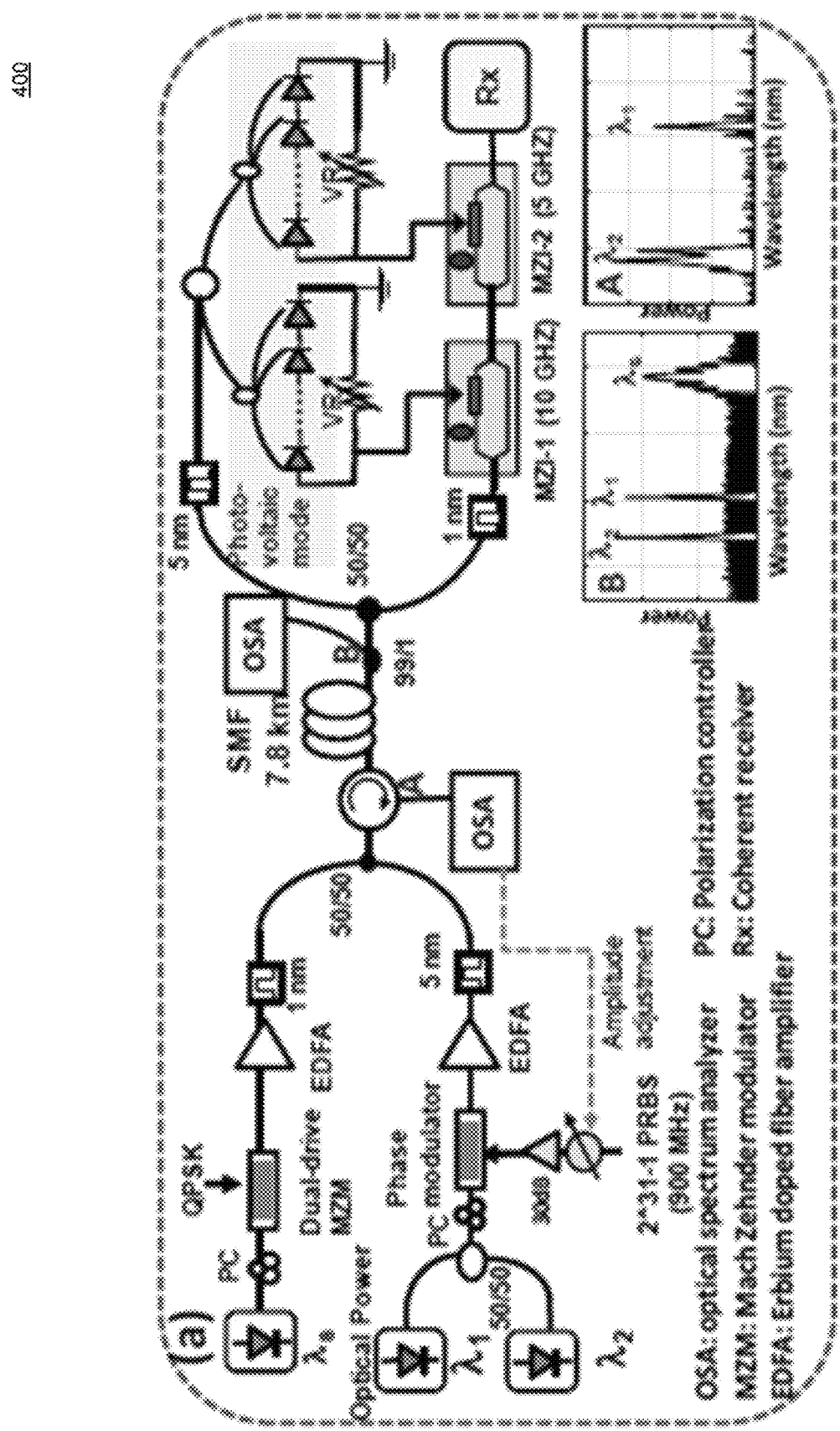
FIG. 4 illustrates an implementation of a remotely controlled tunable optical correlator based on the architecture, according to some implementations.

FIG. 4 illustrates an implementation of a remotely controlled tunable optical correlator based on the architecture, according to some implementations. Referring first to FIG. 4, a laser at $\lambda_S$=1549.5 nm may be modulated with 10, 20, 40, and 50 Gbaud data streams and sent to a 7.8 km long SMF. The lasers at $\lambda_1$=1544.5 nm and $\lambda_2$=1546.1 nm may be phase modulated by a $2^{31}$-1 pseudo-random bit sequence (PRBS), amplified by a tunable optical amplifier and may be sent to the SMF. A circulator at the input of the SMF captures the backscattered light. The backscattered power is monitored to tune the RF drive of the phase modulator to minimize this power. At the output of the fiber, the multiplexed wavelengths may be separated. The data channel feeds a series cascade of MZIs; MZI-1 with a free spectral range (FSR) of 10 GHz and MZI-2 with an FSR of ~5 GHz. The waves at $\lambda_1$ and $\lambda_2$ drive two arrays of 15 PDs in series and operating in photovoltaic mode. The voltage and current built up by the PDs drive the MZIs. The backscattered light from the CW power wavelengths can limit the amount of power delivered to the PD arrays despite increasing the input power.

Figure 5A:
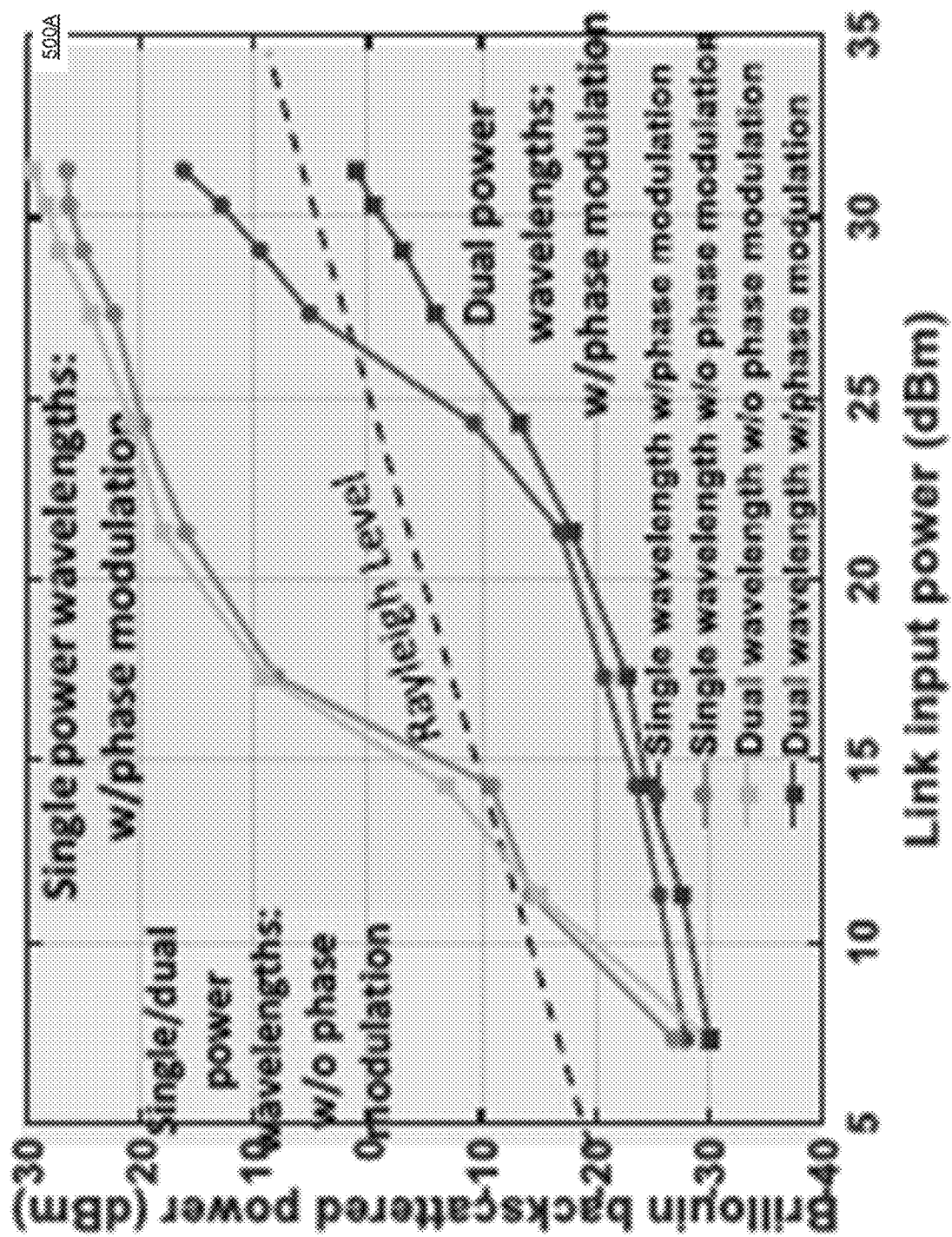
FIGS. 5A-C illustrate output power plots of a remotely controlled tunable optical correlator based on the architecture, according to some implementations.
Figure 5B:
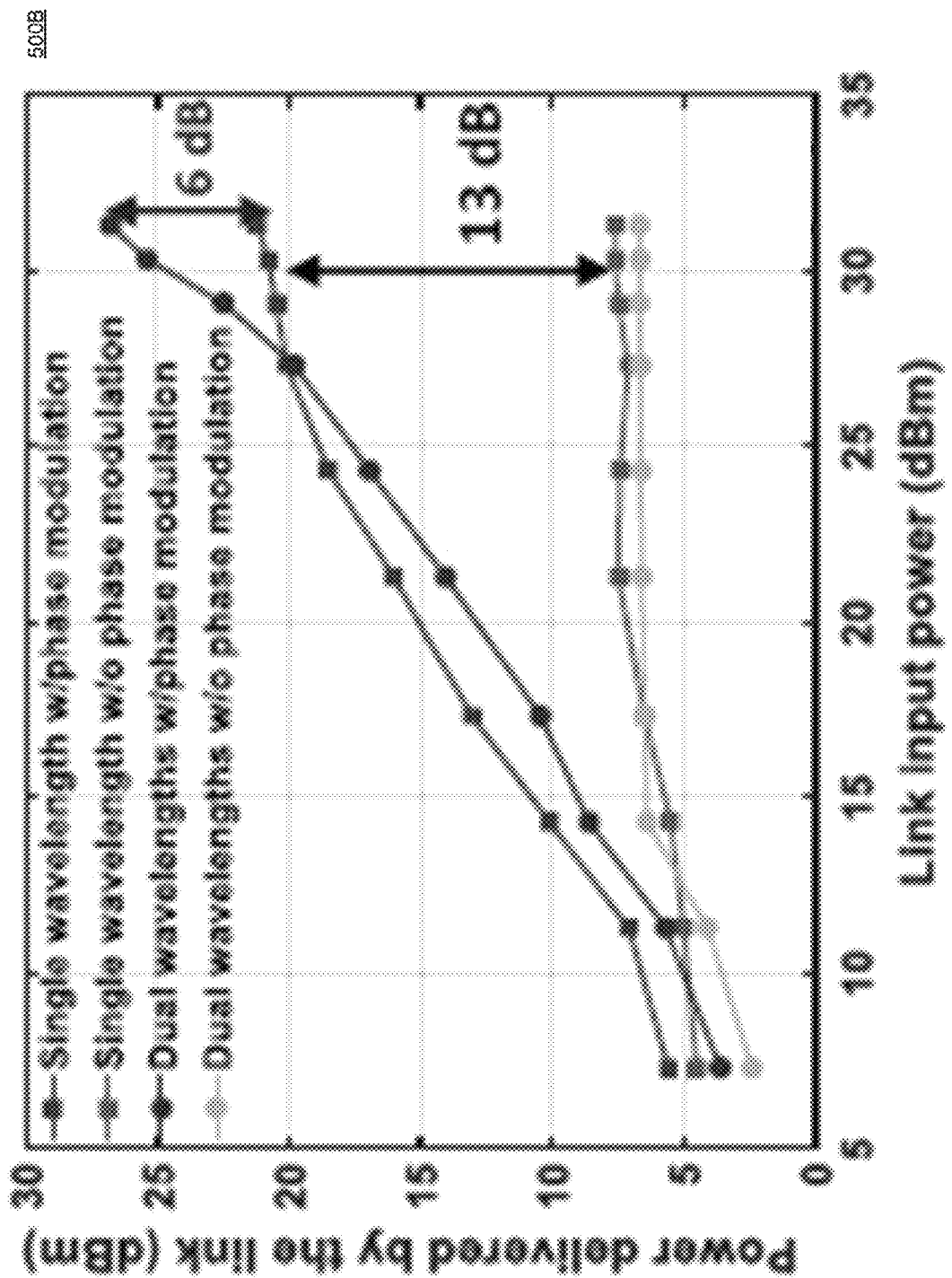
Figure 5C:
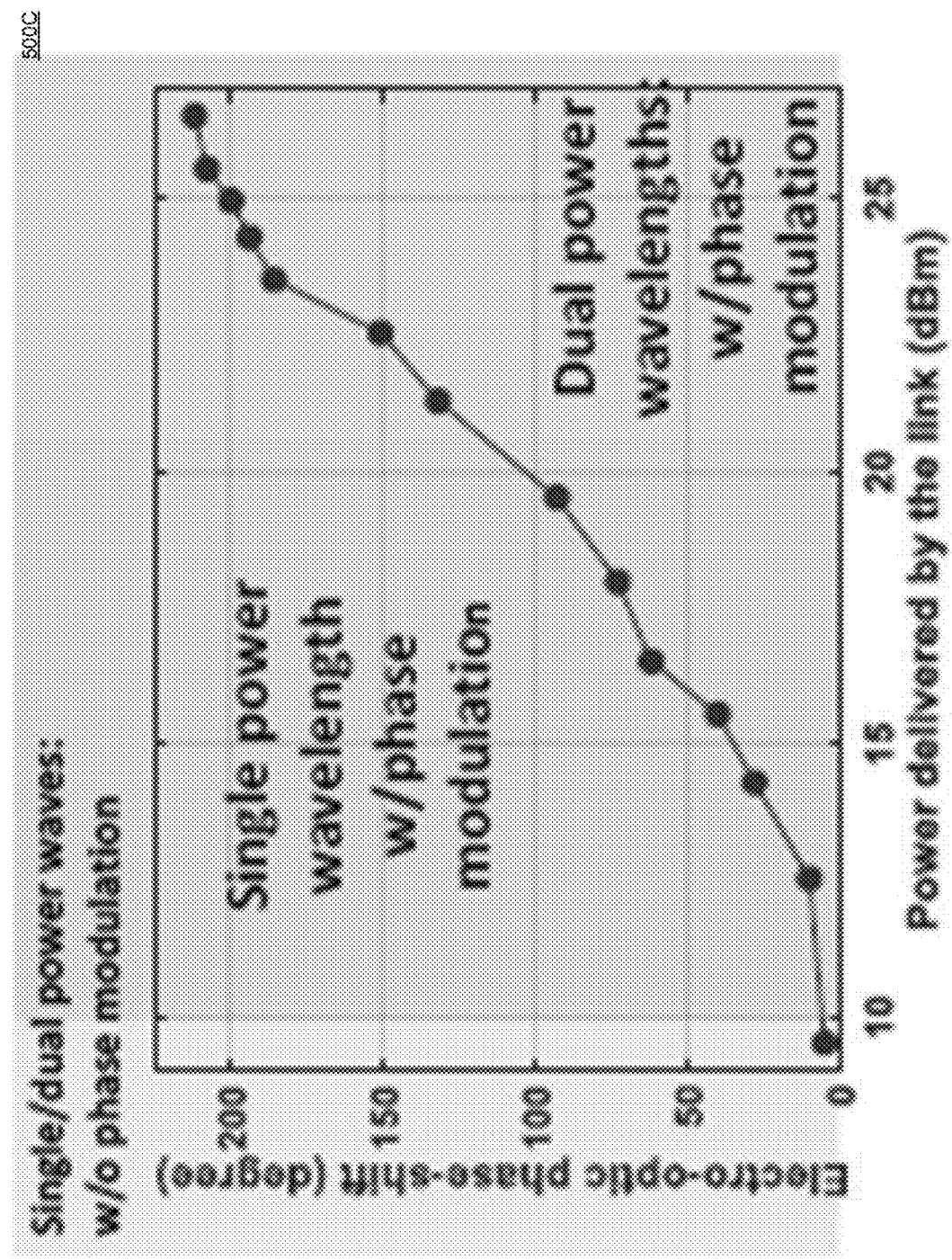

FIGS. 5A-C illustrate plots, including measured Brillouin backscattered power vs. link input power 500A in FIG. 5A, measured link output power vs. link input power 500B in FIG. 5B, and phase-shift of the MZI vs. link output power 500C in FIG. 5C. As can be seen in FIGS. 5A-B, phase modulation with a tuned RF drive can suppress the Stokes component of SBS, thereby increasing the delivered power by 13 dB. Further increasing of the optical power may saturate the output power again at an increased level of 21 dBm (FIG. 5B). This corresponds to the point that the Stokes component reaches the Rayleigh level, which according to FIG. 5A occurs at an input power of ~26 dBm. As shown in FIG. 5B, by adding another phase-modulated laser, a 6 dB boost in delivered power is observed. FIG. 5C shows different power intervals within which the MZI can be derived by one or two lasers and with or without phase modulation to obtain a specific amount of phase shift. The margins of these intervals correspond to the power at which the Stokes component reaches the Rayleigh level. As evident from FIG. 5C, a total power of ~18.5 dBm from a single laser source is required for the PD arrays to generate a phase shift of $\pi/2$ on the MZI arm. The system requires a total power of ~23 dBm using two lasers to induce a phase shift of $\pi$.

Figure 6:
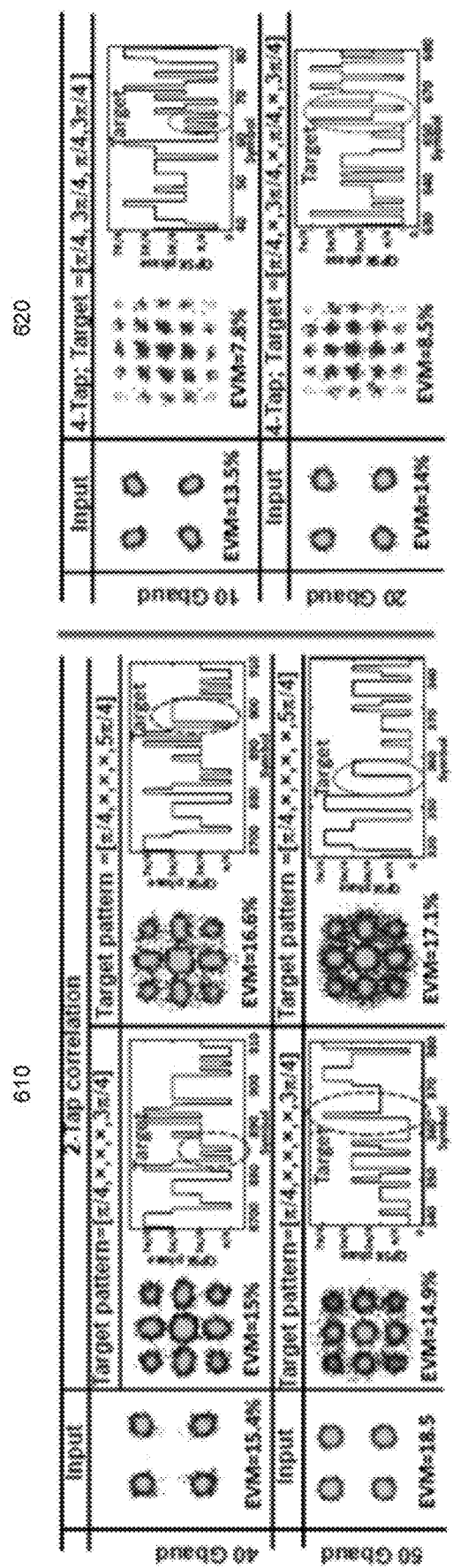
FIG. 6 illustrates input and output constellation diagrams and target patterns for a 2-tap and 4-tap correlator and different baud rates, according to some implementations.

FIG. 6 illustrates input and output constellation diagrams 600, target patterns for a 2-tap 610 and 4-tap correlator 620, and different baud rates, according to some implementations. The results may be obtained for different baud rates and target patterns using one or two MZIs. For the 4-tap correlator, the target pattern of [$\pi/4$, $3\pi/4$, $3\pi/4$] (corresponds to a phase-shift of $\pi/2$ for MZI-1 and 0 for MZI-2) is correlated with a 10-Gbaud QPSK signal. The corresponding symbol series and the location of the target pattern are shown in FIG. 10. The input power for the PD array is ~17 dBm which produces a voltage of 0.8 V and a current of 0.15 mA. For 20-Gbaud, the two MZIs still function as a 4-tap correlator, however, there will be a symbol neglected between each target pattern symbol. This is also true for the results of the 2-tap correlator using a single MZI (FSR=10 GHz) and QPSKs at 40 and 50 Gbaud. Here, the correlator looks for target patterns of [$\pi/4$, $3\pi/4$] and [$\pi/4$, $3\pi/4$] where three or four symbols may be neglected for the 40 and 50-Gbaud systems, respectively. For the pattern [$\pi/4$, $3\pi/4$] a single laser is used which produces a voltage of 1.1 V and a current of 0.18 mA. For [$\pi/4$, $3\pi/4$] two lasers may be used to deliver a power of 25.5 dBm and generate a voltage and current equal to 1.8V and 0.23 mA.

Figure 7:
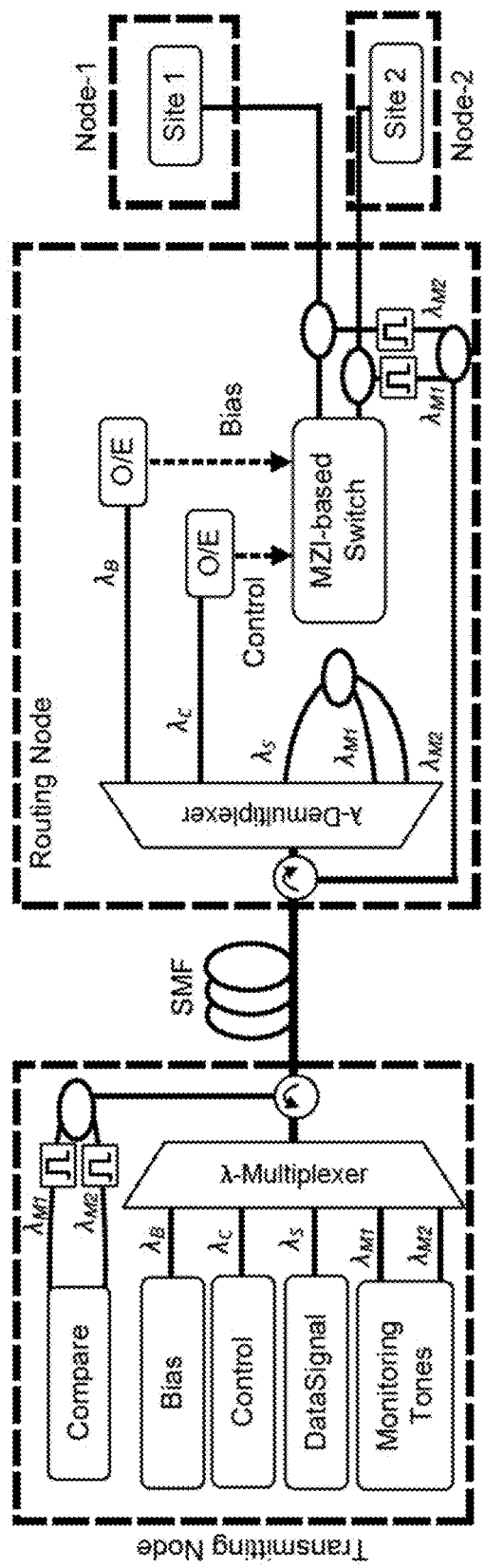
FIG. 7 illustrates a remotely powered, controlled, and monitored optical switching system, according to some implementations.

FIG. 7 illustrates a remotely powered, controlled, and monitored optical switching system 700, according to some implementations. The data signal at $\lambda_S$, the control signal at $\lambda_C$, the optical power at $\lambda_B$, and the monitoring tones at $\lambda_{M1}$ and $\lambda_{M2}$ are combined using a wavelength multiplexer into a single-mode fiber (SMF) to be transmitted to a remote location. A wavelength demultiplexer can be used to separate wavelengths at the remote site. The signal and monitoring tones are coupled into the same fiber and sent into the input port of the MZI-based optical switch. The switch can direct its input to either of the two output ports, depending on the control signal. Optical-to-electrical (OE) conversion of the transmitted optical control signal can be done using PDs. Subsequently, the electrical signal drives the control pins of the switch. An MZI-based switch also requires a bias voltage to adjust its transmission characteristics. Since the purpose of this Letter is to avoid the use of a local electrical supply, the optical power is transmitted at $\lambda_B$ and OE converted for the switch bias pins. The bias drift of the MZI-based switch is monitored using the transmitted monitoring pilot tones and then adjusted by changing the transmitted optical power. Moreover, by comparing the monitoring tones at the two output ports of the switch, the switch state (bar/cross) can be observed.

Figure 8A:
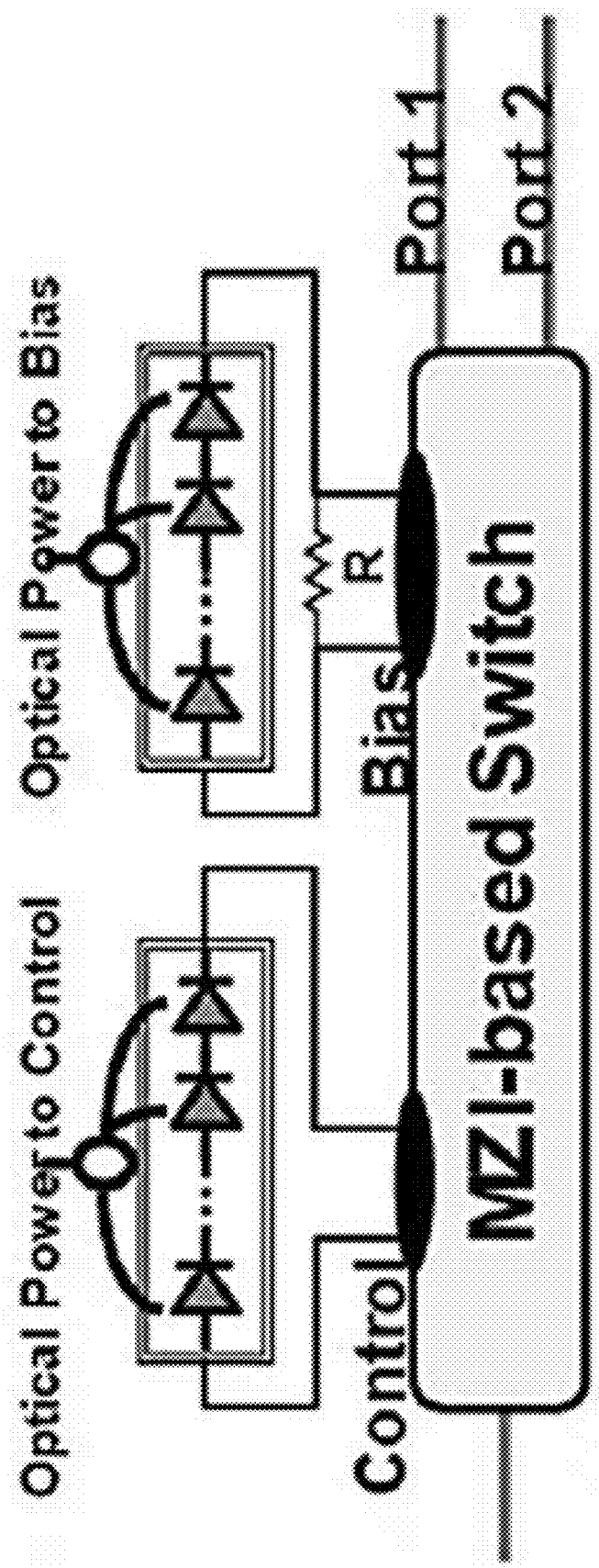
FIG. 8A illustrates an implementation of an optical switch, according to some implementations.
Figure 8B:
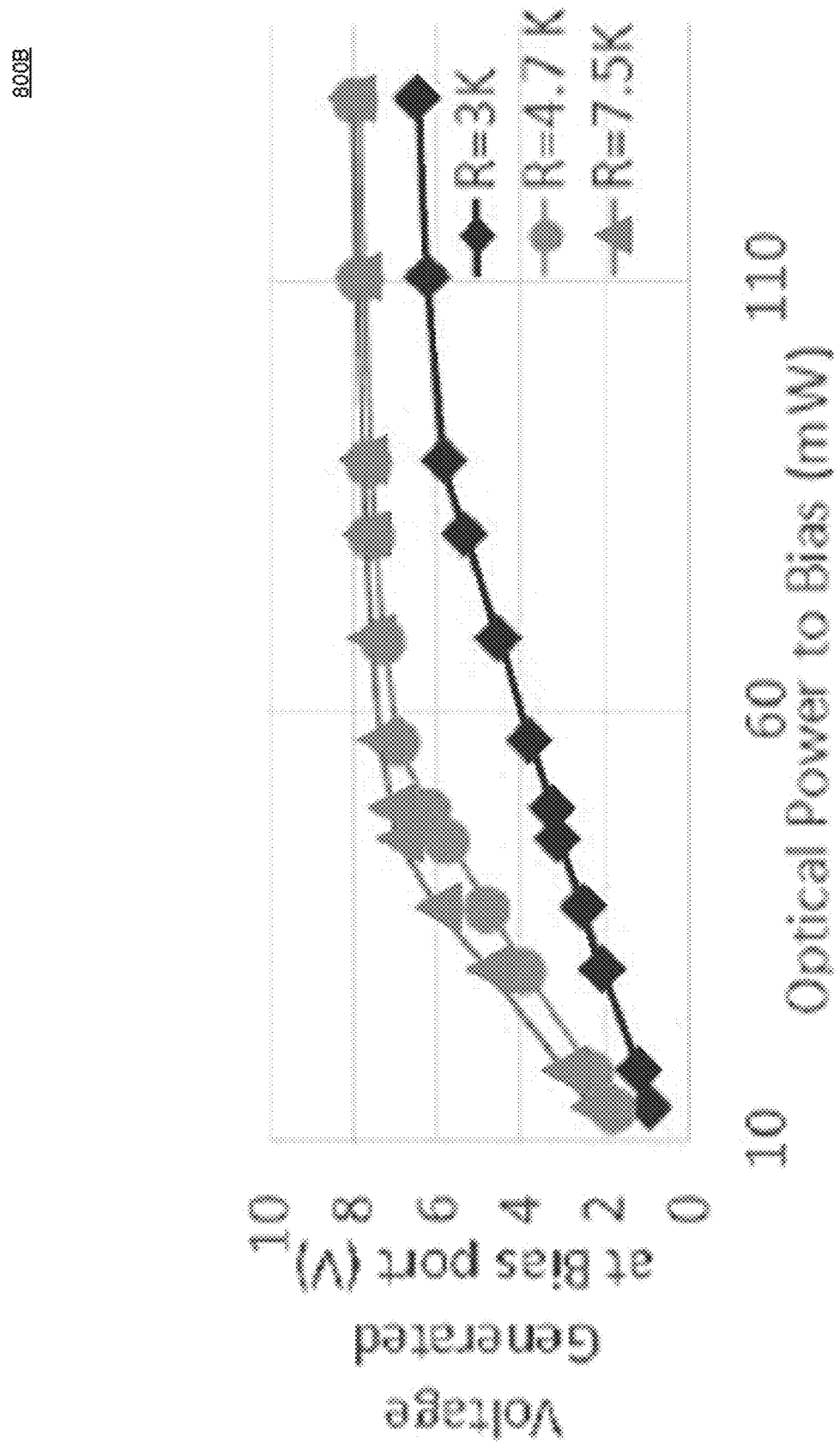
FIGS. 8B-H illustrates output power graphs corresponding to an implementation of an optical switch, according to some implementations.
Figure 8C:
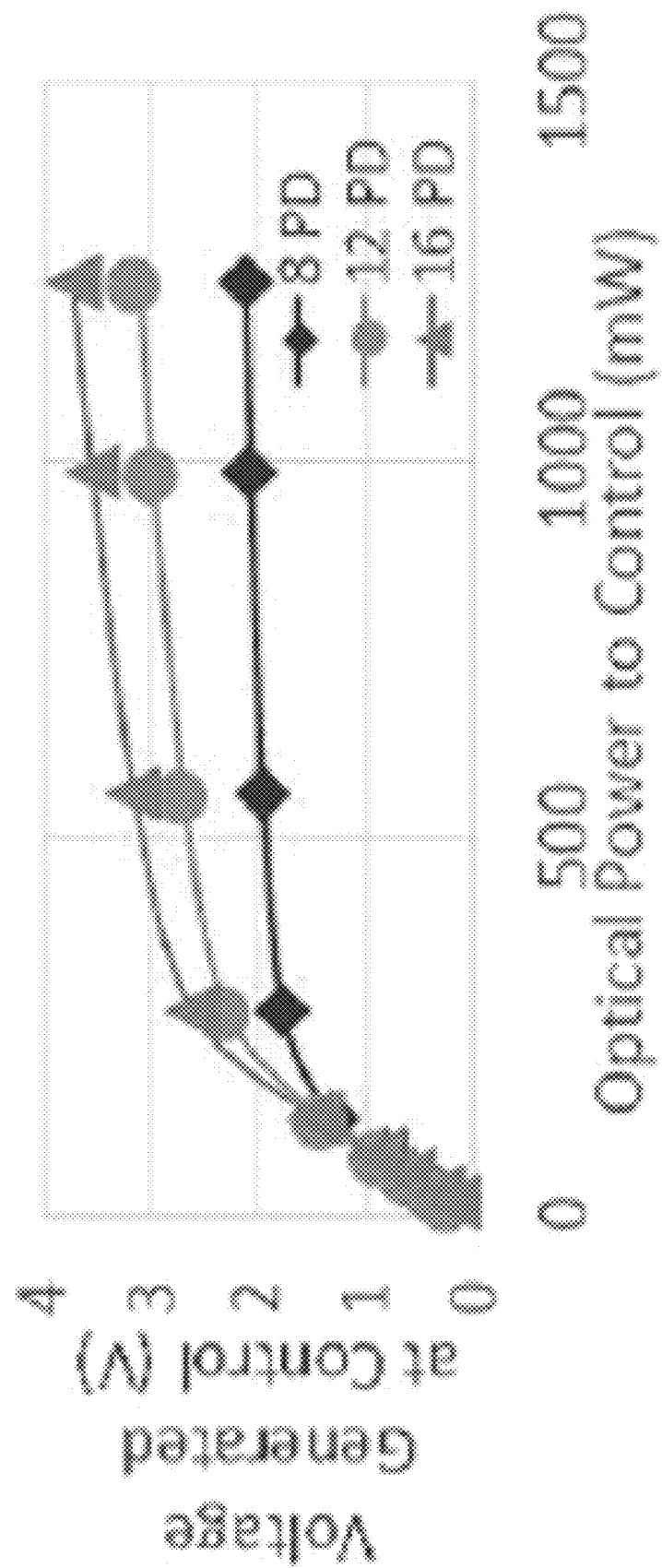
Figure 8D:
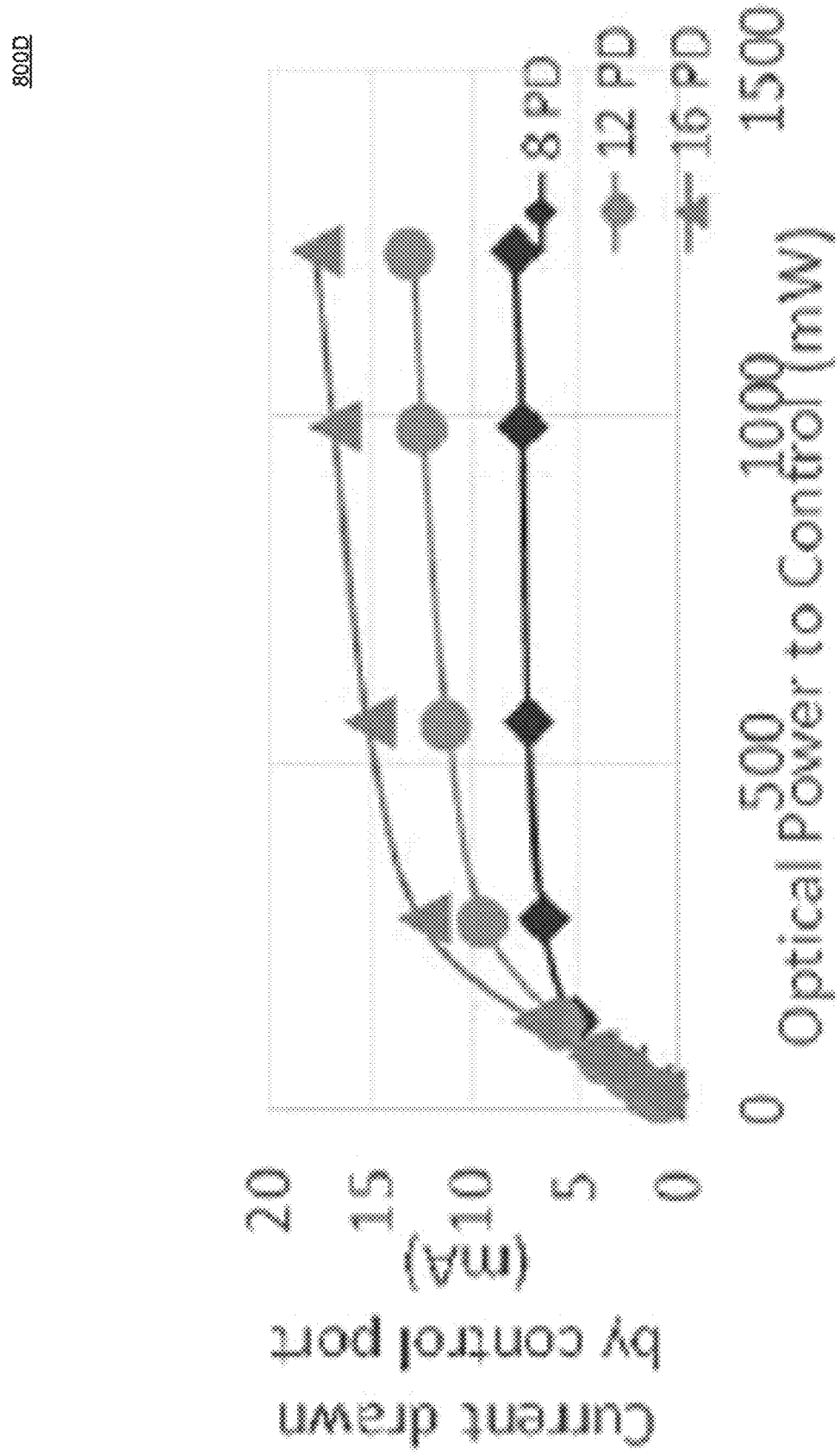
Figure 8E:
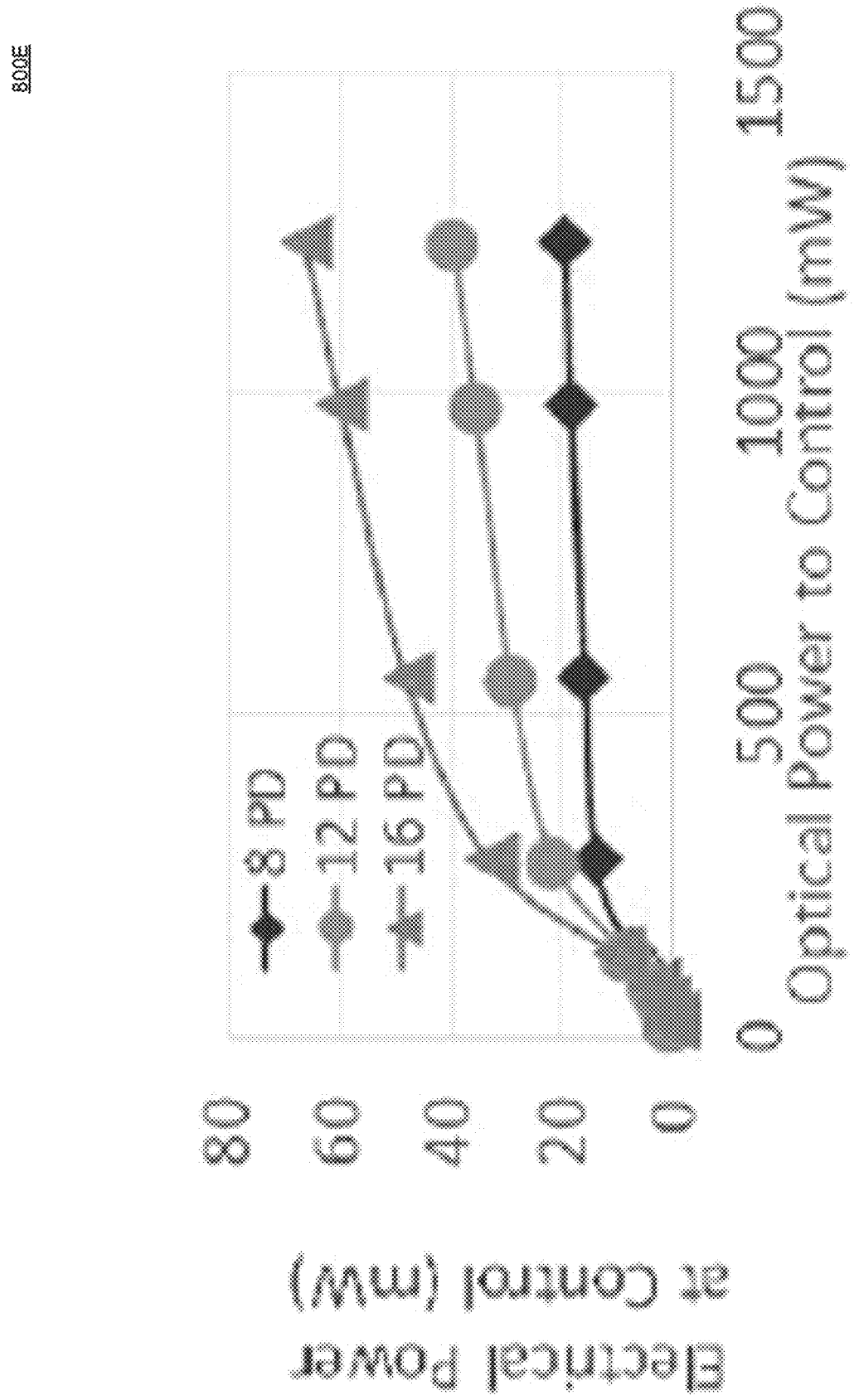
Figure 8F:
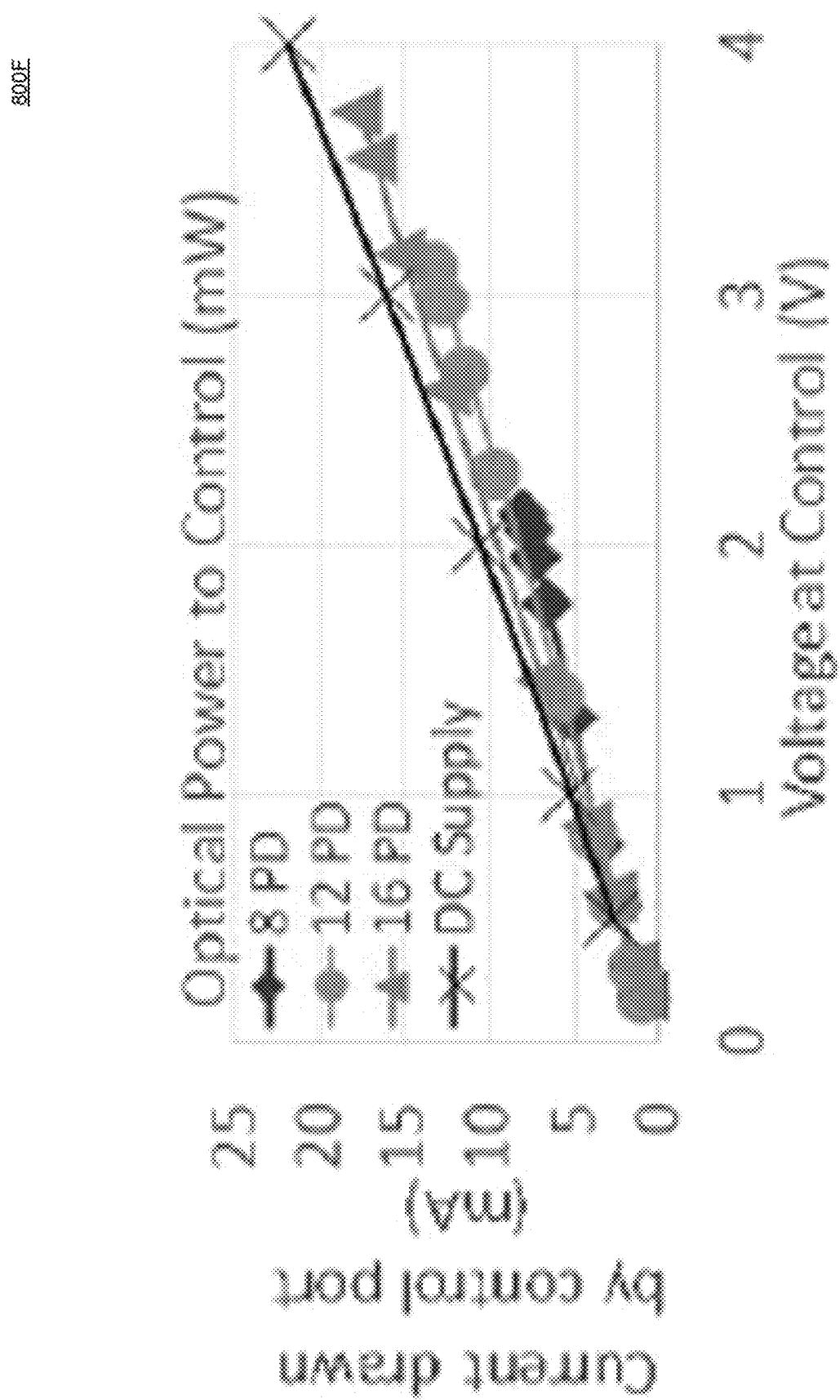
Figure 8G:
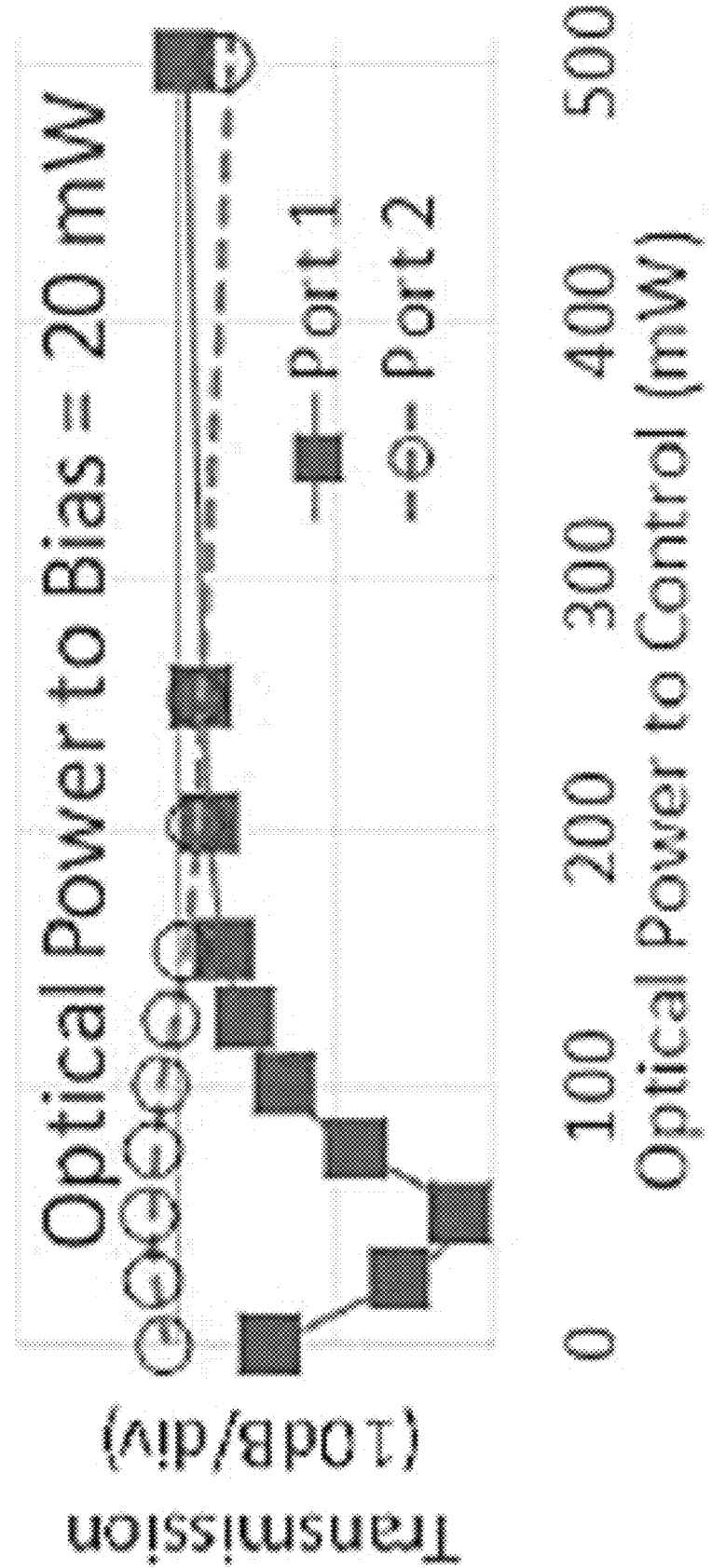
Figure 8H:
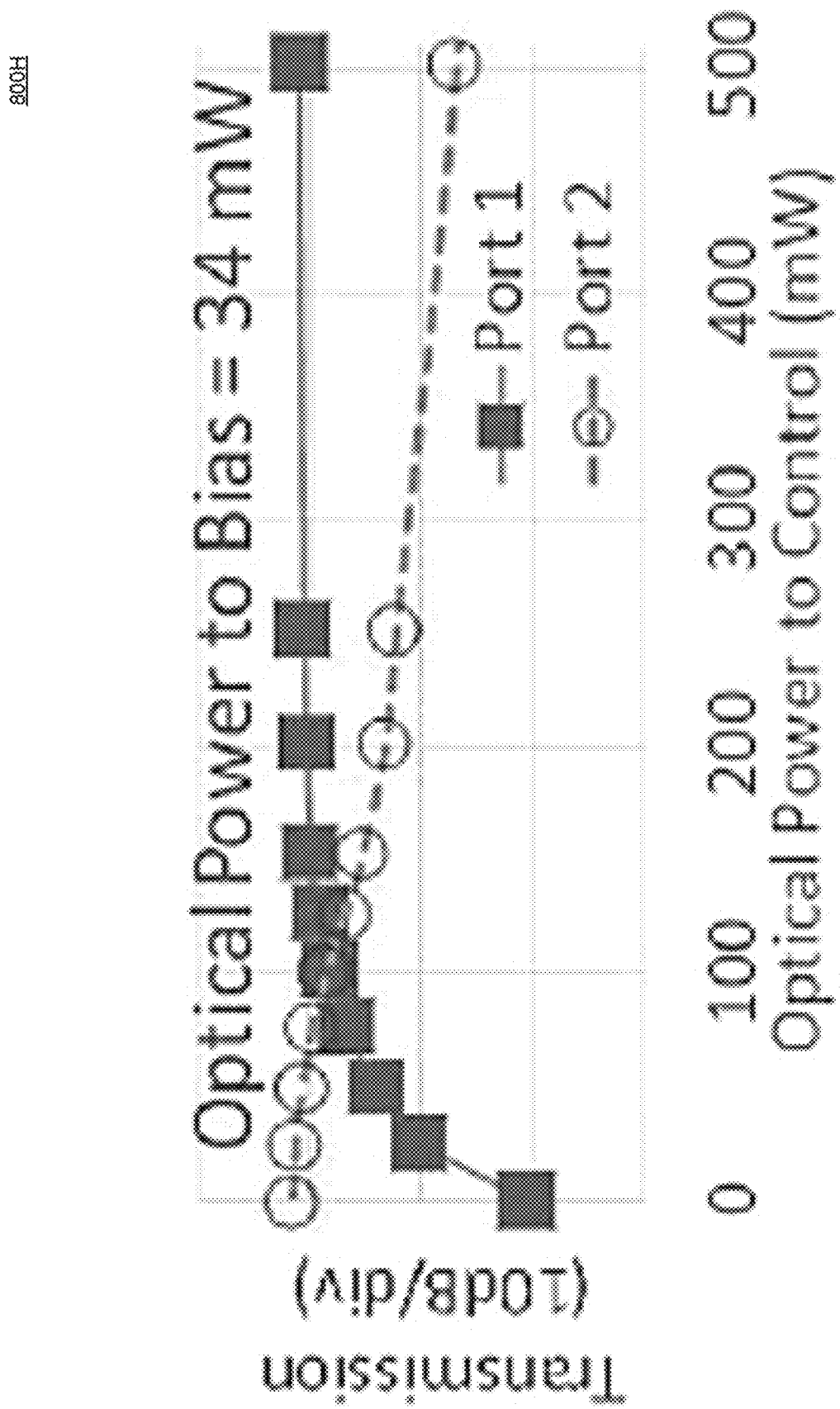

FIG. 8A illustrates a schematic of an implementation of an optical switch, and FIGS. 8B-H illustrate corresponding output power graphs, according to some implementations. FIGS. 8A-H show the characterization of a 1×2 MZI switch and OE conversion using a series of PDs for control and bias. FIG. 8A illustrates a schematic of the optical switch connected with PDs 800A. FIG. 8B illustrates plots of generated voltage at bias port 800B. FIG. 8C illustrates generated voltage 800C. FIG. 8D illustrates current 800D. FIG. 8E illustrates power at the control port 800E. FIG. 8F illustrates a comparison 800F of the current drawn by the control port of the switch when the DC power supply is used (no current limit), where PDs may be used. FIGS. 8G and 8H illustrate switch characterizations when the optical power is sent to 16 PDs (to the input of the optical splitter) for the bias and control ports 800G and 800H in FIGS. 8G-H. The same 1×16 splitter with an insertion loss of approximately 13 dB may be used in the cases of 8, 12, and 16 PDs.

An MZI switch may utilize the electro-optic (EO) effect in a lithium niobate (LiNbO3) waveguide. A CW laser may be amplified and fed via an optical splitter to 16 PDs, which may be connected in series. By providing the optical power to the PDs, they may operate in photovoltaic mode and generate photocurrent that can be turned into electrical voltage using a resistor. FIG. 3(b) shows the generated voltage at the bias port by inserting three different resistor values (e.g., 3, 4.7, and 7.5 KΩ) in parallel with the switch high-impedance bias input. Higher resistor values result in a higher output voltage which may be capped for a single PD by its turn-on voltage of ~0.5 V for the InGaAs PD in use. Increasing the optical power may also increase the generated voltage and connect multiple PDs in series. The figure shows the 16 PDs connected in series using a 7.5 KΩ resistor resulting in the generated voltage range of ~2-8 V for 10-60 mW optical power.

OE conversion may also be used for the control port. However, the input impedance is low, resulting in a proportionally lower output voltage. Increasing the incident optical power may help if the PD does not reach saturation, which can be caused by the depletion of available electron—hole pairs. FIGS. 8C-E show the measured dependence of the voltage, current, and electrical power at the control port on the incident optical power. The optical power required to achieve the same generated voltage at the control port may be higher than at the bias port. This indicates that the OE conversion efficiency (e.g., the ratio of generated electrical voltage to the transmitted optical power) at the control port is relatively low. This might be because (1) the impedance at the control port (50Ω) may be much smaller than that at the bias port (~7.5 kΩ), and (2) the generated voltage at the control port tends to be relatively lower than the voltage at the bias port with the same input optical power. FIG. 8F compares the generated voltage and current using the PDs with the voltage and current supplied by a standard DC power supply. The transmission characteristics of the two output ports of the MZI switch are demonstrated in FIGS. 8G-H for different bias voltages generated by optical power. By comparing FIGS. 8G and 8H, the impact of the bias voltage on the switching characteristics can be observed, proving the ability to optically control the switch to compensate for drifts in the MZI.

The power consumption of the remotely optically biased and controlled switch may be mainly due to (1) the insertion losses of optical elements and the fiber propagation loss and (2) the inherent characteristics (e.g., low input impedance and high biasing voltage) of the MZI switch. To reduce this power consumption, one can (1) use low-loss fiber or implement power-efficient components on a chip, (2) customize the optical switch with higher input impedance at the control port, or (3) reduce the half-wave switch voltage (14) to be triggered at a lower voltage level.

Figure 9:
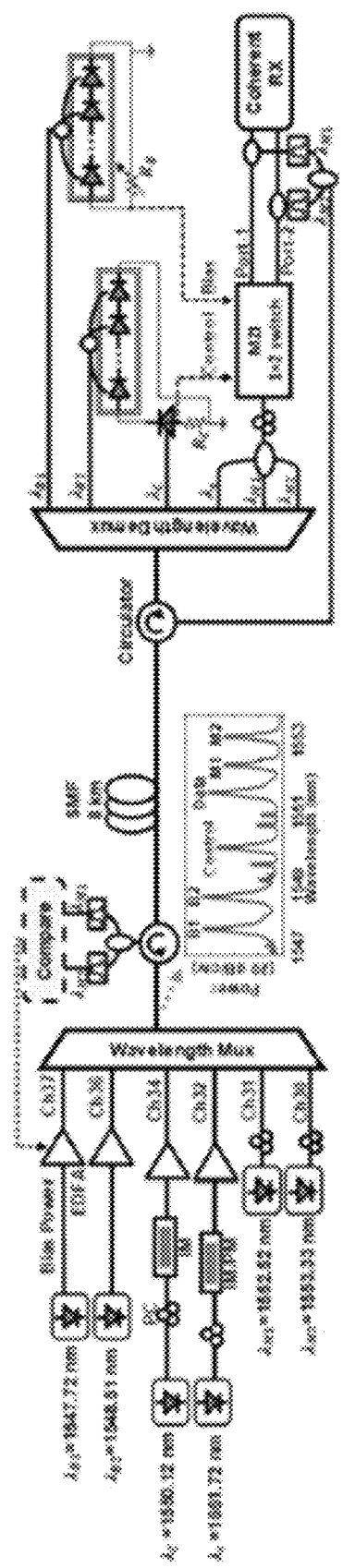
FIG. 9 illustrates an implementation of an optical switch, according to some implementations.

FIG. 9 illustrates a schematic of an implementation of an optical switch 900, according to some implementations. FIG. 9 shows the implementation, in which PC means polarization controller; IM means intensity modulator; and PM means phase modulator. Six lasers may be used in total, two for providing the required bias optically, one for the control signal, one for the data signal, and two for monitoring the operation state. Two lasers on wavelengths of $\lambda_{B1}$=547.72 and $\lambda_{B2}$=1548.51 nm may be amplified by erbium-doped fiber amplifiers (EDFAs) to provide the optical power supply for the switch bias and control ports, respectively. The output power can be adjusted to determine the bias voltage at the remote location. The switching control signal may be intensity modulated on another laser with a wavelength of $\lambda_C$=1550.12 nm. A data channel may be generated using either a 1 Gb/s on-off keying (OOK) or a 40 Gb/s QPSK transmitter at the wavelength of $\lambda_S$=1551.72 nm. Two pilot tones at $\lambda_{M1}$=1552.52 and $\lambda_{B1}$=1553.33 nm may be transmitted to monitor the state of the optical switch. An 8×1 wavelength multiplexer may be used to multiplex dense wavelength division multiplexing (DWDM) ITU channels 30-37 into an 8 km SMF. Two optical circulators can separate the upstream and downstream waves in the bidirectional link.

To enable remote optical biasing, controlling, and monitoring compared with the local counterpart, the data signal may experience extra insertion losses of the optical components in the path. To overcome this, the remote optical power can be increased. However, by doing so, (1) the optical data signal may suffer from higher noise due to increasing the gain of optical amplifiers, and (2) it is possible that when the backscattering effect becomes dominant, the amount of power delivery to the switch may be saturated.

For example, the data signal can lose ~9 dB of its power because two splitters were used: one before and one after the switch (6- and 3-dB losses, respectively). The bias and control signals experienced ~12 dB loss (mux and demux ~6 dB, two circulators ~2 dB, and the loss of forward propagation in an SMF ~4 dB). In the monitoring tones, there is an additional loss of ~20 dB (two splitters and two combiners ~15 dB, circulator ~1 dB, and the loss of backward propagation in an SMF ~4 dB). A potential solution to reduce this high insertion loss could be to replace the splitters, combiners, and filters with demux and mux.

At the remote location, a 1×8 wavelength de-multiplexer may be used to separate six wavelengths. The data signal and monitoring tones may be combined and sent into the input port of the optical switch. Depending on the control signal, the input may be directed to either port 1 or port 2. To allow for high-speed control of the switch, the control signal at $\lambda_C$ may be coupled into an InGaAs PD that operates in photoconductive mode. The required reverse bias may be provided by optical power at $\lambda_{B2}$, which may be fed into an array of 16 PDs. The optical power at $\lambda_{B1}$ may be fed into another array of 16 PDs, generating the voltage for the bias port of the optical switch. The characterization of the switch and array of PDs are given in FIG. 7. At the output ports, the data signal may be filtered and transmitted to a coherent receiver, while the monitoring tones are filtered and sent back to the transmitter for comparison and adjustment of the bias power.

An unmodulated CW laser may be sent into the switch to examine the optically activated control's quality. FIG. 5 includes plots of (a) a captured waveform at two output ports of the switch when the input is an unmodulated CW laser, and the control signal OE is converted using an electrical DC power supply and PDs; (b) a 1 Gb/s OOK input data channel; (c) a control signal; and (d) and (e) a switch output when the OE-converted control signal and bias drive it. The received waveform at the output ports are shown in FIG. 5(a), captured by a sampling oscilloscope. An intensity modulator may be employed for the control signal to generate an optical square wave at 1 MHz. At the remote location, the control signal may be converted to an electrical signal and fed into the control port of the switch. To evaluate the quality of the OE-converted control signal, three cases for the power supply are: (1) using a local electrical DC power supply, (2) using 16 PDs, and (3) using 12 PDs. As expected from FIG. 3(f), using 16 PDs outperforms 12, and the DC power supply leads to a higher peak-to-peak voltage amplitude. Furthermore, a rise time of ~50 ns and a higher overshoot at the switching time may be observed in the case of using PDs. This may be because the PDs in photovoltaic mode have higher internal capacitance, affecting their performance.

FIGS. 10A-E illustrate the output of control signals and waveforms corresponding to an implementation of an optical switch, according to some implementations. FIGS.

Figure 10A:
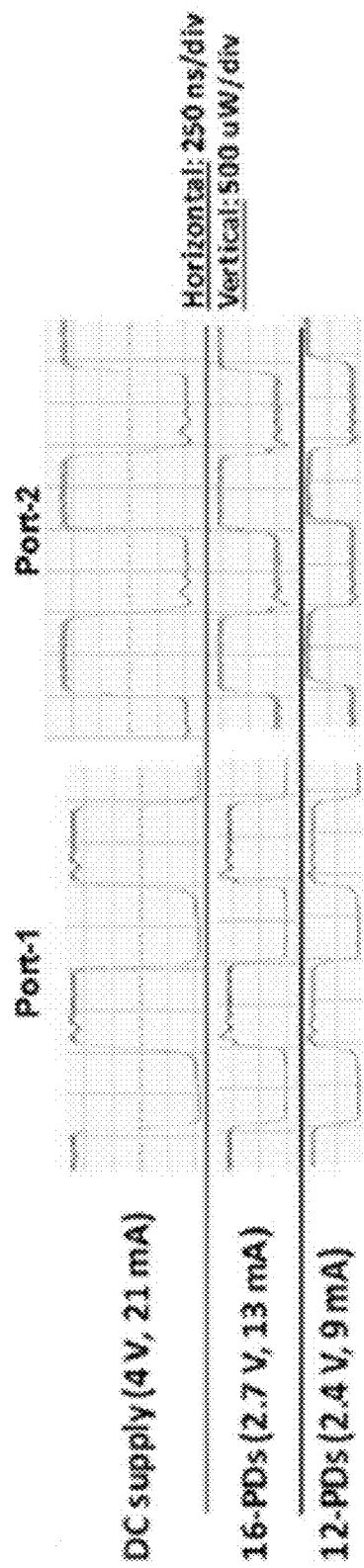
FIGS. 10A-E illustrate output of control signals and waveforms corresponding to an implementation of an optical switch, according to some implementations.
Figure 10B:
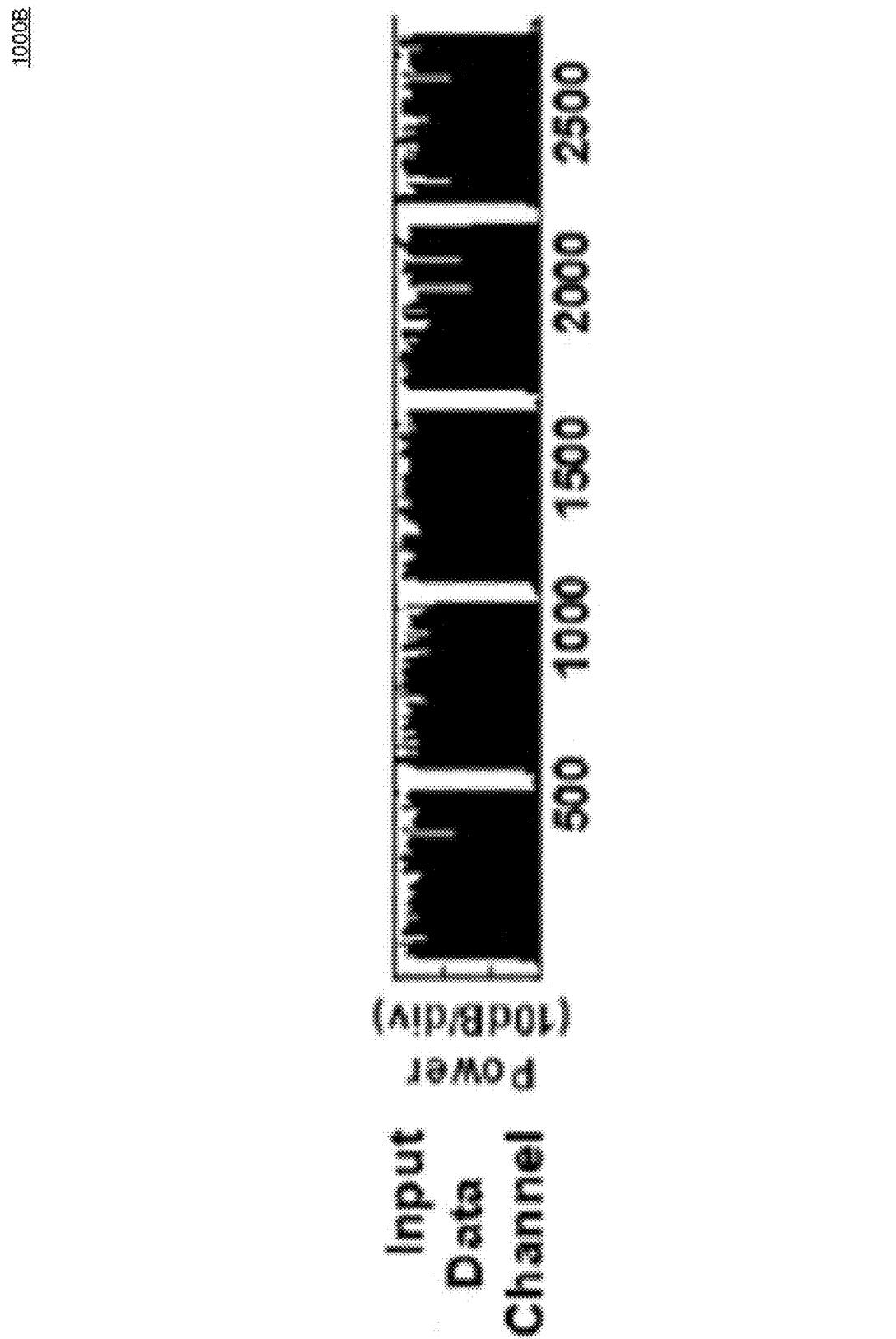
Figure 10C:
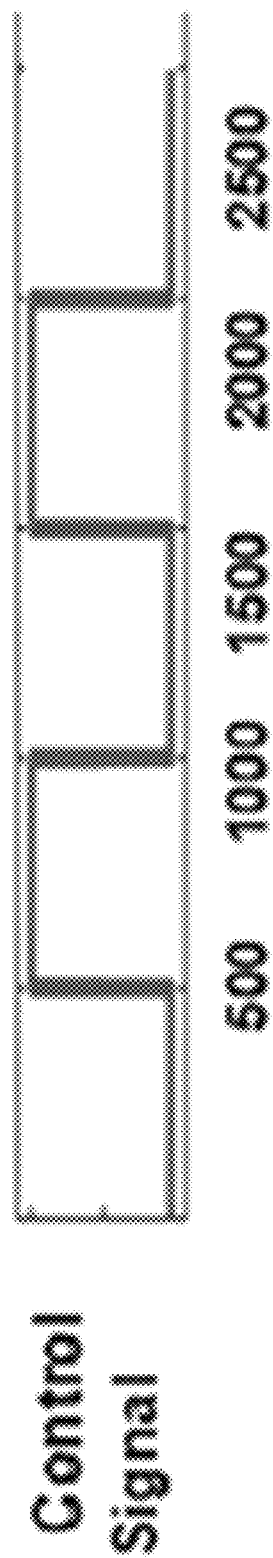
Figure 10D:
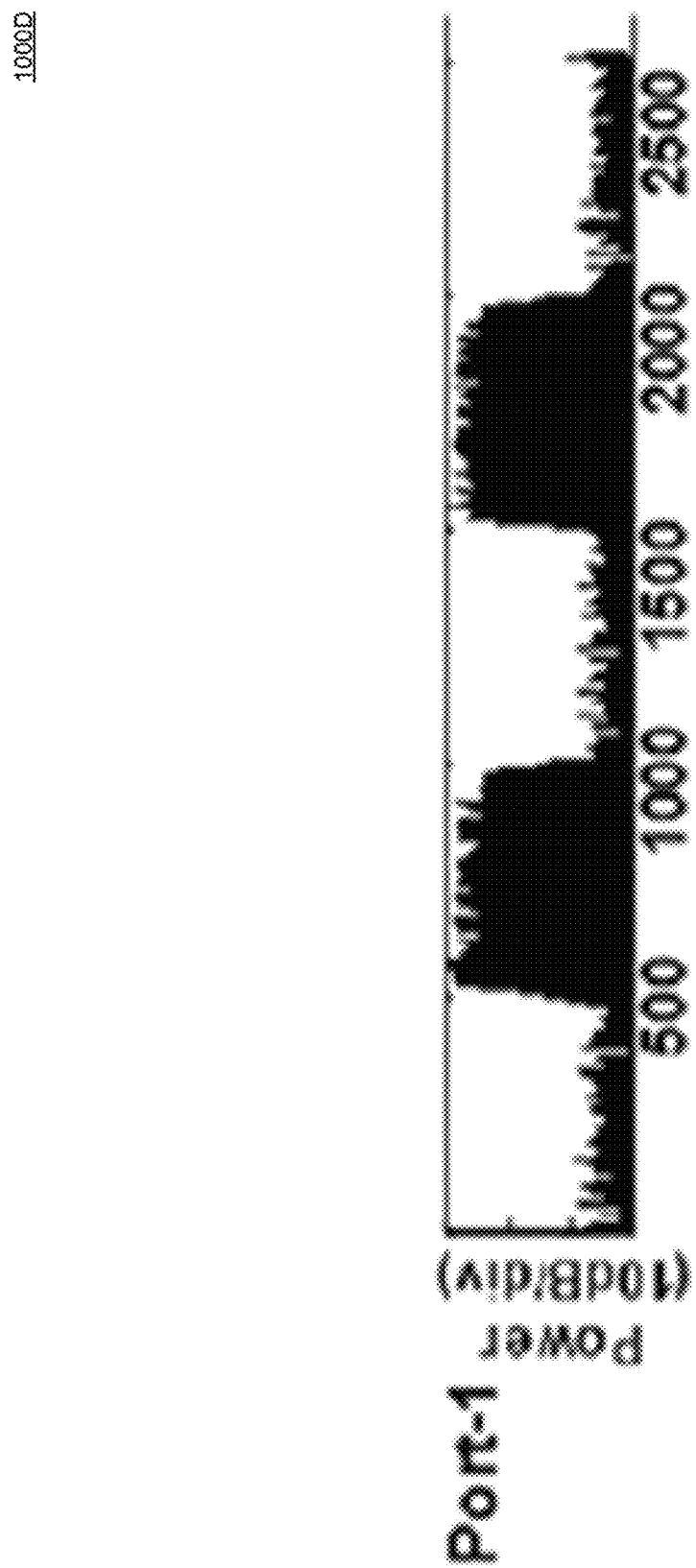
Figure 10E:
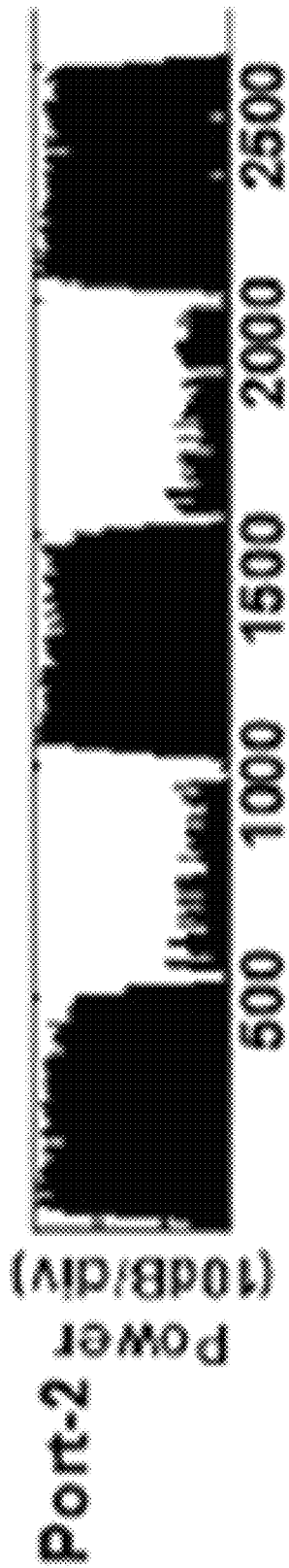

10A-E show the switching function when the 1 Gb/s OOK data are transmitted. The transmitted data channel is shown in FIG. 10B, where each frame contains 450 data bits and 50 empty slots as the guard band for switching. The five frames in FIG. 10B are aligned with the switching control signal of 01010 in FIG. 10C. In FIGS. 10D and 10E, it can be observed that the data channel is directed to port 1 when the control is 1, and it is directed to port 2 when the control is 0. Each output port shows an extinction ratio of more than 10 dB.

FIGS. 11A-F illustrate plots of switch response and power characteristics according to some implementations. FIGS. 11A-F illustrate a comparison of two monitoring tones when the switch is in bar/cross states 1100A in FIG. 11A, an optical switch response at different wavelengths 1100B in FIG. 11B, an optical power saturation at the optical fiber due to nonlinearities 1100C in FIG. 11C, a power measurement of monitoring tones at the bar/cross state 1100D in FIG. 11D, a ratio of M1/M2 1100E in FIG. 11E, and a constellation diagram of a 40 Gb/s QPSK signal at switch two output ports with optimal and suboptimal bias points in the bar/cross state 1100F in FIG. 11F.

To monitor the switching state, two laser tones ($M_1$ and $M_2$) may be transmitted through the 8 km SMF into the optical switch at the distant location. Each of the monitoring tones corresponds to one of the output ports. The monitoring tones at $\lambda_{M1}$ and $\lambda_{M2}$ may be extracted from the switch output ports one and two, respectively, and sent back through the same SMF to the transmitter. Therefore, by comparing the power of $M_1$ and $M_2$ at the transmitter, it can be determined if the switch is in the bar state (input is routed to port 1) or cross state (input is routed to port 2). This comparison can be done by calculating the ratio $M_1/M_2$: if the ratio is greater than 1, then the switch may be in the bar state; otherwise, it is in the cross state (see FIG. 11A). Moreover, the switch may operate at the optimal bias point when the maximum extinction is achieved. The $M_1/M_2$ reaches maximum or minimum in the bar or cross state.

Figure 11A:
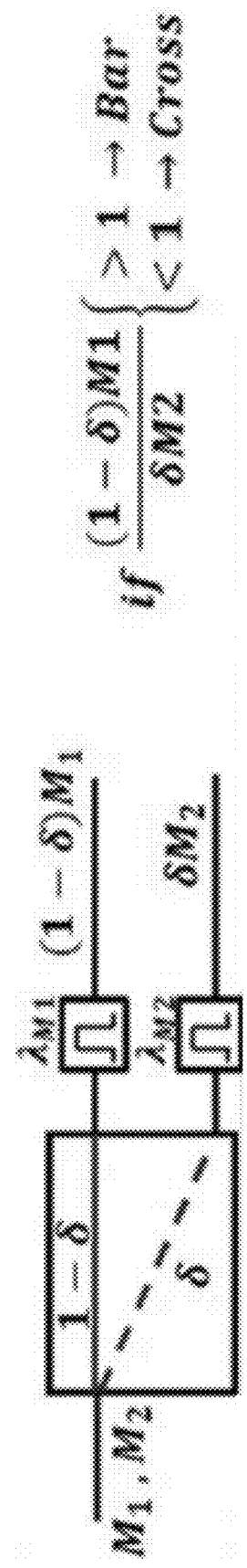
Figure 11B:
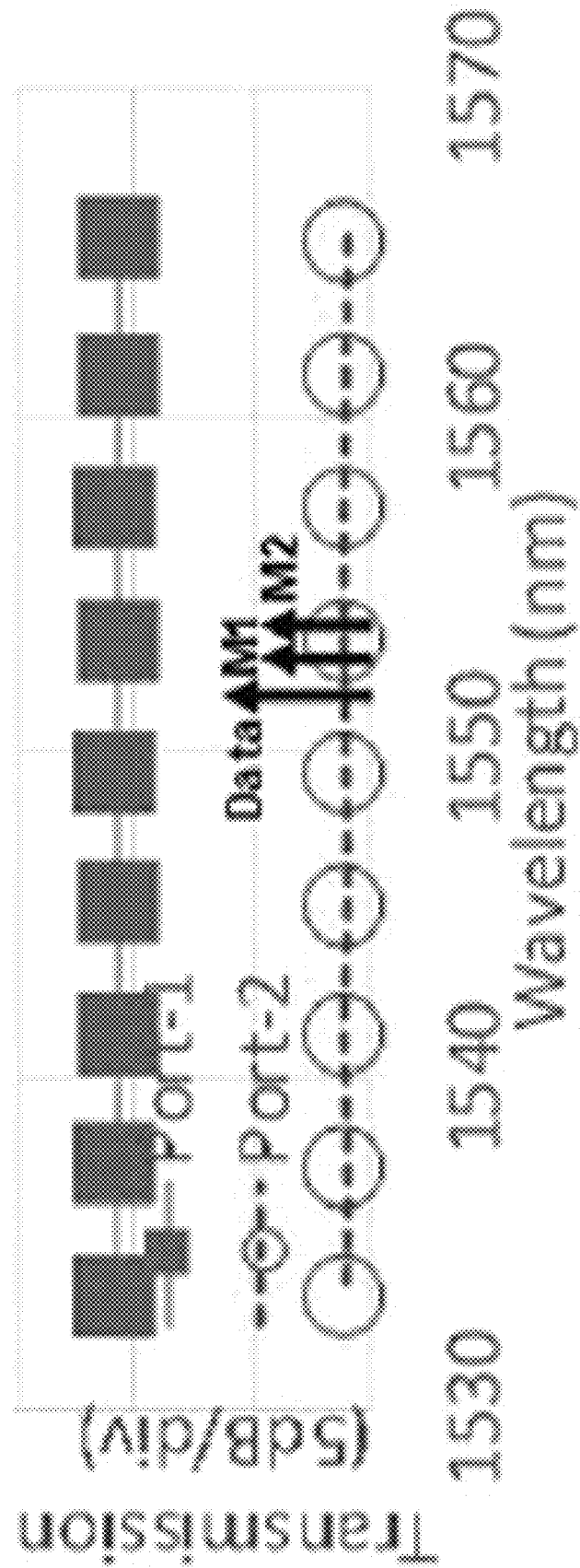

FIG. 11B illustrates that the outputs of the two ports may be almost constant when the wavelength of the input signal varies in a wide range. Therefore, the wavelength separation between $M_1$, $M_2$, and the data signal may not impact the switch state monitoring. Furthermore, temporal changes in the birefringence of the SMF may change the state of polarization (SOP) for the transmitted optical signals. SOP wandering can cause optical power fluctuation, potentially impacting monitoring signals because of the polarization sensitivity of the MZI switch. In this demonstration, a local polarization controller may be used before the MZI switch to adjust the SOP of the monitoring tones. To avoid the local controlling of polarization, one could use the polarization diversity technique for real-time monitoring and adjusting the SOP at the transmitter, which would add to the complexity of the demonstration.

Figure 11C:
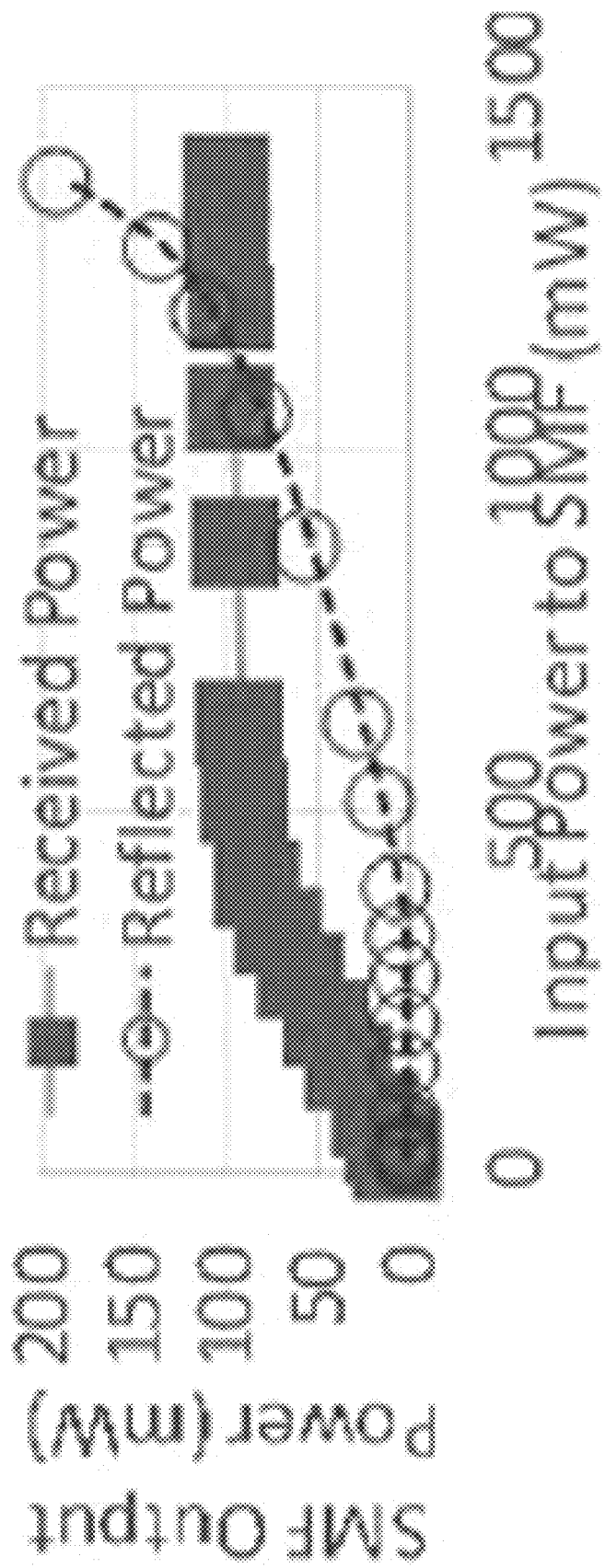

FIG. 11C shows the limit for increasing the transmitted optical power into the SMF fiber. By increasing the optical power higher than a certain limit, most of the power may be reflected due to stimulated Brillouin. Therefore, the power of the monitoring tones at the transmitter should be in the linear region to result in the proper reading of the received tones. The CW tones' phase modulation can reduce the fiber's backscattering effect.

Figure 11D:
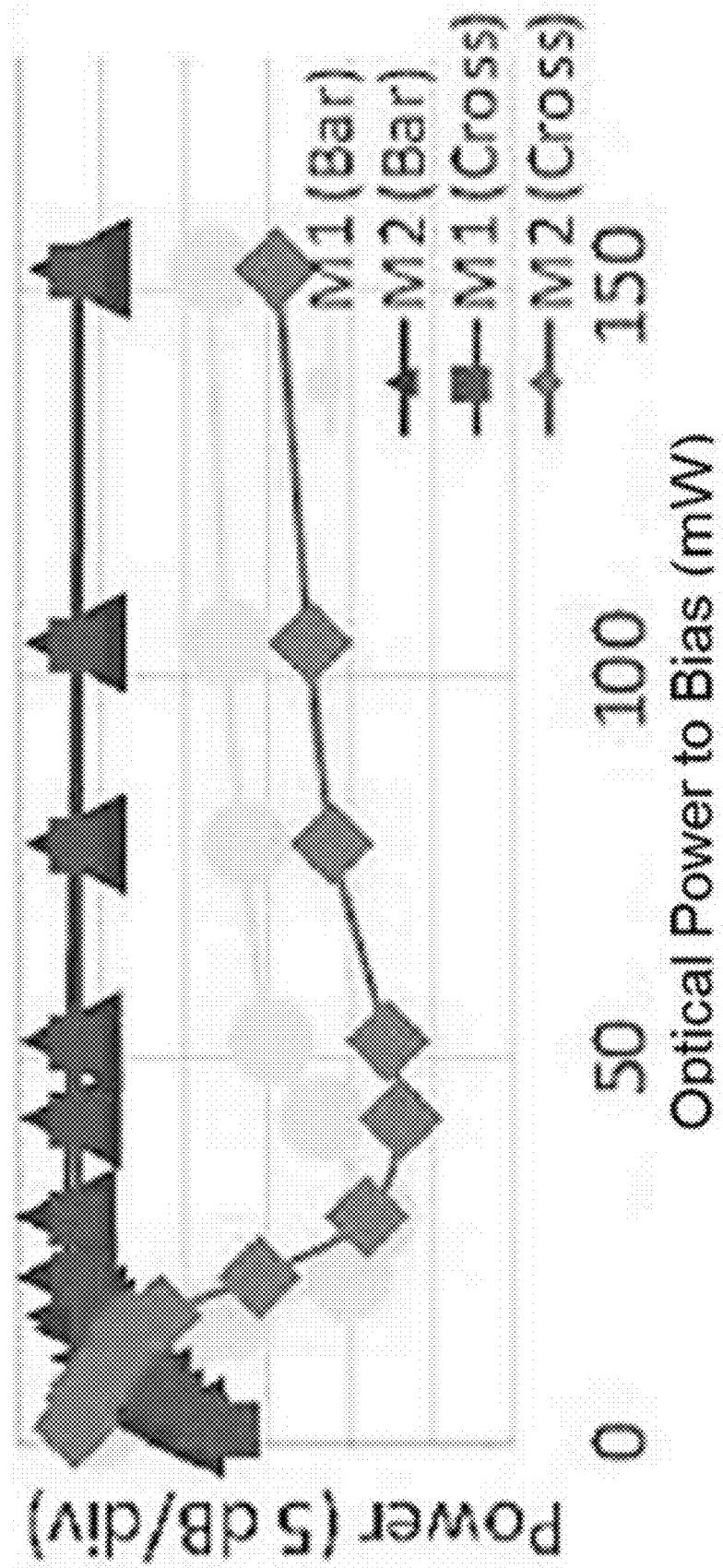

The measured power of $M_1$ and $M_2$ in the bar or cross state is shown in FIG. 11D, which varies versus the optical power sent into the PDs connected to the bias port of the switch. Moreover, the ratio of $M_1/M_2$ is demonstrated in FIG. 6(e). When the optical power to the bias port is smaller than ~10 mW, the ratio may be greater than 1 in the bar state, whereas, for a higher bias power, the ratio may be less than 1. Therefore, the state of the switch can be determined. Furthermore, the switch can be stabilized in the case of bias drift.

Figure 11E:
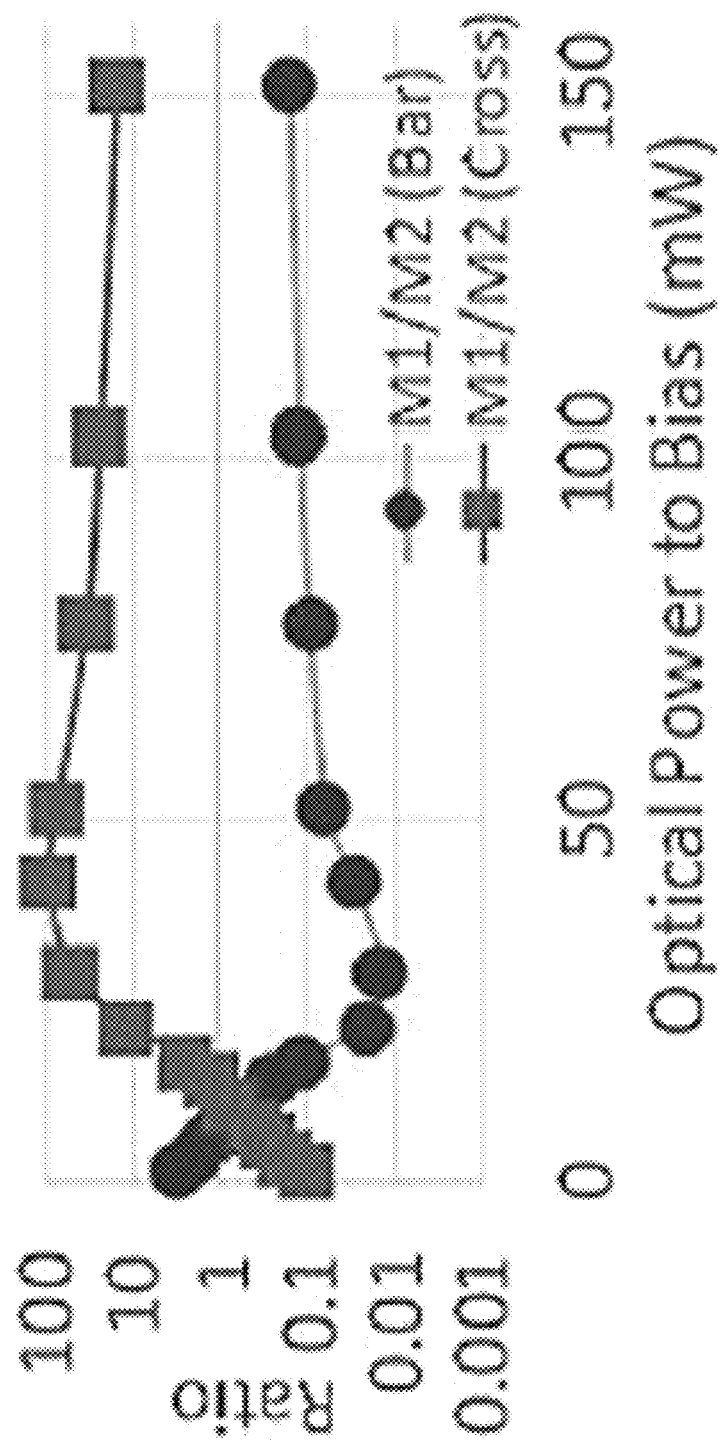

From FIG. 11E, the $M_1/M_2$ may be maximum or minimum when the optical power to the bias port of the switch is ~34 mW. Therefore, if the value of $M_1/M_2$ changes, the bias drift may be realized and compensated for by changing the optical power at $\lambda_{B1}$. To compare the quality of the signal at the two output ports, a 40 Gb/s QPSK signal may be generated by driving an IQ modulator with a pseudo-random bit sequence of $2^{31}-1$ to modulate the laser at $\lambda_S$. In the bar state, the signal should be directed to port 1; therefore, the quality of the signal in port 1 is better than port 2. Similarly, in the cross state, the signal may be directed to port 2, and the quality of the signal in port 2 should be better. If the bias of the switch sets at the optimal point, a much more significant difference in error vector magnitudes (EVMs) of the QPSK signal may be observed at the two output ports. For example, in the bar state, if the optical power to the 16 PDs connected to the bias port is 34 mW, then the EVMs in port 1 and port 2 are 13.7% and 35.3%, respectively; however, if the optical power is 20 mW, the EVMs in port 1 and port 2 are 13.7% and 21.3%, respectively. The switch state can be changed to the cross state by increasing the optical power to the control port, and a similar conclusion can be made for the cross state.

Switches can be stabilized by a local thermo-electric controller (TEC) to fix the temperature. However, in our architecture, there may be no local electrical power. One could consider transmitting another remote laser power to provide the required local power of the TEC in the future. In our case, switching may be performed considering only one input port and two output ports (1×2). If the optical switch is scaled up to 1×N (N output ports), the number of MZIs used (M) may depend on the designed architecture. Each MZI may require one control signal, one bias signal, and N wavelengths to monitor different ports. Thus, one may need 2M+N wavelengths to achieve the same result. However, (1) the total amount of required optical power should be increased, which may cause distortion due to fiber nonlinearities; and (2) a higher bandwidth might be required for the optical components.

A Tunable Optical Correlation of a 10-15 Gbaud QPSK Data Signal Using Nonlinear Wave Mixing at a Remotely Controlled Node Optical correlation can be considered one of the possible OSP functions for a network node. An optical correlator may search for a specific pattern in a transmitted data stream. According to some implementations, the second architecture for a remotely biased and controlled tunable optical correlator is based on phase-controlled MZIs. An MZI with an embedded phase-shifter coherently mixes the delayed copies of the incoming QPSK signal with complex coefficients. When the phase shift matches the phases of two consecutive symbols, a peak at the output waveform (e.g., corresponding to the constellation points at the top right corner) can be seen. OE conversion may be used to provide electrical voltage for phase tuning.

The remote control and monitoring of a tunable optical correlator based on nonlinear wave-mixing is demonstrated. The correlator is remotely controlled via the bidirectional transmission of multiple waves over an optical link. The temperature drift and link backscattering effects may be mitigated at the transmitter. OSP has the potential for operation at the line rate and avoiding inefficient optical-to-electrical-to-optical conversion. A building block of digital signal processing is a TDL. Such TDLs have been demonstrated in the optical domain using "linear" components (e.g., MZIs) and "nonlinear" waveguides. One possible advantage of the nonlinear approach is the potential for more readily utilizing the wavelength domain.

Figure 12A:
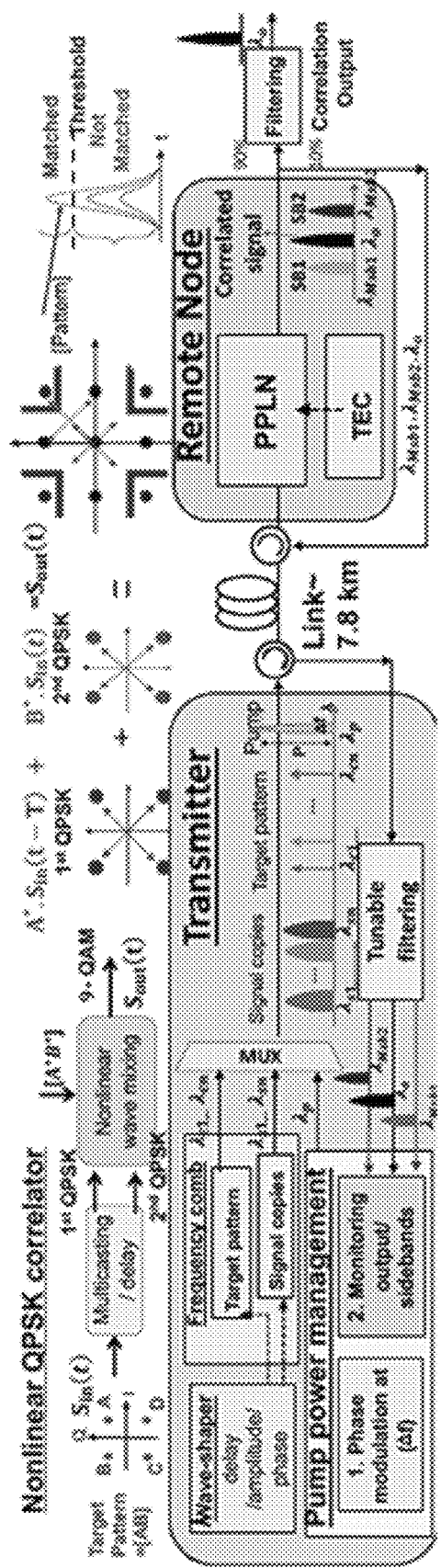
FIGS. 12A-B illustrate an implementation of a remotely controlled and monitored tunable optical correlator.

FIG. 12A illustrates an implementation of a remotely controlled and monitored tunable optical correlator 1200A, according to some implementations. An OTDL using a PPLN waveguide has been used to provide the abovementioned function. A QPSK data signal is multicast into several copies representing the number of taps. Each copy is differentially delayed, given a specific complex weight, and then multiplexed into a single correlated output wavelength using a pump wave. However, correlation nodes may be located in a network at a distance from the transmitter and without access to optical sources. In this case, the signal copies and pump wavelengths required for mixing may be sent from a distant location through an optical fiber link. This can be challenging due to the nonlinear effects of the fiber link. Moreover, ensuring proper mixing, tunability, and operation monitoring can also be challenging. Implementing the systems and methods described herein provides for a tunable optical correlator for a 10-15 Gbaud QPSK data signal using nonlinear wave mixing at a remotely controlled node.

A high-power pump is phase-modulated to overcome the link backscattering effect and sent along with the signal copies to a remote correlator node at ~7.8 km from the transmitter. The waves generated at the output of PPLN may be sent back to the transmitter to monitor the correlation operation. The power of the pump is set accordingly. A power boost of more than 3 dB for the correlated signal at a temperature drift of 2° C. has been shown. After remote control and monitoring, improved constellation diagrams with lower EVMs for different baud rates and target patterns in a temperature drift range of <2° C. may be obtained. The link backscattering is also mitigated by ~7 dB.

Figure 12B:
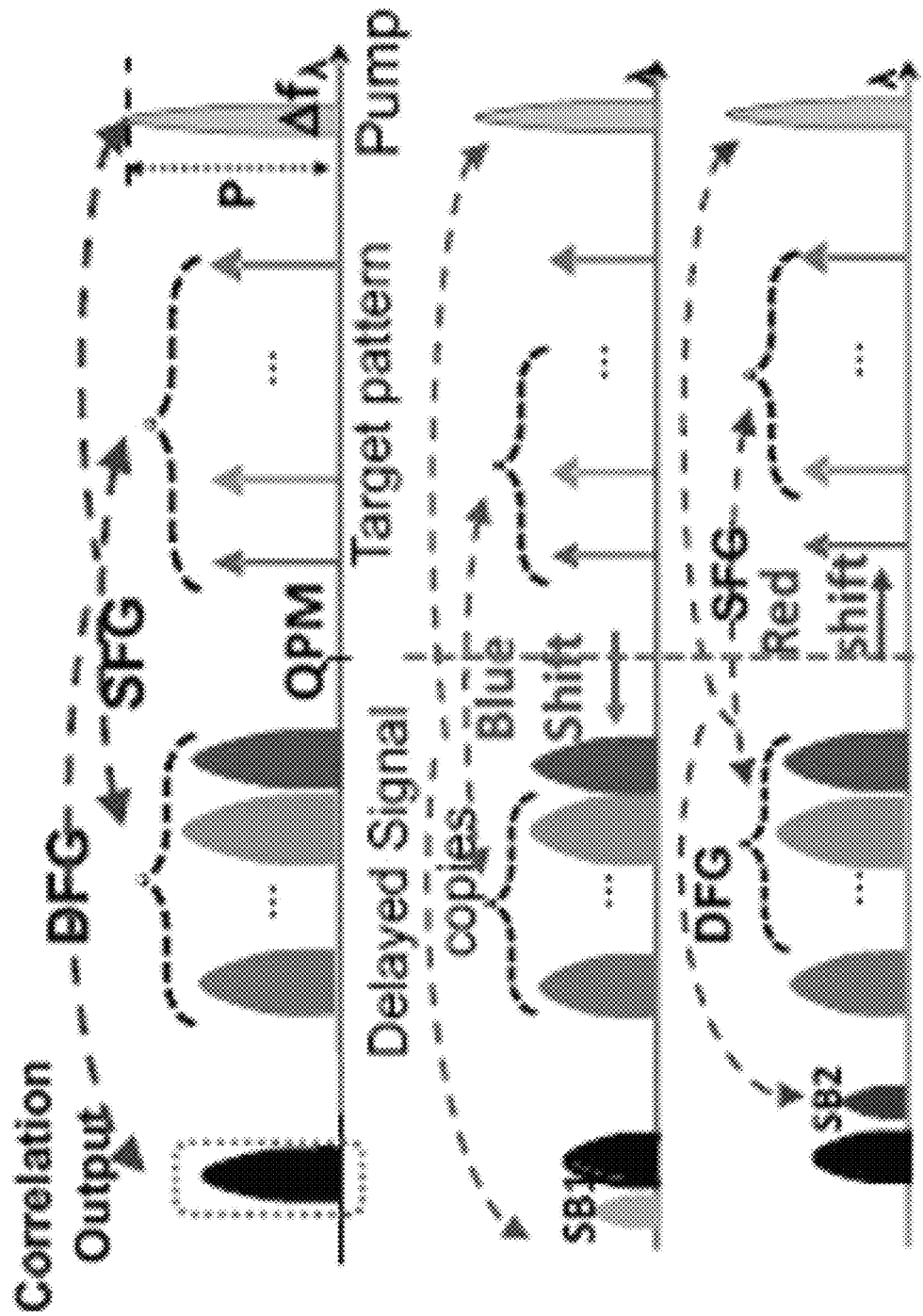

A block diagram for the implementation of remote control and monitoring of a QPSK correlator using the nonlinear wave mixing are shown in FIGS. 12A-B, respectively. FIG. 12A illustrates an example implementation 1200A. In addition, the correlated signal after passing through the PPLN waveguide for either blue/red shift of QPM wavelength are shown in 1200B in FIG. 12B, according to some implementations.

A PPLN waveguide may be used as an N-tap correlator node, in which a correlation signal can be obtained by a sum-frequency-generation (SFG) and difference frequency-generation (DFG) between N signal copies at $\lambda_{s1}, \ldots, \lambda_{sn}$, N comb lines at $\lambda_{c1}, \ldots, \lambda_{cn}$ and a high-power pump at $\lambda_p$. When the PPLN waveguide is thermally controlled, a correlated signal may appear at the idler wavelength of the pump wavelength with respect to the quasi-phase matching (QPM) wavelength of the PPLN. Signal copies may be obtained by modulating N comb lines, and the target pattern is imprinted on other N comb lines using a wave-shaper. Signal copies, comb lines, and the high-power pump may be sent via an optical link which is ~7.8 km long.

As a result, these waves may be prone to power loss because of the link Brillouin scattering (BS), which eventually affects the efficiency of nonlinear interactions inside PPLN. This effect can be controlled at the transmitter by phase-modulating a high-power pump at the speed of $\Delta f$. The temperature drift of the PPLN can shift the QPM wavelength and reduce the power of the correlated signal leading to difficulties in identifying the target pattern. This effect can be monitored and controlled at the transmitter side by measuring the power of generated sidebands (SBs) at $\lambda_{MSB1}$ and $\lambda_{MSB2}$ and then accordingly powering up the pump. The two SBs at $\lambda_{MSB1}$ and $\lambda_{MSB2}$ may be generated when there is a blue or red shift of the QPM wavelength, respectively. The two SBs and the converted signal at $\lambda_0$ may be sent back to the transmitter to monitor and control the temperature drift effect.

Figure 13A:
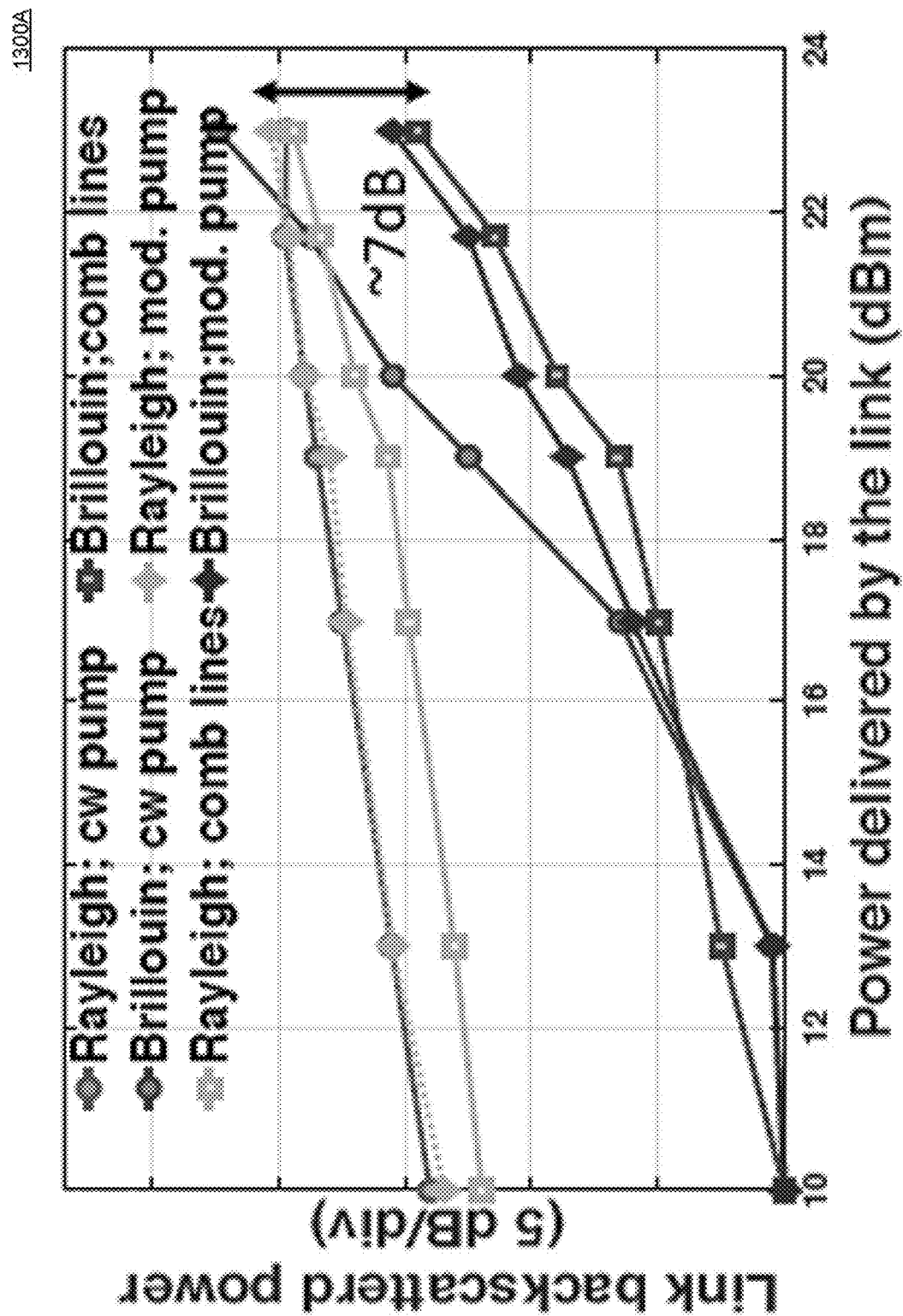
FIGS. 13A-C illustrate output power characteristics for an implementation of the QPSK correlator, according to some implementations.
Figure 13B:
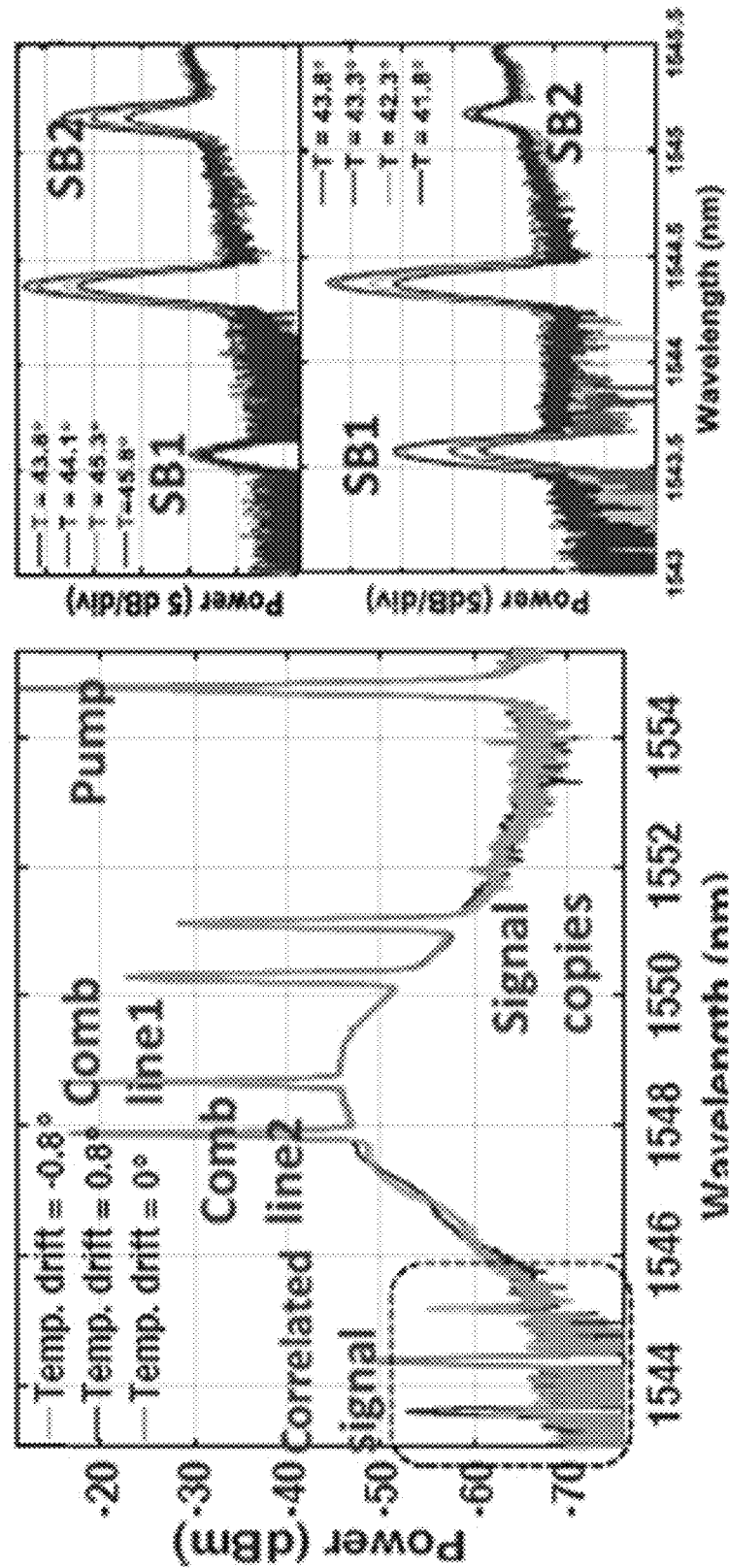
Figure 13C:
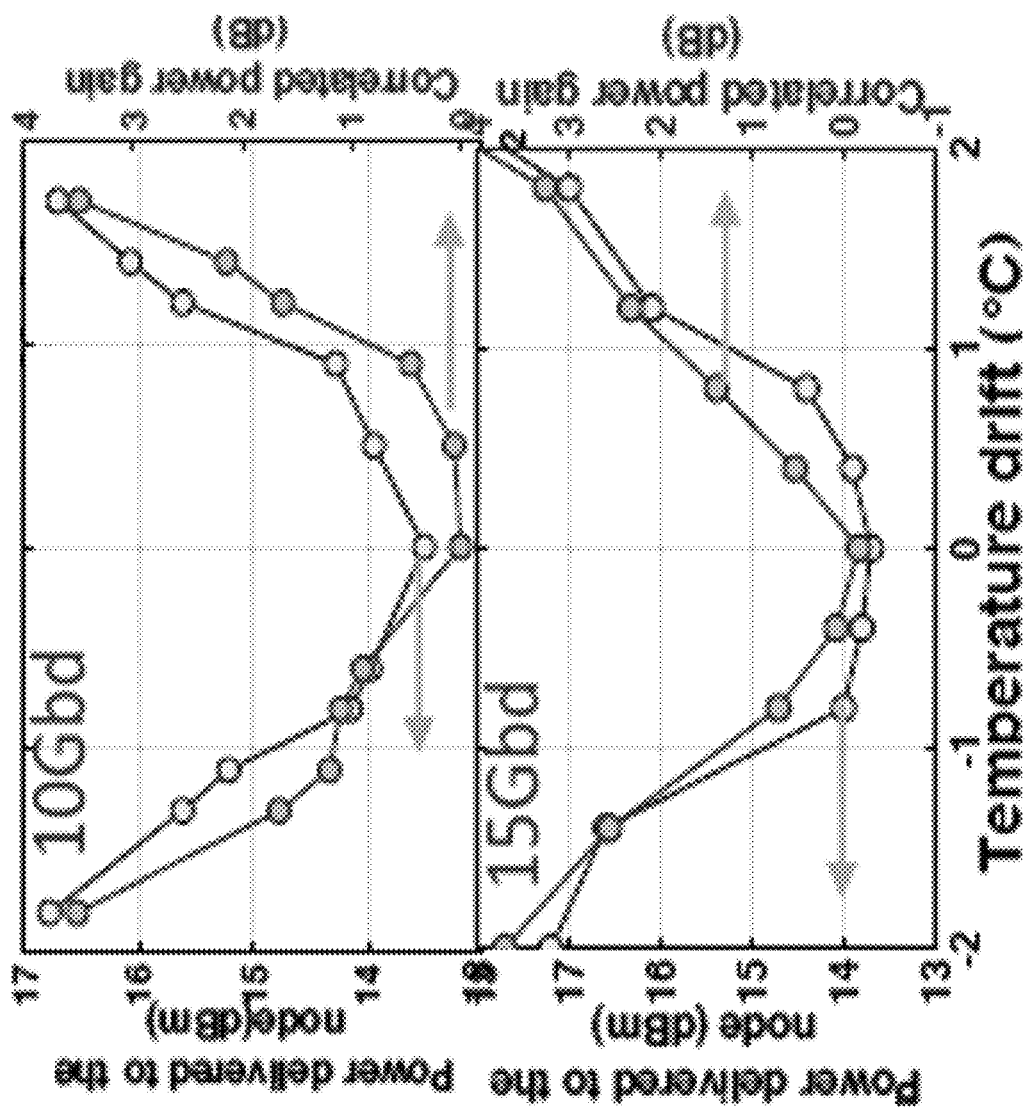

FIGS. 13A-C illustrate output power characteristics for implementation of the QPSK correlator, according to some implementations, including plots of Rayleigh and Brillouin scattering from the link vs power delivered by the pump and comb lines 1300A in FIG. 13A, output spectra of the PPLN 1300B in FIG. 13B, and power delivered to the node and power gain after monitoring and tuning the pump power vs temperature drift for a QPSK at 10-Gbaud, and 15-Gbaud 1300C in FIG. 13C, according to some implementations. Specifically, FIG. 13A shows the effect of phase modulation on the BS suppression for the pump and the comb lines. The two main components of fiber backscattering, linear Rayleigh and nonlinear BS may be plotted. Keeping the nonlinear BS well below the Rayleigh scattering may be desirable. It has been found that a phase modulation of the pump with a speed of 500 MHz allows a pump power as large as 22 dBm to be delivered to the remote node. The comb lines used for the target pattern show an almost >6 dB margin with the Rayleigh limit thanks to the coherency of the lines, which keeps the BS inefficient. FIG. 13B shows the spectra at the PPLN output for a two-tap correlator at different temperatures, including the correlated signal and the two generated SBs (SB1 and SB2). The QPM wavelength is ~1549.5 nm at the reference temperature of 43.8° C. Both positive and negative temperature drifts drop the correlated signal power. However, the former may be responsible for SB2 generation while the latter generates SB1. To compensate for the correlation signal power drop, the pump power at the transmitter side may be amplified to deliver ~17 dBm for a 2° C. drift. This may boost the conversion by around 3 dB, according to FIG. 13C for two QPSK signals at 10/15-Gbaud.

Figure 14A:
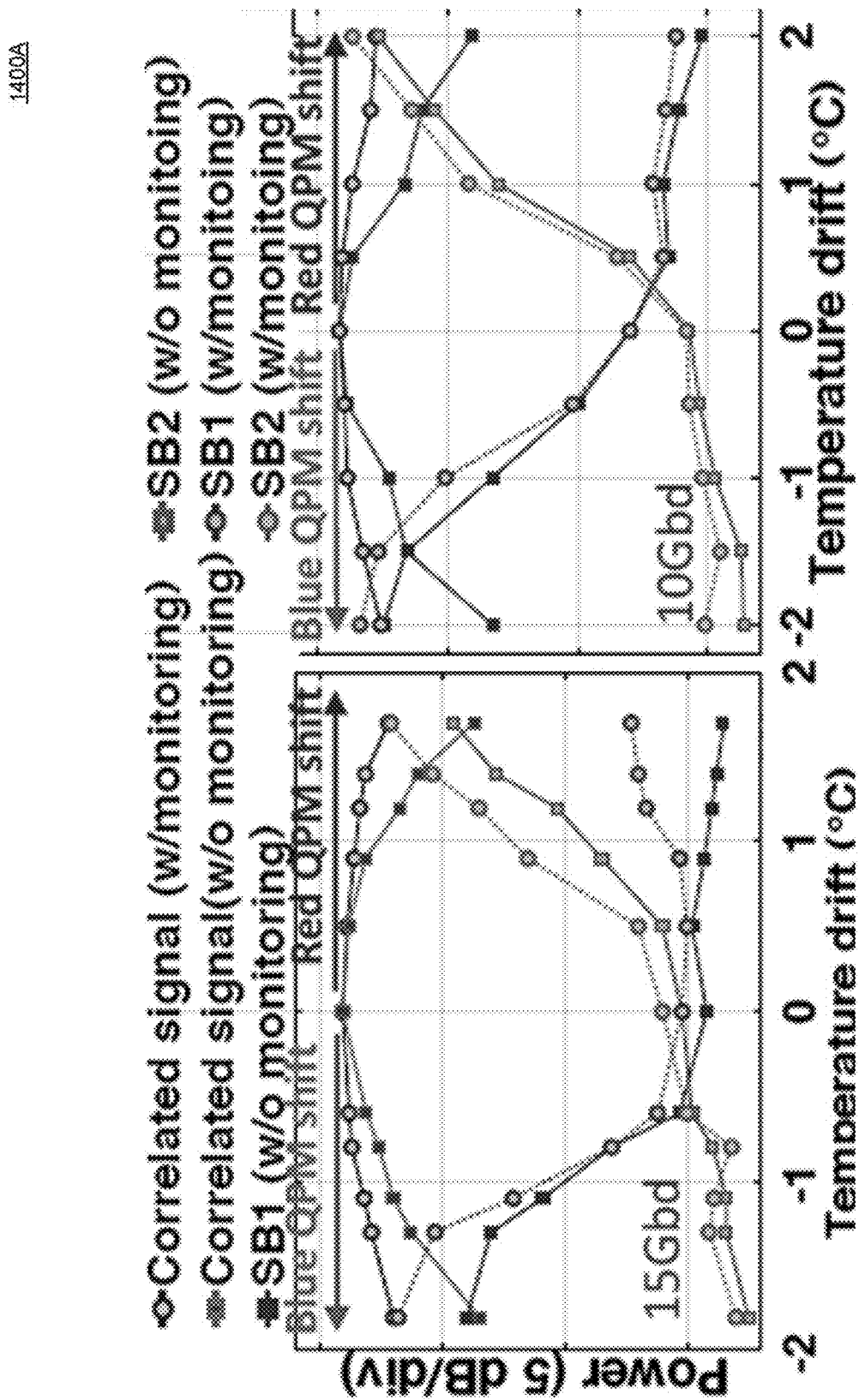
FIGS. 14A-C illustrate plots of monitored powers vs temperature drift before and after pump power amplification for an implementation of a QPSK correlator, according to some implementations.
Figure 14B:
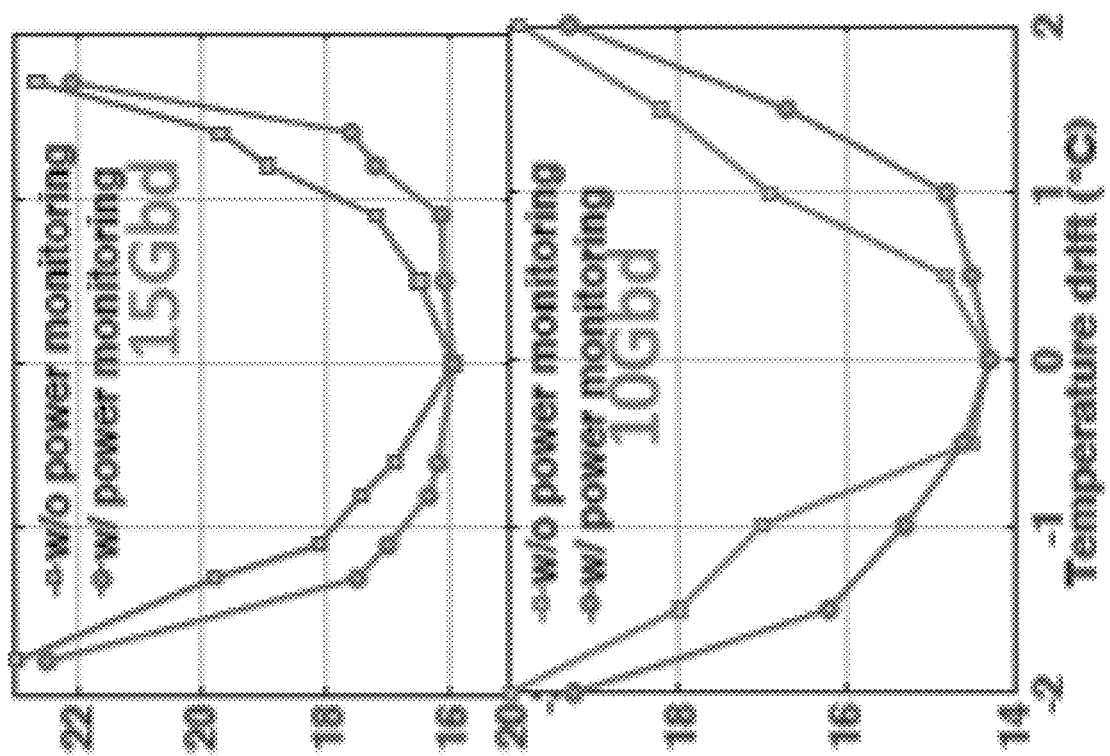
Figure 14C:
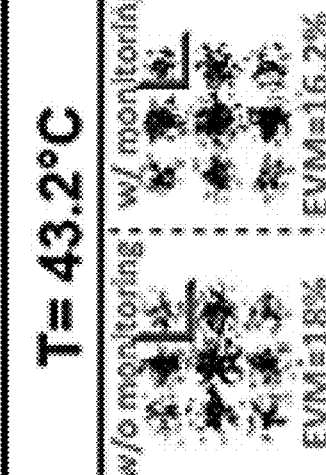

FIGS. 14A-C illustrate plots of monitored powers vs temperature drift before and after pump power amplification for implementing a QPSK correlator. FIG. 14A illustrates plots 1400A of monitored powers vs temperature drift before and after pump power amplification for implementing a QPSK correlator at 15-Gbaud, and 10-Gbaud. FIG. 14B illustrates EVM vs temperature drift 1400B before and after pump power amplification for a QPSK at 15-Gbaud and 10-Gbaud. FIG. 14C illustrates constellation diagrams 1400C of the correlated signals. In FIG. 14A, the monitored power of the correlation signal, SB1 and SB2, versus the temperature drift before and after tuning the pump power for compensating the correlation power loss are plotted for two different baud rates. As can be seen, a blue QPM shift (negative drift) may increase the SB1 while a red QPM shift (positive drift) increases the SB2. In both directions, the correlation signal power may drop. The pump power amplification at the transmitter may bring the correlated signal power back to its original value; however, it may also strengthen the SB1 and SB2. This can affect the quality of the digital signal, as seen in FIG. 14B, in which the EVMs are plotted for QPSKs at 15-Gbaud and 10-Gbaud, respectively. While the EVM has generally decreased after power compensation, the amount of EVM improvement may start to diminish at larger temperature drifts due to the strengthening of the SBs by amplifying pump power. The constellation diagrams of the generated 9-QAM at the output of a 2-tap correlator for different temperatures, baud rates, and target patterns are shown in FIG. 14C indicates the improvement in EVM and successful identification of the target pattern at the right corner symbol of the 9-QAM after the monitoring.

In summary, an optical network architecture is described herein. The optical network architecture may enable a network routing node to operate at a remote distance without using a power that is locally provided. Based on this architecture, multiple optical wavelengths may be transmitted and then OE conversion may be used at the remote node to deliver the required power. Specifically, a system for remotely biasing, controlling, and monitoring a network routing node, such as a MZI-based switch and a correlator (either using MZI or PPLN), at a remote distance based on optically provided signals is described herein.

Remotely Controlling an Optical Switch Using an Optical Correlator

Figure 15:
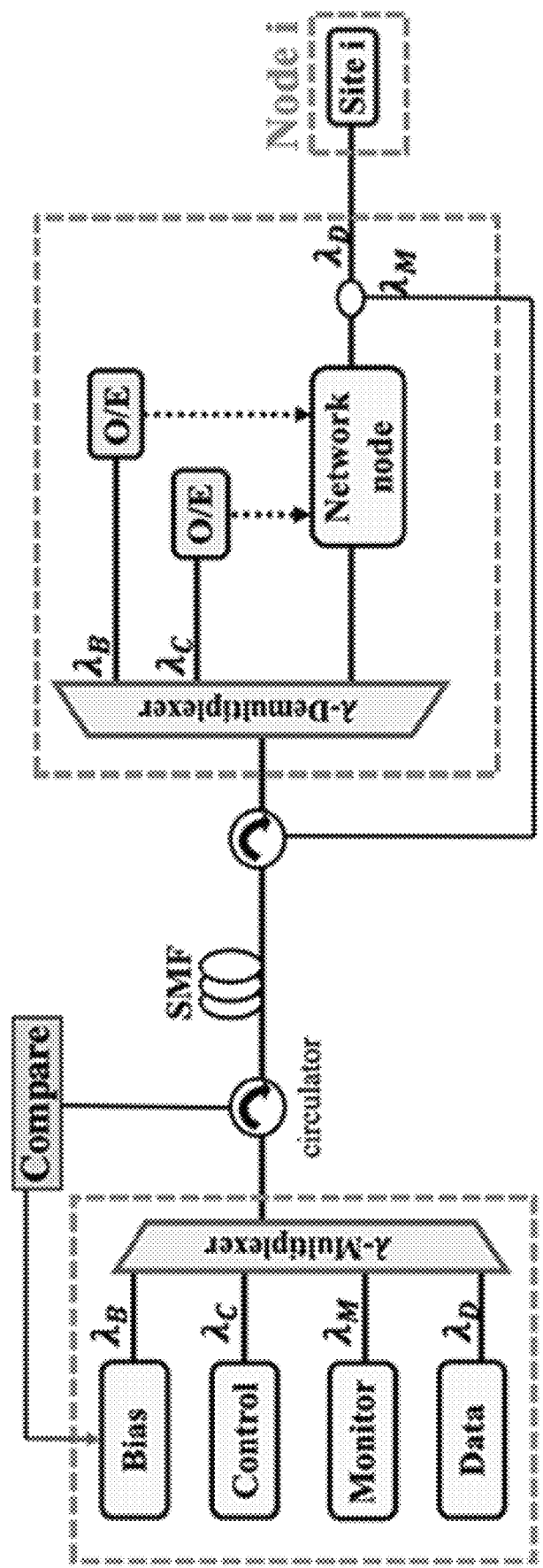
FIG. 15 illustrates remotely biasing, controlling, and monitoring a network routing node based on optically provided signals, according to some implementations.

FIG. 15 illustrates remotely biasing, controlling, and monitoring a network routing node 1500 based on optically provided signals, according to some implementations. A data signal at $\lambda_D$, and an optical bias at $\lambda_B$ may be combined using a wavelength multiplexer into an SMF to be transmitted to a remote location. A wavelength de-multiplexer can be used to separate data signal and optical bias at different wavelengths at the remote site. Accordingly, the data signal passes through the correlator, and the resultant output (i.e., detected pattern) can be connected to the RF port of the MZI-based switch to control the output path of different data streams after passing through the optical switch. Like previous architectures, the OE conversion can be used at the remote site to convert the transmitted optical power into electrical DC bias required for the optical switch. Two data streams (e.g., A and B) may be time division multiplexed (TDM) and directed to the input of the optical switch. Each data stream may be intensity modulated and have a specific four bits (e.g., 1111 for A) of no information known as header to be distinguished from each other. The target pattern of the correlator needs to be matched exactly with the header of each data stream to result in a controlling pulse after thresholding the result of the correlation. This can cause the optical switch to direct the desired data stream into its first output.

Figure 16:
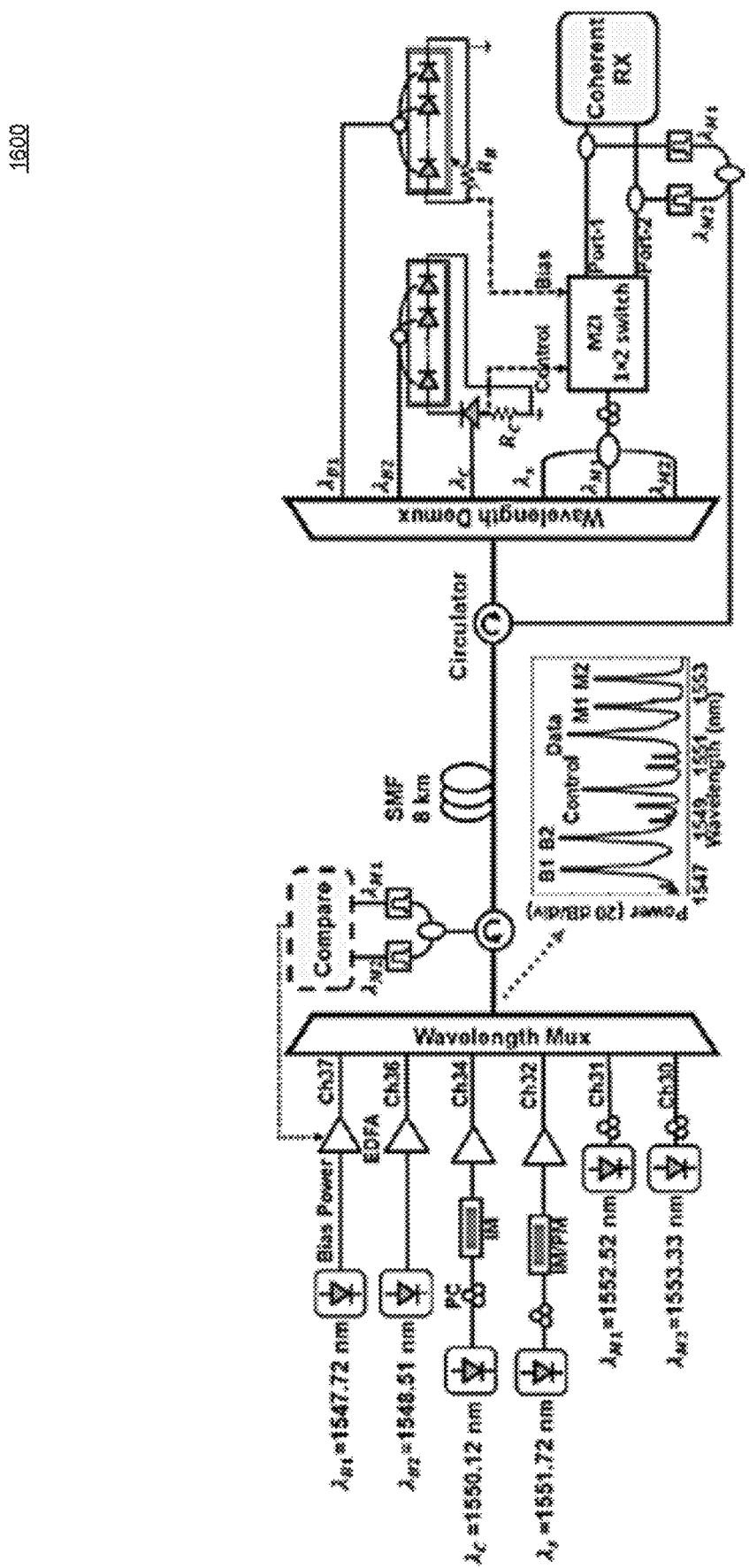
FIG. 16 illustrates an implementation of a remotely controlled optical switch using an optical correlator, according to some implementations.

FIG. 16 illustrates an implementation 1600 of a remotely controlled optical switch using an optical correlator, according to some implementations. For example, PD means photodiode; and BPF means bandpass filter. Four lasers may be used for the optical pump required for PPLN, and three optical bias signals (i.e., $\lambda_1$, $\lambda_{B2}$, and $\lambda_{B3}$) for the three series of PDs used to provide electrical power in the remote site. The data signal (D) may be combined with the optical pump and fed to the PPLN waveguide for wave mixing and pattern recognition. The output of PPLN is converted back to the electrical domain using the PD in a remote site, which is biased by a series of PDs. The thresholder compares the output of PD with a reference DC voltage, and if it is higher than that, it maintains its value for the duration of the data stream. Finally, the generated controlling pulse is connected to the switch's RF port to control the switch's bar and cross state over time. The data information is recovered at the output of the switch using a coherent receiver.

Figure 17:
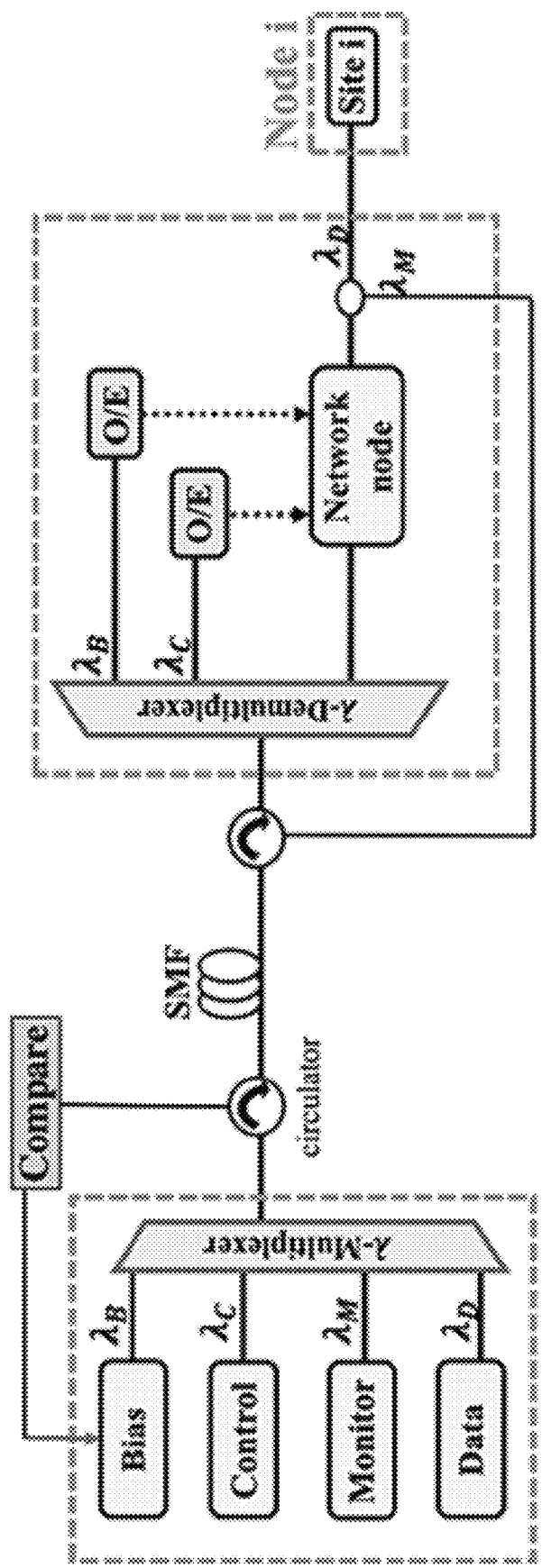
FIG. 17 illustrates an implementation of a remotely biased and controlled optical correlator, according to some implementations.

FIG. 17 illustrates an implementation 1700 of a remotely biased and controlled optical correlator, according to some implementations. The optical correlation can also be implemented with the nonlinear wave mixing approach. The potential for utilizing the wavelength domain is one of the advantages of using the nonlinear approach compared to its linear counterpart. To demonstrate a remotely controlled and monitored QPSK correlation based on nonlinear wave mixing: (i) a comb source may be separated into two branches using a waveshaper, (ii) N comb lines of one branch may be modulated with signal, (iii) the target pattern may be imprinted on another N comb lines of the other branch using another waveshaper, and (iv) signal copies, comb lines, and the high-power pump may be mixed in a PPLN waveguide. According to some implementations, the PPLN waveguide is thermally controlled using a TEC. The correlated output may be generated concerning the QPM wavelength of the PPLN. The temperature drift of the PPLN can shift the QPM wavelength, thereby: (i) increasing the power of sidebands (SBs), (ii) dropping the correlated signal power, (iii) degrading the signal quality, and (iv) leading to misidentifying the target pattern. Thus, to compensate for this power loss, the generated outputs of PPLN (e.g., SBs and correlated signals) may be sent back to the transmitter for monitoring. Subsequently, (i) the launched optical pump power can be boosted, (ii) the correlated power gain can be increased at the network node, (iii) the EVM value can be lowered, and (iv) the target pattern can be successfully identified over a range of temperature drifts. However, increasing the pump power can also affect the efficiency of nonlinear mixing inside the PPLN and reduce the amount of EVM improvements due to the increase in the power of SBs and link SBS.

Figure 18A:
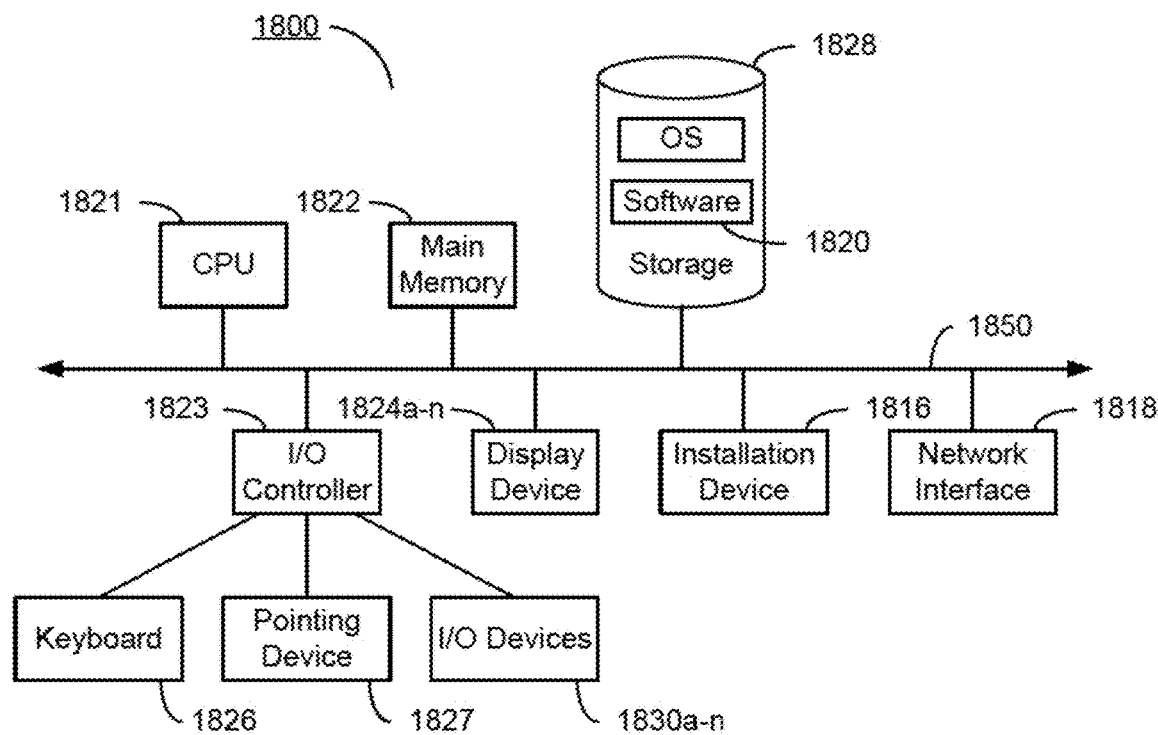
FIGS. 18A and 18B illustrate block diagrams depicting implementations of computing devices useful in connection with the methods and systems described herein, according to some implementations.
Figure 18B:
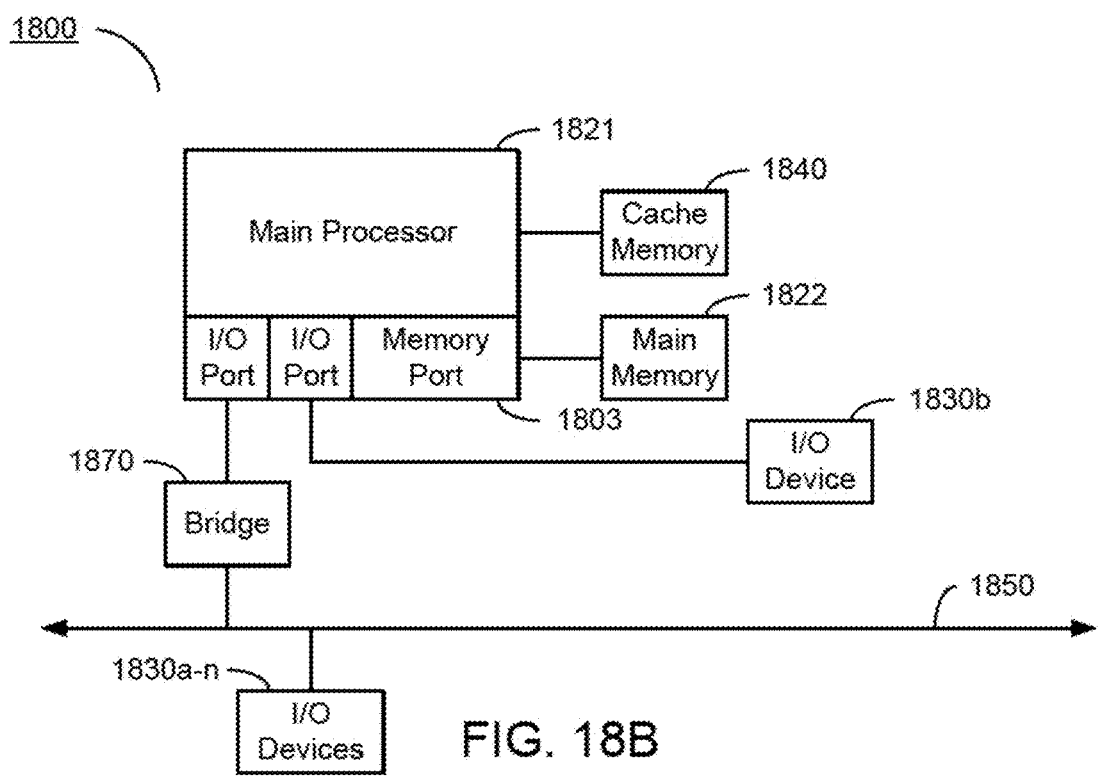

FIGS. 18A and 18B depict block diagrams of a computing device 1800 useful for practicing implementations of the computing devices described herein. As shown in FIGS. 18A and 18B, each computing device 1800 includes a central processing unit 1821 and a main memory unit 1822. As shown in FIG. 18A, a computing device 1800 may include a storage device 1818, an installation device 1816, a network interface 1818, an I/O controller 1823, display devices 1824a-1824n, a keyboard 1826 and a pointing device 1827, such as a mouse. Without limitation, the storage device 1828 may include an operating system and/or software. As shown in FIG. 18B, each computing device 1800 may also include additional optional elements, such as a memory port 1803, a bridge 1870, one or more input/output devices 1830a-1830n (generally referred to using reference numeral 1830), and a cache memory 1840 in communication with the central processing unit 1821.

The central processing unit 1821 is any logic circuitry that responds to and processes instructions fetched from the main memory unit 1822. In many implementations, the central processing unit 1821 is provided by a microprocessor unit, such as those manufactured by Intel Corporation of Mountain View, California; those manufactured by International Business Machines of White Plains, New York; those manufactured by Advanced Micro Devices of Sunnyvale, California; or those manufactured by Advanced RISC Machines (ARM). The computing device 1800 may be based on any of these processors or other processors capable of operating as described herein.

Main memory unit 1822 may be one or more memory chips capable of storing data and allowing any storage location to be directly accessed by the microprocessor 1821, such as any type or variant of Static random-access memory (SRAM), Dynamic random-access memory (DRAM), Ferroelectric RAM (FRAM), NAND Flash, NOR Flash and Solid State Drives (SSD). The main memory 1822 may be based on any of the memory as mentioned earlier chips or any other available memory chips capable of operating as described herein. In the implementation shown in FIG. 18A, the processor 1821 communicates with main memory 1822 via a system bus 1850 (described in more detail below). FIG. 18B depicts an implementation of a computing device 1800 in which the processor communicates directly with main memory 1822 via a memory port 1803. For example, in FIG. 18B, the main memory 1822 may be DRDRAM.

FIG. 18B depicts an implementation in which the main processor 1821 communicates directly with cache memory 1840 via a secondary bus, sometimes referred to as a backside bus. In other implementations, the main processor 1821 communicates with cache memory 1840 using the system bus 1850. Cache memory 1840 typically has a faster response time than main memory 1822 and is provided by, for example, SRAM, BSRAM, or EDRAM. In the implementation shown in FIG. 18B, the processor 1821 communicates with various I/O devices 1830 via a local system bus 1850. Different buses may be used to connect the central processing unit 1821 to any of the I/O devices 1830, for example, a VESA VL bus, an ISA bus, an EISA bus, a Micro Channel Architecture (MCA) bus, a PCI bus, a PCI-X bus, a PCI-Express bus, or a NuBus. For implementations in which the I/O device is a video display 1824, the processor 1821 may use an Advanced Graphics Port (AGP) to communicate with the display 1824. FIG. 18B depicts an implementation of a computer 1800 in which the main processor 1821 may communicate directly with I/O device 1830b, for example via HYPERTRANSPORT, RAPIDIO, or INFINI-BAND communications technology. FIG. 18B also depicts an implementation in which local busses and direct communication are mixed: the processor 1821 communicates with I/O device 1830a using a local interconnect bus while communicating directly with I/O device 1830b.

Many I/O devices 1830a-1830n may be present in the computing device 1800. Input devices include keyboards, mice, trackpads, trackballs, microphones, dials, touch pads, touch screens, and drawing tablets. Output devices include video displays, speakers, inkjet printers, laser printers, projectors, and dye-sublimation printers. The I/O devices may be controlled by an I/O controller 1823, as shown in FIG. 18A. The I/O controller may control one or more I/O devices, such as a keyboard 1826 and a pointing device 1827, e.g., a mouse or optical pen. Furthermore, an I/O device may provide storage and/or an installation medium 1816 for the computing device 1800. In other implementations, the computing device 1800 may provide USB connections (not shown) to receive handheld USB storage devices such as the USB Flash Drive line of devices manufactured by Twintech Industry, Inc. of Los Alamitos, California.

Referring again to FIG. 18A, the computing device 1800 may support any suitable installation device 1816, such as a disk drive, a CD-ROM drive, a CD-R/RW drive, a DVD-ROM drive, a flash memory drive, tape drives of various formats, a USB device, a hard drive, a network interface, or any other device suitable for installing software and programs. The computing device 1800 may further include a storage device, such as one or more hard disk drives or redundant arrays of independent disks, for storing an operating system and other related software and for storing application software programs such as any program or software 1820 for implementing (e.g., configured and/or designed for) the systems and methods described herein. Optionally, any installation devices 1816 could also be used as storage devices. Additionally, the operating system and the software can be run from a bootable medium.

Furthermore, the computing device 1800 may include a network interface 1818 to interface to the network 1804 through a variety of connections including, but not limited to, standard telephone lines, LAN or WAN links (e.g., 2802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 2802.11, IEEE 2802.11a, IEEE 2802.11b, IEEE 2802.11g, IEEE 2802.11n, IEEE 2802.11ac, IEEE 2802.11ad, CDMA, GSM, WiMax and direct asynchronous connections). In one implementation, the computing device 1800 communicates with other computing devices 1800' via any type and/or form of gateway or tunneling protocol such as Secure Socket Layer (SSL) or Transport Layer Security (TLS). The network interface 1818 may include a built-in network adapter, network interface card, PCMCIA network card, card bus network adapter, wireless network adapter, USB network adapter, modem, or any other device suitable for interfacing the computing device 1800 to any type of network capable of communication and performing the operations described herein.

In some implementations, the computing device 1800 may include or be connected to one or more display devices 1824a-1824n. As such, any of the I/O devices 1830a-1830n and/or the I/O controller 1823 may include any type and/or form of suitable hardware, software, or combination of hardware and software to support, enable or provide for the connection and use of the display device(s) 1824a-1824n by the computing device 1800. For example, the computing device 1800 may include any type and/or form of video adapter, video card, driver, and/or library to interface, communicate, connect, or otherwise use the display device(s) 1824a-1824n. In one implementation, a video adapter may include multiple connectors to interface to the display device(s) 1824a-1824n. The computing device 1800 may include multiple video adapters in other implementations, with each video adapter connected to the display device(s) 1824a-1824n. In some implementations, any portion of the operating system of the computing device 1800 may be configured for using multiple displays 1824a-1824n. A computing device 1800 may be configured to have one or more display devices 1824a-1824n.

In further implementations, an I/O device 1830 may be a bridge between the system bus 1850 and an external communication bus, such as a USB bus, an Apple Desktop Bus, an RS-232 serial connection, a SCSI bus, a FireWire bus, a FireWire 2800 bus, an Ethernet bus, an AppleTalk bus, a Gigabit Ethernet bus, an Asynchronous Transfer Mode bus, a FibreChannel bus, a Serial Attached small computer system interface bus, a USB connection, or an HDMI bus.

Figure 19:
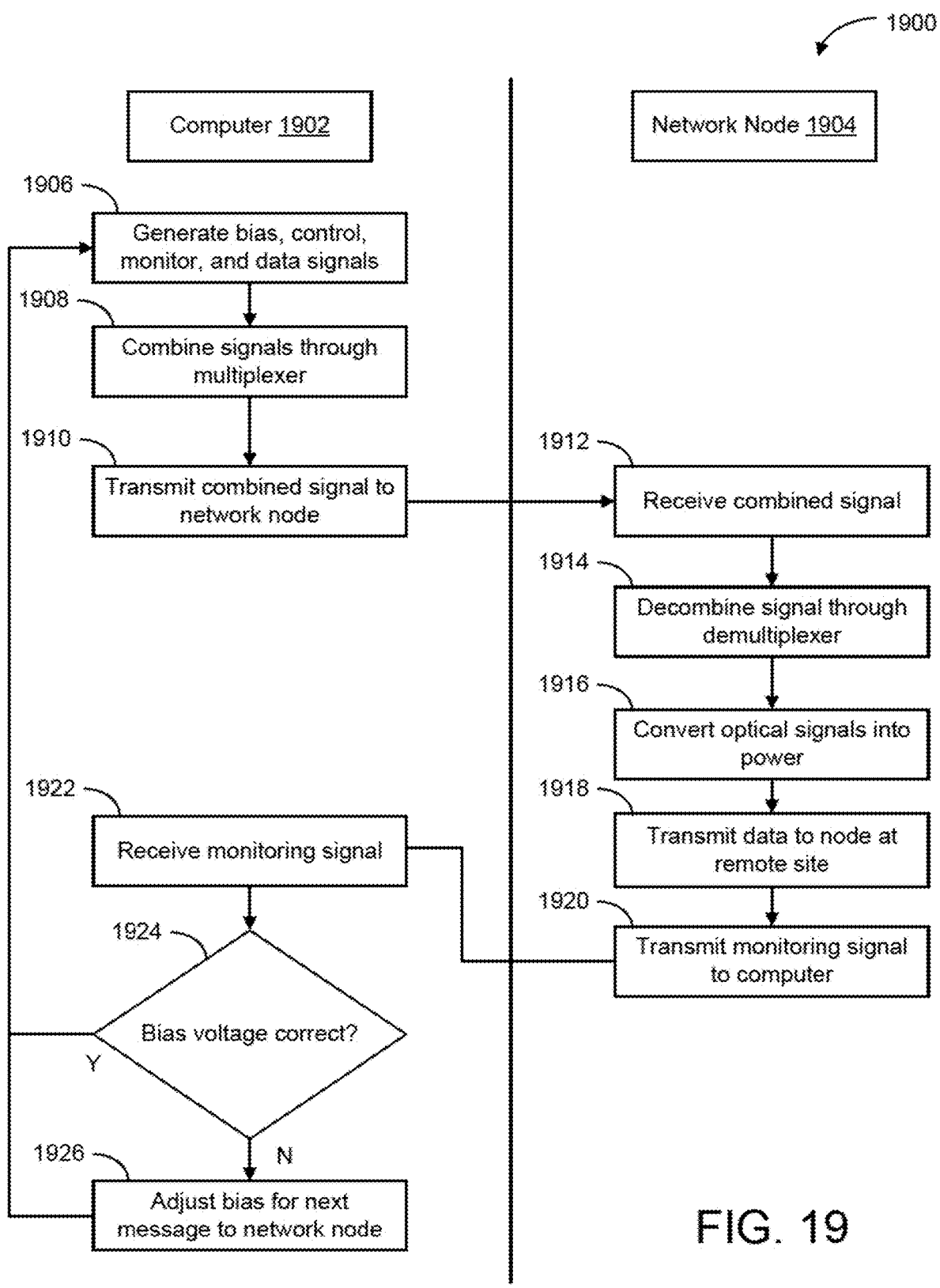
FIG. 19 illustrates an example flowchart of a method used to perform the techniques described herein, according to some implementations.

FIG. 19 depicts a flow chart of an example method 1900 of performing remote biasing, controlling, and monitoring a network routing node by one or more implementations. Additional, fewer, or different operations may be performed in the method depending on the implementation and arrangement. Method 1900 can be performed, for example, by a computer system as described in connection with FIGS. 18A and 18B. For example, method 1900 may be conducted by a combination of a computer 1902 (e.g., a computer having similar components to computing device 1800) and a network node 1904 (e.g., another computer having similar components to computing device 1800). Any number of computing devices may conduct the method. Method 1900 may enable computer 1902 to transmit a message to network node 1904 such that network node 1904 can route the message to a computer at a remote site without relying on a power source local to network node 1904 for the routing. In doing so, computer 1902 may include optical signals in the message that network node 1904 may convert into the requisite power to forward the message. Thus, method 1900 may improve the reliability and durability of a network communication infrastructure and minimize the number of messages that do not reach their final destination from degradation or power failures at network node 1904.

At step 1906, computer 1902 may generate bias, control, monitoring, and data signals. The bias and control signals may be laser-delivered optical signals. Computer 1902 may generate the bias signal based on the amount of power or voltage network node 1804 needs to route a message to another device. Accordingly, the bias signal may be a voltage bias from which power can be generated by network node 1904. The data signal may be or include the data that computer 1902 sends in a message. The monitoring signal may be a signal to monitor the operation of network node 1904 to determine how network node 1904 is operating based on the bias signal. The control signal may be a signal to control network node 1904.

At step 1908, computer 1902 may use a multiplexer to combine the signals generated at step 1906. Computer 1902 may pass each of the signals using the multiplexer and obtain a combined signal at the output of the multiplexer. At step 1910, computer 1902 may transmit the combined signal to network node 1904.

At step 1912, network node 1904 may receive the combined signal from computer 1902. At step 1914, network node 1904 may decombine the combined signal through a de-multiplexer. In decombining the combined signal, network node 1904 may obtain the bias, control, monitoring, and data signals in their original form or close to their original form.

At step 1916, network node 1904 may convert the bias and control signals into power. Network node 1904 may convert the bias and control signals by passing each bias and control signal through a photodiode or an array of PDs. In some cases, in doing so, network node 1804 may collect and store the output power from the PDs in a battery of network node 1904. In such cases, network node 1904 may retrieve the power from the battery and insert the power into an MZI switch (e.g., an MZI 1×2 switch) to enable the MZI switch to process the decombined data signal and monitoring signals from the de-multiplexer. In some cases, network node 1904 may pass the power from the control and bias signals directly into the MZI switch without storing the power.

The MZI switch may operate according to the received signals. For example, the switch can route the data signal to a particular site or computer based on the control signal. The bias signal may adjust the transmission characteristics of the MZI switch. Because computer 1902 can control the bias signal, computer 1902 can control the MZI switch to compensate for thermal drift or other degradation in the MZI. To direct the message in the data signal to the correct site or device, the MZI switch may additionally process and output the monitoring signals as pilot tones to determine whether the voltage from the bias signal is enabling the MZI switch to process the data signal correctly.

At step 1918, network node 1904 may transmit data from the data signal to the remote site. Network node 1904 may transmit the data to the remote site based on the output of the MZI switch (e.g., the output port that output the data based on the control signal). At step 1920, network node 1904 may transmit the output monitoring tones to computer 1902. In some implementations, network node 1904 may transmit the data to the final destinations (e.g., the final recipient device for the message) using the power that network node 1904 receives from the bias and control signal.

At step 1922, computer 1902 may receive the monitoring signals from network node 1904. Computer 1902 may analyze the characteristics of the monitoring signals by comparing the characteristics against stored expected values for the monitoring signals. Computer 1902 may determine if the characteristic match or are within a tolerance of the expected values. If computer 1902 determines that the characteristics match or are within a tolerance of the expected values, computer 1902 may return to step 1906 and perform method 1900 for a new message.

However, if computer 1902 determines the characteristics do not match or are not within a tolerance of the expected values, computer 1902 may determine the bias voltage is not correct and, at step 1926, adjust the bias voltage that computer 1902 may transmit in the next message to network node 1904. For example, upon determining the incorrect bias voltage, computer 1902 may increase or decrease a stored bias voltage such that computer 1902 may better bias the MZI for the following message. Computer 1902 may do so by matching a difference between the actual and the expected monitoring signals to a correction schedule that indicates how much and in which direction (e.g., increase or decrease) to adjust bias voltages based on the difference. Computer 1902 may identify the adjustment from the schedule and adapt a stored bias voltage in memory according to the adjustment such that computer 1902 may transmit the bias signal that best enables network node 1804 to transmit the data signal to a final destination.

In some implementations, computer 1902 may store bias signals for different network nodes. For example, computer 1902 may store indications of different network nodes and bias signals for the network nodes. As computer 1902 adjusts bias signals for individual network nodes, computer 1902 may update the respective stored bias signals in memory. Accordingly, when computer 1902 generates messages to send through a network node to a final destination, computer 1902 may identify the network node that will route the message (e.g., identify the network node based on a network node schedule indicating the network node is associated with routing messages to computers at the geographic location of the final destination of the message) and retrieve the stored bias signal for the network node from memory. In this way, computer 1902 may adjust the signals it sends to different network nodes based on the performance and degradation of each network node.

Implementations of the subject matter and the operations described in this specification can be implemented in digital electronic circuitry or computer software embodied on a tangible medium, firmware, or hardware, including the structures disclosed in this specification and their structural equivalents or combinations of one or more of them. Implementations of the subject matter described in this specification can be implemented as one or more computer programs, e.g., one or more components of computer program instructions encoded on a computer storage medium for execution by, or to control the operation of, data processing apparatus. The program instructions can be encoded on an artificially generated propagated signal, e.g., a machine-generated electrical, optical, or electromagnetic signal developed to transmit information to a suitable receiver apparatus for execution by a data processing apparatus. A computer storage medium can be, or be included in, a computer-readable storage device, a computer-readable storage substrate, a random or serial access memory array or device, or a combination of one or more. Moreover, while a computer storage medium is not a propagated signal, a computer storage medium can include a source or destination of computer program instructions encoded in an artificially generated propagated signal. The computer storage medium can also be included in one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion devices. A smart television module may be configured to allow viewers to view videos, movies, photos, and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device.

A data processing apparatus can implement the operations described in this specification on data stored on one or more computer-readable storage devices or received from other sources.

The terms "data processing apparatus", "feature extraction system," "data processing system", "client device", "computing platform", "computing device", or "device" encompasses all kinds of apparatus, devices, and machines for processing data, including by way of example a programmable processor, a computer, a system on a chip, or multiple ones, or combinations, of the preceding. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing models infrastructures, such as web services, distributed computing, and grid computing infrastructures.

A computer program (also known as a program, software, software application, script, or code) can be written in any programming language, including compiled or interpreted languages, and declarative or procedural languages. It can be deployed in any form, including as a stand-alone program or as a module, component, subroutine, object, or other units suitable for use in a computing environment. A computer program may, but need not, correspond to a file system file. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or multiple computers located at one site or distributed across multiple sites and interconnected by a communication network.

The processes and logic flow described in this specification can be performed by one or more programmable processors executing one or more computer programs to perform actions by operating on input data and generating output. The processes and logic flows can also be performed by, and apparatuses can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors and any one or more processors of any digital computer. Generally, a processor will receive instructions and data from a read-only memory (ROM) or a random-access memory (RAM) or media. The elements of a computer include a processor for performing actions following instructions and one or more memory devices for storing instructions and data. Generally, a computer will also include or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented or incorporated into special-purpose logic circuitry.

To provide for interaction with a user, implementations of the subject matter described in this specification can be implemented on a computer having a display device, e.g., a cathode ray tube (CRT), plasma, or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system, such as the feature extraction system 105, can include clients and servers. For example, the feature extraction system 105 can include one or more servers in data centers or server farms. A client and server are generally remote from each other and typically interact through a communication network. The relationship between client and server arises through computer programs running on the respective computers and having a client-server relationship. In some implementations, a server transmits data (e.g., an HTML page) to a client device (e.g., for displaying data to and receiving input from a user interacting with the client device). Data generated at the client device (e.g., a result of an interaction, computation, or any other event or computation) can be received from the client device at the server and vice-versa.

While this specification contains many specific implementation details, these should not be construed as limitations on the scope of any inventions or of what may be claimed but rather as descriptions of features specific to implementations of the systems and methods described herein. Certain features described in this specification in the context of separate implementations can also be combined in a single implementation. Conversely, various features described in the context of a single implementation can also be implemented separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a sub combination.

Similarly, while operations are depicted in the drawings in a particular order, this should not be understood as requiring that such operations be performed in the order shown or in sequential order or that all illustrated operations be performed to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the above implementations should not be understood as requiring such separation in all implementations. It should be understood that the described program components and systems can generally be integrated with a single software product or packaged into multiple software products. For example, the feature extraction system 105 could be a single module or a logic device having one or more processing modules.

Having now described some illustrative implementations and implementations, it is apparent that the foregoing is illustrative and not limiting, having been presented by way of example. Although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for multiwavelet-based operator learning for differential equations, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method for remotely biased, controlled, and monitored optical switching, the method comprising:
   generating, by a first laser having a first wavelength a first output being convertible into electrical power to drive an optical switch;
   generating, by a second laser having a second wavelength a second output configured to control switching of the optical switch;
   generating, by a third laser having a third wavelength, a third output corresponding to data transmissible by the optical switch;

combining, by a multiplexer, the first output, the second output, and the third output into a multiplexed output;

transmitting, by the multiplexer to the optical switch, the multiplexed output;

separating, at a demultiplexer, the multiplexed output into a first optical output having the first wavelength, a second optical output having the second wavelength, and a third optical output having the third wavelength;

converting, by at least one first photodiode in a photovoltaic mode, the first optical output into a first electrical output;

modifying, by a variable resistor coupled with the first photodiode and at least one second photodiode, a voltage characteristic of the second photodiode; and transmitting, from the demultiplexer to an interferometer, the third optical output.

2. The method of claim 1, further comprising:
applying, to the second photodiode, the first electrical output to activate the second photodiode.

3. The method of claim 1, further comprising:
converting, by the second photodiode operating in a photoconductive mode, the second optical output into a second electrical output.

4. A method for remotely biased, controlled, and monitored optical switching, the method comprising:

receiving, by a demultiplexer via an optical fiber, a multiplexed output;

separating, at the demultiplexer, the multiplexed output into a first optical output having a first wavelength, a second optical output having a second wavelength, and a third optical output having a third wavelength;

converting, by at least one first photodiode operating in a photovoltaic mode, the first optical output into a first electrical output to drive an optical switch;

converting, by at least one second photodiode operating in a photoconductive mode, the second optical output into a second electrical output to control switching of the optical switch;

modifying, by a variable resistor coupled with the first photodiode and the second photodiode, a voltage characteristic of the second photodiode; and transmitting, to an interferometer, the third optical output corresponding to data transmissible by the optical switch.

5. The method of claim 4, further comprising:
applying the first electrical output to the second photodiode to activate the second photodiode.

6. The method of claim 4, wherein the multiplexed output is generated by multiplexing a first output generated by a first laser having the first wavelength, a second output generated by a second laser having the second wavelength, and a third output generated by a third laser having the third wavelength.

7. A system for remotely biased and controlled optical switching, the system comprising:

a first laser having a first wavelength configured to generate a first output convertible into electrical power to drive an optical switch;

a second laser having a second wavelength configured to generate a second output to control switching of the optical switch;

a third laser having a third wavelength to generate a third output corresponding to data transmissible by the optical switch;

a multiplexer to combine the first output, the second output, and the optical output into a multiplexed output, and to transmit the multiplexed output to the optical switch;

a demultiplexer configured to separate the multiplexed output into a first optical output having the first wavelength, a second optical output having the second wavelength, and a third optical output having the third wavelength;

at least one first photodiode operating in a photovoltaic mode and configured to convert the first optical output into a first electrical output;

at least one second photodiode configured to activate in response to receiving the first electrical output; and a variable resistor coupled with the first photodiode and the second photodiode, the variable resistor configured to modify a voltage characteristic of the second photodiode;

wherein the demultiplexer further configured to transmit the third optical output to an interferometer.

8. The system of claim 7, wherein:
the second photodiode operates in a photoconductive mode to convert the second optical output into a second electrical output.

* * * * *

UNITED STATES PATENT AND TRADEMARK OFFICE
CERTIFICATE OF CORRECTION

| | | Page 1 of 1 |
|---|---|---|
| PATENT NO. | : 12,250,502 B2 | |
| APPLICATION NO. | : 18/105573 | |
| DATED | : March 11, 2025 | |
| INVENTOR(S) | : Amir Minoofar et al. | |

It is certified that error appears in the above-identified patent and that said Letters Patent is hereby corrected as shown below:

In the Specification

In Column 1, Lines 22-25, please delete "This invention was made with government support under grant no. HR00112000174 awarded by the Defense Advanced Research Projects Agency (DARPA). The government has certain rights in the invention." and insert -- This invention was made with government support under HR001120C0174 awarded by the Defense Advanced Research Projects Agency. The government has certain rights in the invention. --

Signed and Sealed this
Twenty-ninth Day of April, 2025

Coke Morgan Stewart
*Acting Director of the United States Patent and Trademark Office*